(12) United States Patent
Nagata et al.

(10) Patent No.: US 7,469,603 B2
(45) Date of Patent: Dec. 30, 2008

(54) ANGULAR VELOCITY DETECTOR, METHOD OF DETECTION OF ANGULAR VELOCITIES USING ANGULAR VELOCITY DETECTOR, AND METHOD OF FABRICATING ANGULAR VELOCITY DETECTOR

(75) Inventors: Masaya Nagata, Kanagawa (JP); Hiroshi Nishitake, Kagoshima (JP); Koji Fukumoto, Kanagawa (JP); Kazuhiro Matsuhisa, Kanagawa (JP); Atsuhito Yasui, Kanagawa (JP)

(73) Assignee: Sony Corporation, Tokyo (JP)

( * ) Notice: Subject to any disclaimer, the term of this patent is extended or adjusted under 35 U.S.C. 154(b) by 128 days.

(21) Appl. No.: 10/595,430

(22) PCT Filed: Oct. 20, 2004

(86) PCT No.: PCT/JP2004/015866

§ 371 (c)(1), (2), (4) Date: Apr. 19, 2006

(87) PCT Pub. No.: WO2005/038399

PCT Pub. Date: Apr. 28, 2005

(65) Prior Publication Data

US 2007/0151332 A1 Jul. 5, 2007

(30) Foreign Application Priority Data

Oct. 20, 2003 (JP) ............................. 2003-358715
Dec. 10, 2003 (JP) ............................. 2003-411264
Oct. 14, 2004 (JP) ............................. 2004-300056

(51) Int. Cl.
*G01L 3/02* (2006.01)

(52) U.S. Cl. ................................. 73/862.325

(58) Field of Classification Search ............ 73/862.325, 73/488–551
See application file for complete search history.

(56) References Cited

U.S. PATENT DOCUMENTS 4,458,536 A * 7/1984 Ahn et al. ...................... 73/652

(Continued)

FOREIGN PATENT DOCUMENTS

GB 2 297 618 8/1996

(Continued)

OTHER PUBLICATIONS

European Search Report dated Nov. 19, 2007.

*Primary Examiner*—Max Noori
(74) *Attorney, Agent, or Firm*—Sonnenschein Nath & Rosenthal LLP

(57) ABSTRACT

An angular velocity detector using a vibrator made of an annular thin film. The detector also has electrodes arranged ingeniously to have high detection sensitivity for angular velocities. The detector can detect angular velocities in two axial directions simultaneously. The detector has support portions (1105), (1106) which are formed over a first substrate (1123) and poised above the surface of the first substrate (1100) at a certain spacing therefrom. Resilient support bodies are supported to the support portions and include outer springs (1102) and inner springs (1103). A vibrator (1101) is mounted via the resilient support. An exciting means consisting of a magnet (1124) and an exciting electrode (1108) excites the vibrator to vibrate in a certain direction of vibrations. When the vibrator (1101) is excited to vibrate in the direction of vibrations by the exciting means and an angular velocity acts from the outside, a displacement detection means consisting of a detection electrode (1109) and electrodes (1120) detects the displacement of the vibrator (1101) in a direction perpendicular to the direction of vibrations in response to the angular velocity. The vibrator (1101) or an angular velocity detection portion including the vibrator (1101) is electromagnetically driven to vibrate.

20 Claims, 80 Drawing Sheets

U.S. PATENT DOCUMENTS

| | | | | |
|---|---|---|---|---|
| 5,287,031 A | * | 2/1994 | Akiba et al. | 310/90.5 |
| 6,443,009 B1 | * | 9/2002 | De Salaberry | 73/504.13 |
| 6,626,039 B1 | | 9/2003 | Adams et al. | |
| 7,109,624 B2 | * | 9/2006 | Yashiro et al. | 310/156.45 |

FOREIGN PATENT DOCUMENTS

| | | |
|---|---|---|
| JP | 5-248875 | 9/1993 |
| JP | 11-230982 | 8/1999 |
| JP | 11-230983 | 8/1999 |
| JP | 2000-028367 | 1/2000 |
| JP | 2000-329562 | 11/2000 |
| JP | 2001-027529 | 1/2001 |
| JP | 2003-509670 | 3/2003 |
| JP | 2003-185438 | 7/2003 |

* cited by examiner

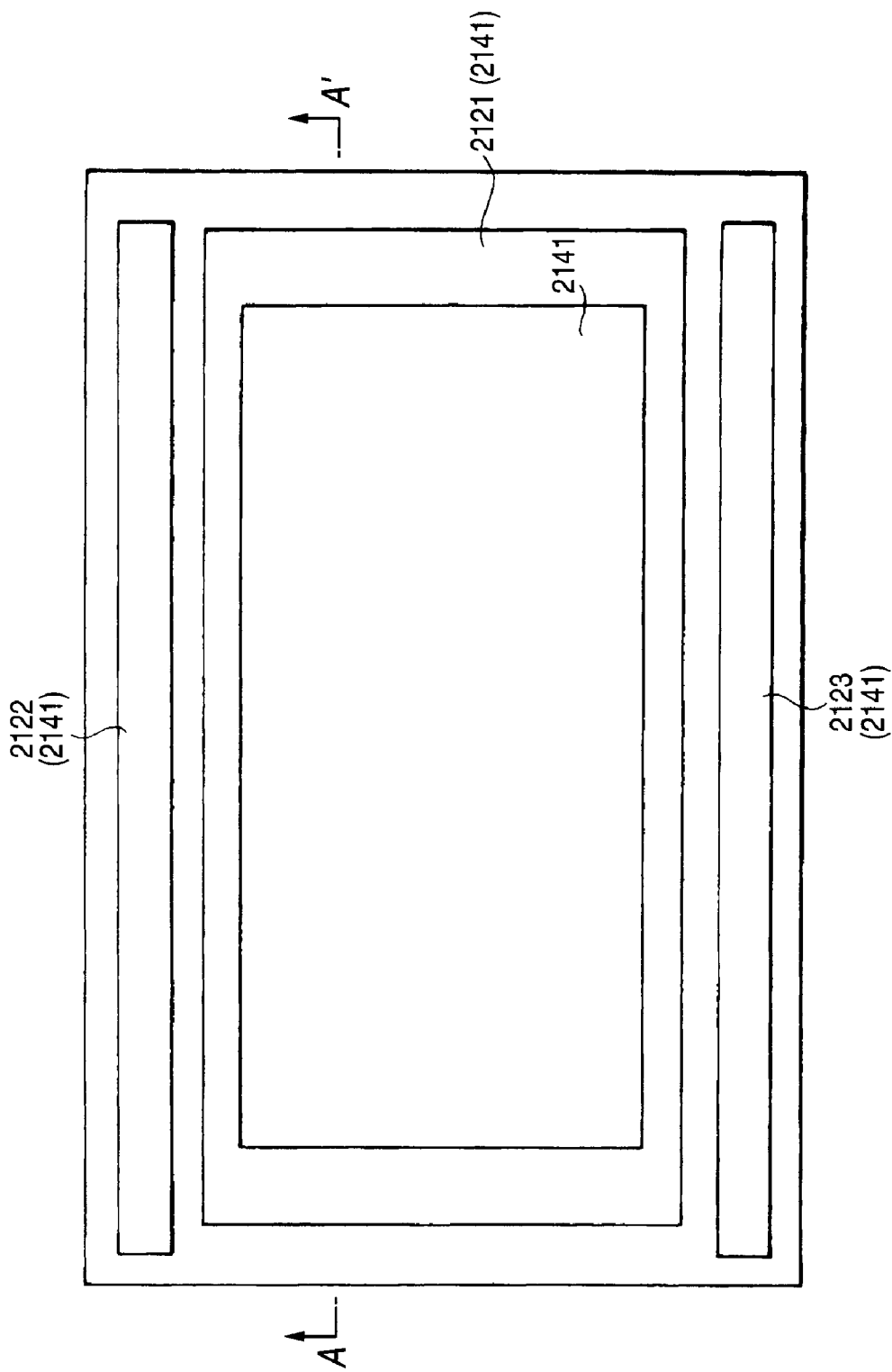

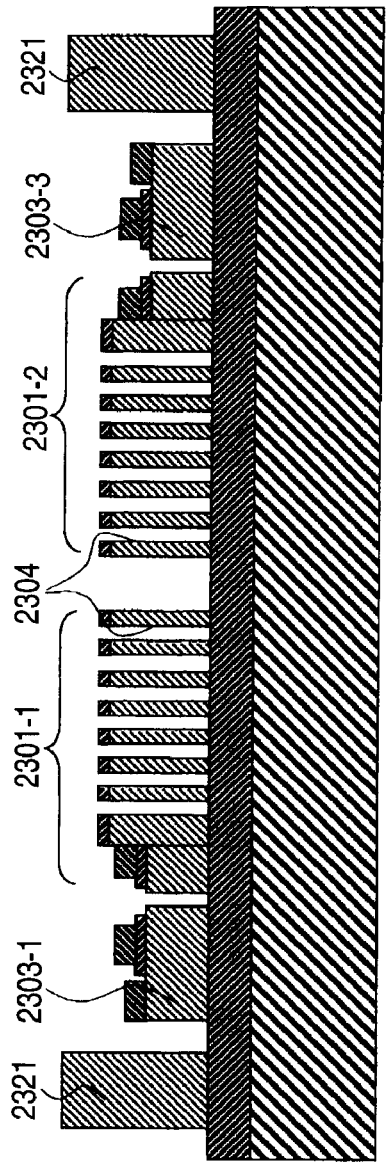
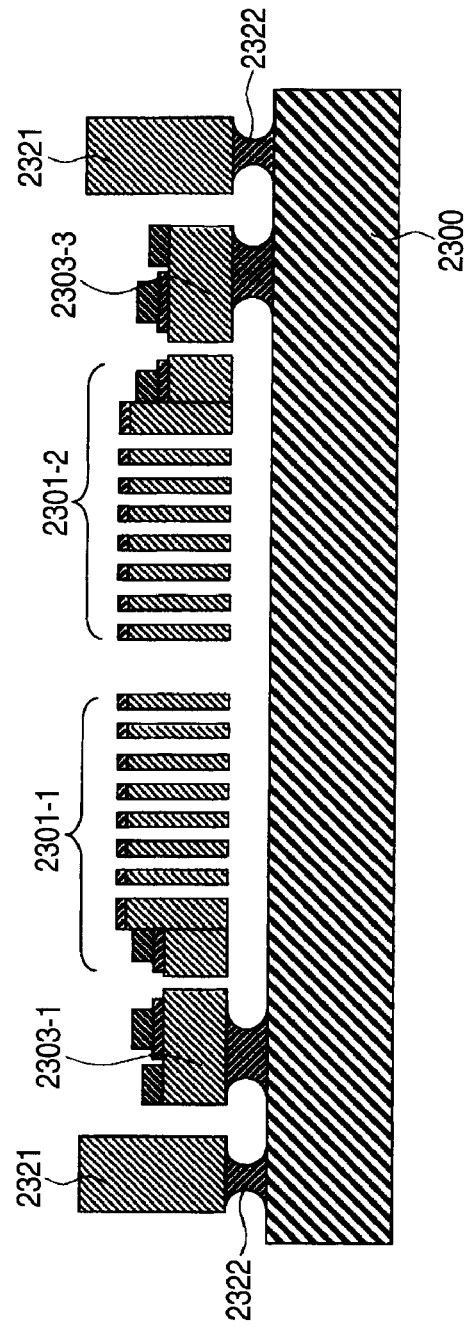
FIG. 55A
FIG. 55B

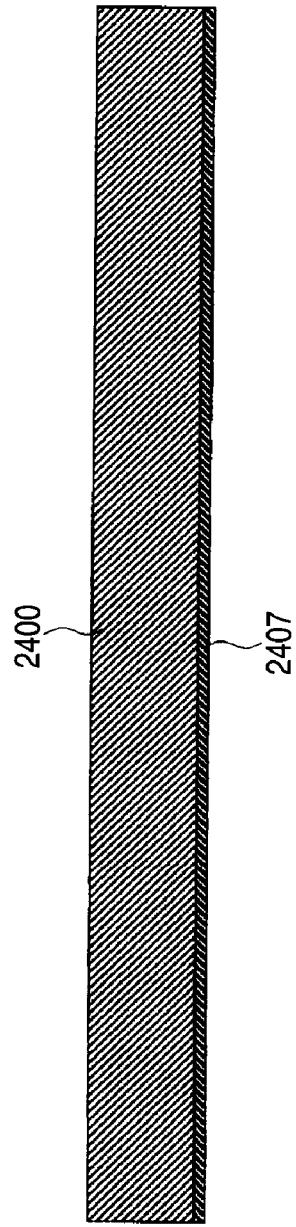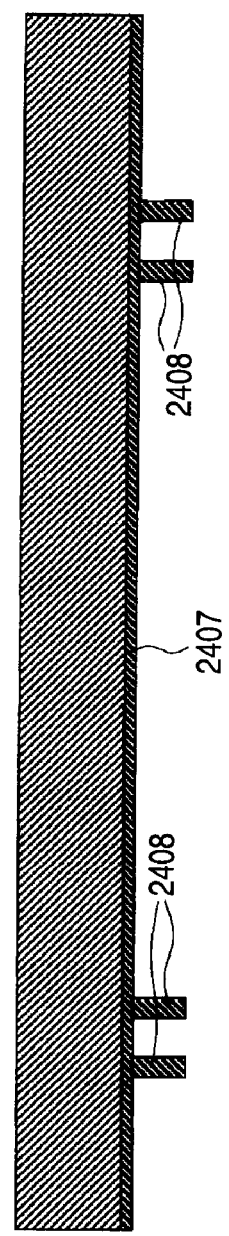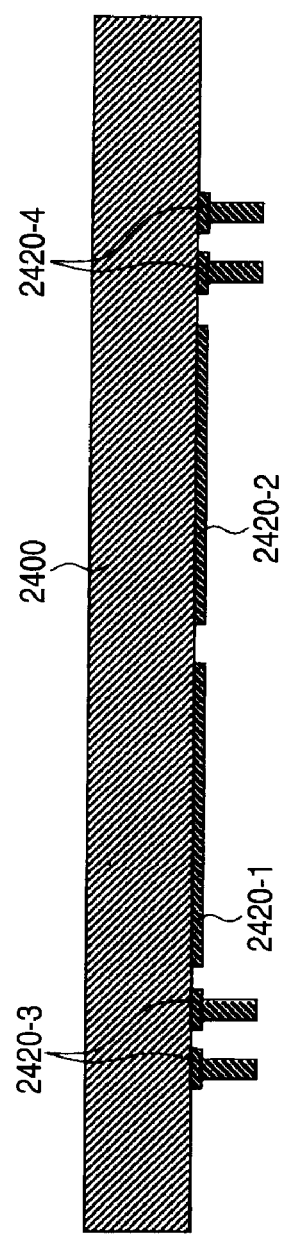
FIG. 57A
FIG. 57B
FIG. 57C

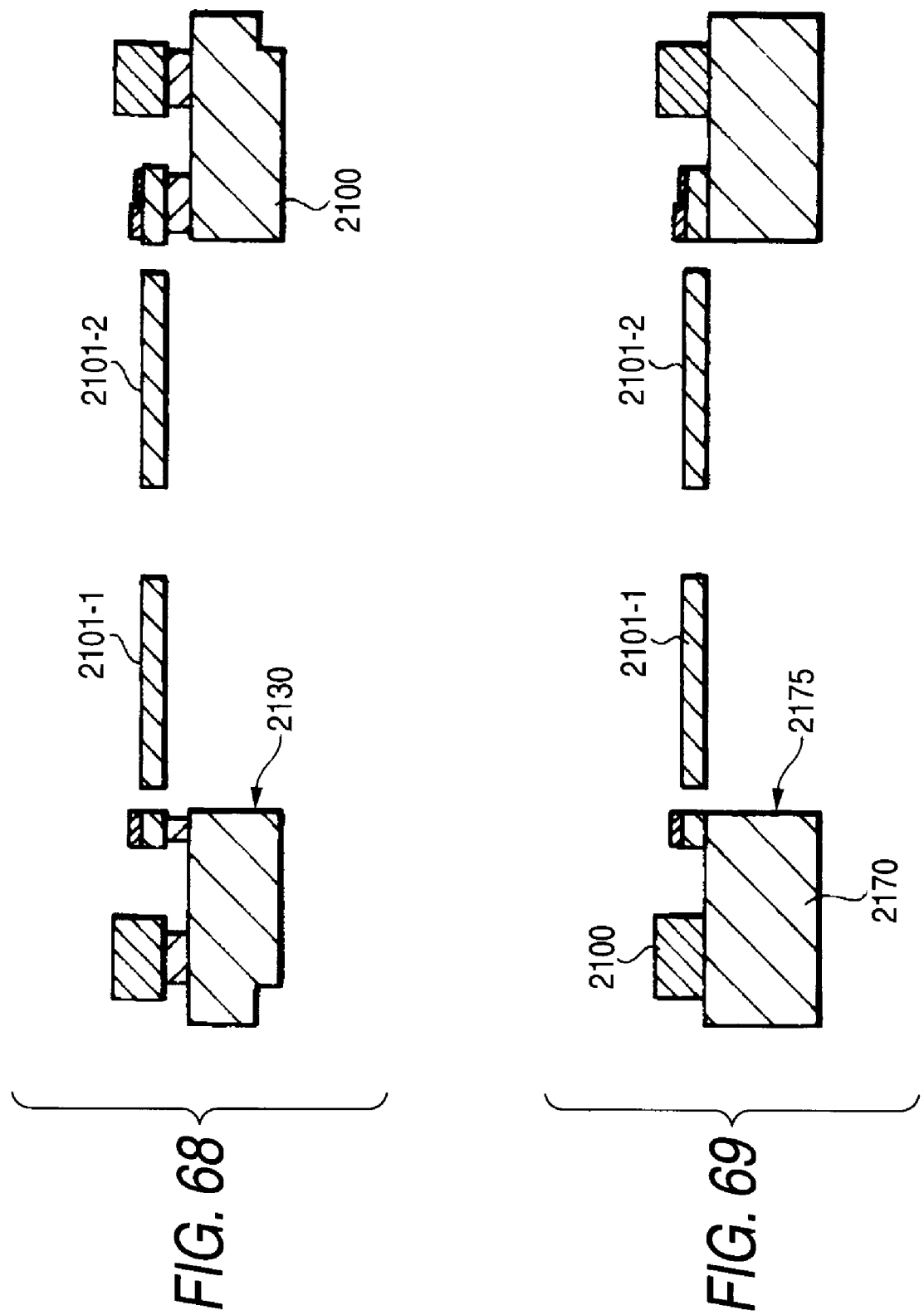

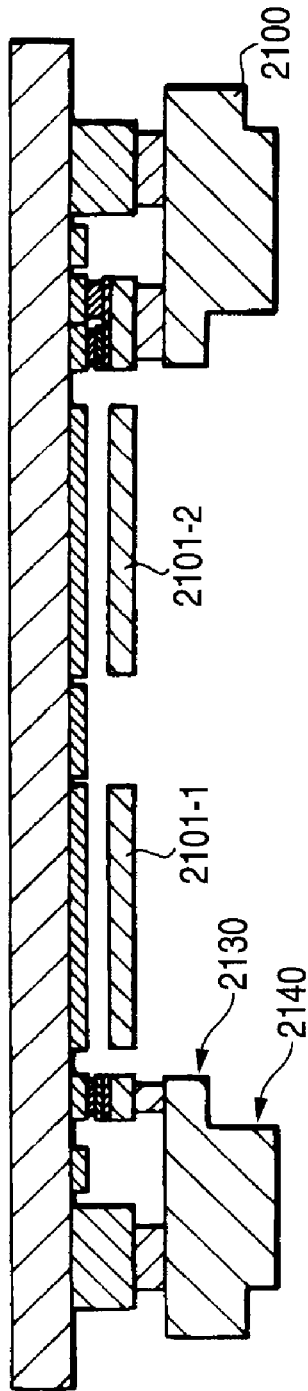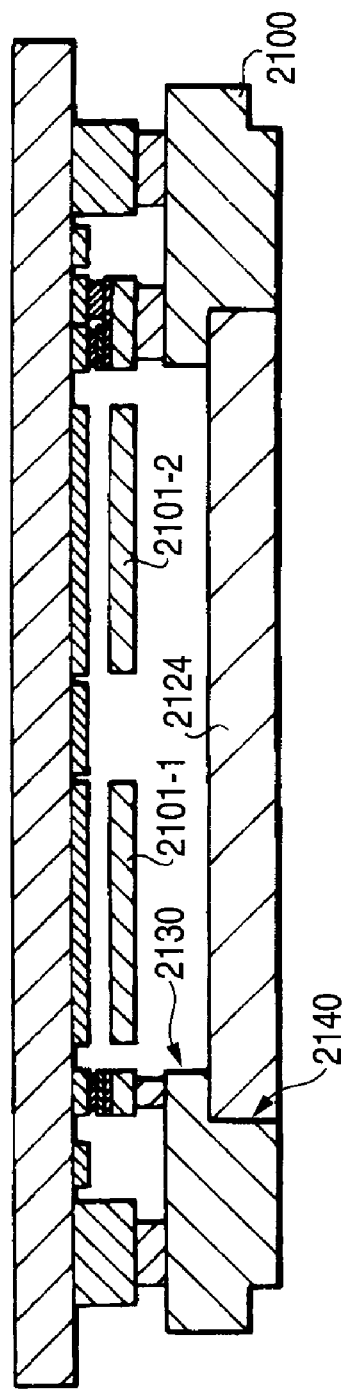
FIG. 75A
FIG. 75B

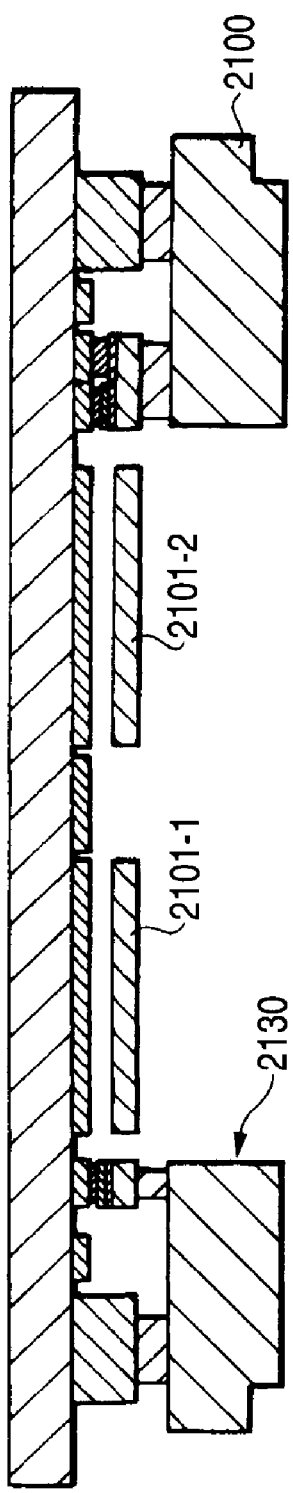
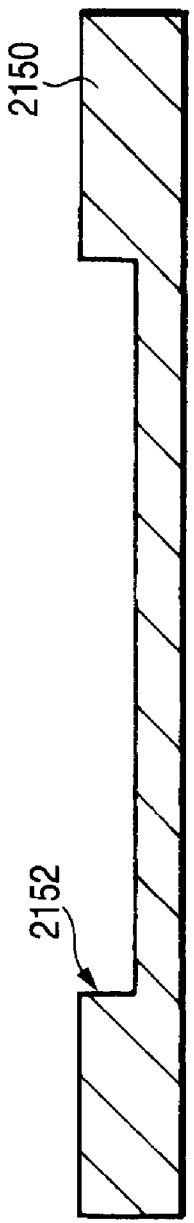
FIG. 76A
FIG. 76B

US 7,469,603 B2

ANGULAR VELOCITY DETECTOR, METHOD OF DETECTION OF ANGULAR VELOCITIES USING ANGULAR VELOCITY DETECTOR, AND METHOD OF FABRICATING ANGULAR VELOCITY DETECTOR

TECHNICAL FIELD

The present invention relates to an angular velocity detector capable of detecting angular velocities in two axial directions simultaneously with high detection sensitivity, to a method of detecting angular velocities using the angular velocity detector, and a method of fabricating the angular velocity detector.

BACKGROUND ART

A structure as shown in FIGS. 81A-81B is disclosed as one example of the prior art vibration gyro sensor. FIG. 81A is a perspective view. FIG. 81B is a schematic plan view. As shown in FIGS. 81A-81B, a vibrator 1 is disposed on abase plate or substrate 10. The vibrator 1 is supported from its both sides to beams 8 and mounted to the substrate 10 by anchors 13. Comb-toothed electrodes 9A and 9B are mounted to the vibrator 1. A comb-toothed driver electrode 2 is fixedly mounted to the substrate 10 at a space with the comb-toothed electrode 9B. Furthermore, a comb-toothed monitor electrode 3 is fixedly mounted to the substrate 10 at a space with the comb-toothed electrode 9A. The driver electrode 2 is an electrode for exciting the vibrator 1 to vibrate relative to the substrate 10. In this vibration gyro sensor, the vibrator 1 is excited to vibrate by an exciting AC voltage applied to the driver electrode 2. Comb-toothed movable electrodes 11A and 11B are mounted around the center of the vibrator 1. Comb-toothed fixed electrodes 12A and 12B are fixedly mounted to the substrate 10 at a space with the movable electrodes 11A and 11B (see, for example, JP-A-11-183178 and JP-A-2000-292174).

In the above-described vibration gyro sensor, the vibrator 1 is excited to vibrate in the illustrated X-direction by the driver electrode 2 and rotates about the Z-axis. A Coriolis force is produced in the Y-direction perpendicular to the direction of axis of rotation and to the direction of vibrations. The movable electrodes 11A, 11B and fixed electrodes 12A, 12B, forming a set, act as electrodes for detecting the Coriolis force in a corresponding manner to a variation in the capacitance between the movable electrodes 11A, 11B and the fixed electrodes 12A, 12B.

The following structure is disclosed as one example of electromagnetically driven angular velocity detector. The structure is equipped with a disk-shaped vibrating mass of silicon. The disk-shaped vibrating mass is joined to an underlying glass substrate at anchor portions at the four corners via 4 rectangular support springs. The support springs act also as electrode extraction leads extending from the disk-shaped vibrating mass that is a common movable electrode. The movable comb-toothed electrodes of an electrostatic actuator are mounted at four diametrically opposite locations on the outer periphery of the disk-shaped vibrating mass. Two fixed comb-toothed electrodes are fixedly mounted to the glass substrate oppositely to the four electrodes. An AC voltage is applied between the opposite fixed comb-toothed electrodes, giving reciprocating vibrations to the movable electrodes. Rotary vibration is induced in the central disk-shaped vibrating mass. A lower electrode for detecting a capacitance with the disk-shaped vibrating mass via a gap (space) is split into four sectors and mounted to the glass substrate (for example, see "Fundamental Researches on Rotational Vibration Gyroscope", the Transactions of the Institute of Electrical Engineers of Japan, E, Vol. 119, August/September, 1999, written by Takayuki Fujita, Kenta Hatano, Takuya Mizuno, Ichisuke Maenaka, and Muneo Maeda).

In the above-described angular velocity detector, in a case where an angular velocity is detected, there is a danger that a detection electrode installed opposite to the vibrator is brought into contact with the vibrator by an external large shock. Therefore, insulative protrusions are mounted to the vibrator as a countermeasure to prevent damage to the vibrator when it is touched.

Another electromagnetically driven angular velocity detector has two rectangular vibrators consisting of thin silicon film. The vibrators are connected by a spring. The four corners of each connected vibrator are supported to a glass substrate by other four springs via pillars. Electrodes are disposed on the vibrators, respectively, to drive them electromagnetically. Extraction leads connected with the electrodes are mounted on the springs supported to the pillars. Counter detection electrodes are mounted in positions opposite to the vibrators via spaces to detect the capacitance.

A problem to be solved is that a large displacement cannot be had because of limitations on the operation of the comb-toothed electrodes in the case of the capacitance-detecting gyroscope using the comb-toothed electrodes. Therefore, limitations are placed on improvement of the detection sensitivity. It is impossible to set large the vibrating amplitude of the vibrating vibrations in order to set high the detection sensitivity. Furthermore, in detecting capacitance using comb-toothed electrodes, angular velocity only in one axial direction can be detected for structural reasons. Consequently, it is difficult to detect angular velocities in the two or more axial directions. In addition, where angular velocities around X- and Y-axes, respectively, are detected using a driving amplitude in the Z-axis direction, the gap between the vibrator and a detection electrode installed opposite to the vibrator needs to be set larger than the driving amplitude and so there is the anxiety that the detection sensitivity is deteriorated.

DISCLOSURE OF THE INVENTION

An angular velocity detector according to the invention comprises: a base plate or substrate; support portions fixedly mounted to a surface of the substrate; resilient support bodies having their respective one ends connected with the support portions; at least one vibrator supported to respective other ends of the resilient support bodies while poised above the surface of the substrate at a certain spacing therefrom, the vibrator being capable of being displaced relative to the substrate; exciting means for exciting the vibrator to vibrate in a certain direction of vibrations; and displacement detection means which, when an angular velocity acts from the outside while the vibrator is being vibrated in the direction of vibrations by the exciting means, detects a displacement of the vibrator in a direction perpendicular to the direction of vibrations in response to the angular velocity. The detector is most characterized in that either the vibrator or an angular velocity detection portion including the vibrator is electromagnetically driven to vibrate.

A method of detecting an angular velocity using an angular velocity detector in accordance with the invention is implemented with the angular velocity detector comprising: a substrate; support portions fixedly mounted to a surface of the substrate; resilient support bodies having their respective one ends connected with the support portions; at least one vibrator supported to respective other ends of the resilient support bodies poised above the surface of the substrate at a certain spacing therefrom, the vibrator being capable of being displaced relative to the substrate; exciting means for exciting the vibrator to vibrate in a certain direction of vibrations; and displacement detection means which, when an angular velocity acts from the outside while the vibrator is being vibrated in the direction of vibrations by the exciting means, detects a displacement of the vibrator in a direction perpendicular to the direction of vibrations in response to the angular velocity. This method is most characterized in that either the vibrator or an angular velocity detection portion including the vibrator is electromagnetically driven to vibrate. When an angular velocity acts on the vibrating vibrator from the outside, the displacement detection means detects a displacement of the vibrator in a direction perpendicular to the direction of vibrations in response to the angular velocity. Thus, the angular velocity is found.

A first method of fabricating an angular velocity detector in accordance with the invention comprises the steps of: forming a silicon layer over a first substrate via an insulator layer; forming a driver electrode for driving at least one vibrator to vibrate and a detection electrode for detecting a displacement of the vibrator over the silicon layer via an insulator film; forming the vibrator made of an annular thin film, a plurality of outer resilient support bodies whose respective one ends are connected with the outside of the vibrator, outer support portions to which the other ends of the outer resilient support bodies are connected and supported, a plurality of inner resilient support bodies whose respective one ends are connected to the inside of the vibrator, and inner support portions to which the other ends of the inner resilient support bodies are connected and supported by the use of the silicon layer; removing the insulator layer such that the respective one ends of the outer resilient support bodies and the respective one ends of the inner resilient support bodies are supported by the outer support portions and the inner support portions, respectively, and that the outer resilient support bodies, the vibrator, and the inner resilient support bodies are poised above the first substrate; forming an electrode on a second substrate in a position opposite to the driver electrode and detection electrode disposed over the vibrator; bonding together the first and second substrates such that the electrode is disposed in a position opposite to the driver electrode and detection electrode; and disposing a magnet acting as the excitation means on either the first or second substrate.

A second method of fabricating an angular velocity detector in accordance with the invention is implemented with the angular velocity detector comprising: support portions fixedly mounted to a surface of the substrate; resilient support bodies having their respective one ends connected with the support portions; at least one vibrator supported to the respective other ends of the resilient support bodies poised at a certain distance from the surface of the substrate, the vibrator being capable of being displaced relative to the substrate; exciting means for exciting the vibrator to vibrate in a certain direction of vibrations; displacement detection means which, when an angular velocity acts from the outside while the vibrator is being vibrated in the direction of vibrations by the exciting means, detects a displacement of the vibrator in a direction perpendicular to the direction of vibrations in response to the angular velocity; and an electrode for electromagnetically driving the vibrator to vibrate, the electrode being used to produce electromagnetic force in parts of the resilient support bodies and of the vibrator. The method starts with forming the displacement detection means from electrodes disposed on opposite sides of a space. After forming dug portions in the vibrator, the electrodes of the vibrator are formed in the dug portions.

A third method of fabricating an angular velocity detector in accordance with the invention comprises the steps of: forming a driver electrode for exciting a vibrator to vibrate and a detection electrode for detecting a displacement of the vibrator over a first substrate via an insulator film; forming a frame, the vibrator, and resilient support bodies using the first substrate, the resilient support bodies poising the vibrator above the frame; forming electrodes on a second substrate in positions opposite to the driver electrode and the detection electrode, respectively, disposed over the vibrator; bonding together the frame and the second substrate such that the electrodes are disposed in opposite positions on the driver electrode and the detection electrode, respectively; bonding a third substrate to the frame, the third substrate being provided with dug portions in positions opposite to the vibrator; and disposing a magnet acting as the exciting means on at least one of the second and third substrates.

In the angular velocity detector according to the invention, the driving amplitude can be set large because the vibrator is electromagnetically driven using the magnet. Therefore, there is the advantage that the displacement corresponding to the Coriolis force produced when an angular velocity is applied can be set large. Furthermore, the spacing between the electrodes of the displacement detection means can be narrowed by producing driving vibrations on the X-Y plane. Hence, there is the advantage that a high-sensitivity angular velocity detector in which the capacitance varies greatly can be offered. Additionally, a driver electrode and a detection electrode which act as electromagnetic driving lead wire (interconnect) and displacement detection means, respectively, can be formed on the resilient support bodies by fabricating the resilient support bodies, for example, from four resilient support bodies and arranging them at intervals of 90°. Further, there arises another advantage that angular velocities in the two axial directions can be detected simultaneously using a single vibrator by disposing the driver electrode on the vibrator and two pairs of electrodes opposite to the detection electrode.

In the method of detecting an angular velocity using an angular velocity detector of the invention, the driving amplitude can be set large owing to electromagnetic driving using the magnet. Therefore, there is the advantage that the displacement corresponding to the Coriolis force produced when an angular velocity is applied can be set large. Furthermore, the spacing between the electrodes of the displacement detection means can be narrowed by producing driving vibrations on the X-Y plane. Hence, there is the advantage that high-sensitivity angular velocity detection is permitted by increasing capacitance variation. Additionally, the driver electrode acting as electromagnetically driving lead wire and the detection electrode acting as the displacement means can be formed on the resilient support bodies, for example, by fabricating the resilient support bodies from four resilient support bodies and arranging these support bodies at intervals of 90°. There is another advantage that angular velocities in two axial directions can be detected at the same time using a single vibrator by disposing two pairs of electrodes opposite to the driver electrode and detection electrode, respectively, placed on the vibrator.

In the first method of fabricating an angular velocity detector in accordance with the invention, the plural outer resilient support bodies and inner resilient support bodies are formed at the same time with the vibrator using the silicon layer formed on the insulator layer. Therefore, the vibrator can be poised above the first substrate by the resilient support bodies. Furthermore, the magnet is mounted on the first or second substrate as the excitation means and so an angular velocity detector can be fabricated in which the driving amplitude can be set large by electromagnetically driving the vibrator using the magnet. Consequently, the angular velocity detector fabricated by the method of fabrication of the invention has the advantage that the displacement corresponding to the Coriolis force produced on application of an angular velocity can be set large. Furthermore, driving vibrations can be produced on the X-Y plane. The spacing between the electrodes of the displacement detection means can be narrowed by adjusting the spacing between the first and second substrates during fabrication. There is the advantage that a high-sensitivity angular velocity detector where the capacitance varies greatly can be offered. In addition, the driving electrode acting as the electromagnetically driving lead wire (interconnect) and the detection electrode acting as the displacement detection means can be formed on the resilient support bodies, for example, by fabricating the resilient support bodies from four outer resilient support bodies and four inner resilient support bodies and arranging them at intervals of 90°. There is the advantage that a structure permitting simultaneous detection of angular velocities in two axial directions can be fabricated using a single vibrator by disposing two pairs of electrodes on the side of the second substrate.

In the second method of fabricating an annular velocity detector in accordance with the invention, the displacement detection means is fabricated from the electrodes which are on opposite sides of a space. The electrodes formed on the vibrator are fabricated in dug portions after forming the dug portions in the vibrator. Therefore, when the vibrator vibrates, the electrodes forming the displacement detection means can be fabricated in such a way that the electrodes do not touch each other. There is the advantage that an angular velocity detector assuring detection of the displacement of the vibrator can be offered.

In the third method of fabricating an angular velocity detector in accordance with the invention, the vibrator poised by the resilient support bodies using the first substrate is formed on the frame and then the third substrate is joined to the frame, the third substrate being provided with the dug portions in the positions opposite to the vibrator. Therefore, the vibrator can be prevented from touching or sticking to the third substrate. Consequently, the displacement of the vibrator can be set large. This can enhance the detection sensitivity. There is the advantage that an angular velocity detector capable of reliably detecting the displacement of the vibrator can be offered.

BRIEF DESCRIPTION OF THE DRAWINGS

FIG. 1A is a schematic structural plan view and FIG. 1B is a schematic cross section taken on line A-A' of FIG. 1A;

FIG. 41 is a figure showing a specific fabrication sequence (Embodiment 8) of an angular velocity detector of the invention and is a planar layout diagram of FIG. 39A;

FIGS. 55A-55B are schematic cross sections showing one embodiment associated with a method of fabricating an angular velocity detector (Embodiment 10) of the invention;

FIGS. 57A-57C are schematic cross sections showing one embodiment associated with a method of fabricating an angular velocity detector (Embodiment 10) of the invention;

FIG. 68 is a schematic structural cross section showing one embodiment associated with a method of fabricating an angular velocity detector (Embodiment 13) of the invention;

FIG. 69 is a schematic structural cross section showing one embodiment associated with an angular velocity detector (Embodiment 13) of the invention;

FIGS. 75A-75B are schematic structural cross sections showing one embodiment associated with a method of fabricating an angular velocity detector (Embodiment 15) of the invention;

FIGS. 76A-76B are schematic structural cross sections showing one embodiment associated with a method of fabricating an angular velocity detector (Embodiment 15) of the invention;

BEST MODE FOR CARRYING OUT THE INVENTION

The object of the invention (i.e., a high detection sensitivity is obtained and simultaneous detection of angular velocities in two angular directions is enabled) is achieved by electromagnetically driving one or more vibrators of an angular velocity detector using a magnet and producing driving vibrations on the X-Y plane. Thus, a high sensitivity is obtained with large capacitance variations. The angular velocity detector can detect angular velocities in two axial directions simultaneously by contriving the electromagnetically driving electrodes (lead wires) and by using one or more vibrators. Also, a method of detecting angular velocities using the angular velocity detector is realized. Furthermore, a method of fabricating the angular velocity detector is realized.

Embodiment 1

Figure 1A:
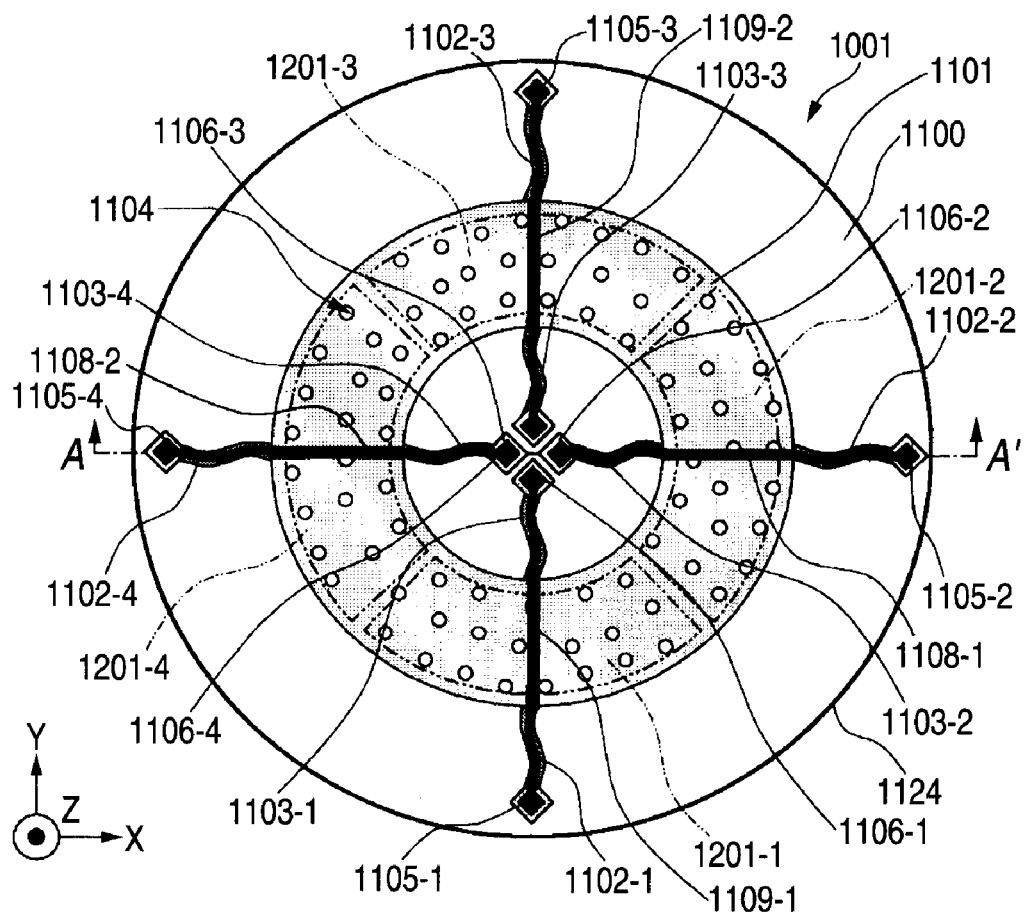
FIGS. 1A-1B are figures showing one embodiment associated with an angular velocity detector (Embodiment 1) of the invention.
Figure 1B:
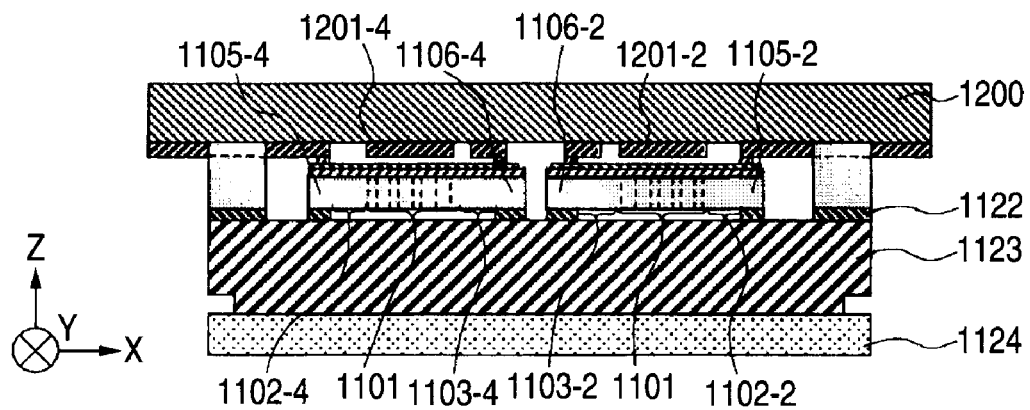

One embodiment associated with an angular velocity detector of the invention is described by referring to FIGS. 1A and 1B. FIGS. 1A and 1B show the fundamental structure of the angular velocity detector of the invention. FIG. 1A is a schematic plan view of a first substrate as viewed from the electrode shown in FIG. 1B. FIG. 1B is a schematic cross section taken on line A-A' of FIG. 1A. Note that FIGS. 1A-1B are not always drawn to the same scale.

As shown in FIGS. 1A-1B, the angular velocity detector of the invention, 1001, is equipped with a vibrator 1101. The vibrator 1101 is made, for example, of an annular thin film. In the figures, four outer springs 1102 (i.e., outer springs 1102-1, 1102-2, 1102-3, and 1102-4) are disposed as a plurality of resilient support bodies outside the vibrator 1101. In the figures, four inner springs 1103 (i.e., inner springs 1103-1, 1103-2, 1103-3, and 1103-4) are disposed as a plurality of resilient support bodies inside the vibrator 1101.

One end of the outer spring 1102-1 is connected with the vibrator 1101, while the other end is connected and supported to a support portion 1105-1. The support portion 1105-1 is fixedly mounted to a first substrate 1100 via an insulator layer (not shown). Similarly to the outer spring 1102-1, the other outer springs 1102-2, 1102-3, and 1102-4 are connected to the vibrator 1101 at their respective one ends, whereas their respective other ends are connected and supported to support portions 1105-2, 1105-3, and 1105-4. The support portions 1105-2, 1105-3, and 1105-4 are fixedly mounted to the first substrate 1100 via an insulator layer 1122.

One end of the inner spring 1103-1 is connected with the vibrator 1101, while the other end is connected and supported to the support portion 1106-1. Furthermore, the support portion 1106-1 is fixedly mounted to the first substrate 1100 via an insulator layer (not shown). Similarly to the inner spring 1103-1, the other inner springs 1103-2, 1103-3, and 1103-4 are connected with the vibrator 1101 at their respective one ends and connected and supported to support portions 1106-2, 1106-3, and 1106-4 at their respective other ends. The support portions 1106-2, 1106-3, and 1106-4 are fixedly mounted to the first substrate 1100 via the insulator layer 1122.

In this way, the outer springs 1102-1, 1102-2, 1102-3, and 1102-4 are supported by the support portions 1105-1, 1105-2, 1105-3, and 1105-4, respectively. The inner springs 1103-1, 1103-2, 1103-3, and 1103-4 are supported by the support portions 1106-1, 1106-2, 1106-3, and 1106-4, respectively. The vibrator 101, outer springs 1102-1, 1102-2, 1102-3, 1102-4, and inner springs 1103-1, 1103-2, 1103-3, 1103-4 are completely poised above the first substrate 1100.

The vibrator 1101 is provided with a plurality of through-holes 1104 to mitigate air damping. The through-holes 1104 reduce the squeezing effect of the narrow gap with a second substrate 125 mounted above the vibrator 1101. The second substrate 1200 will be described later.

A driver electrode 1108-1 for electromagnetically driving the vibrator extends continuously over the inner spring 1103-2, over the vibrator 1101, and over the outer spring 1102-2 so as to connect the inner support portion 1106-2 and outer support portion 1105-2 in a spaced relation from the outer spring 1102-2, vibrator 1101, and inner spring 1103-2, i.e., via an insulator film 1107.

One example of the arrangement of the driver electrode 1108-1 is described in further detail below by referring to FIG. 2.

Figure 2:
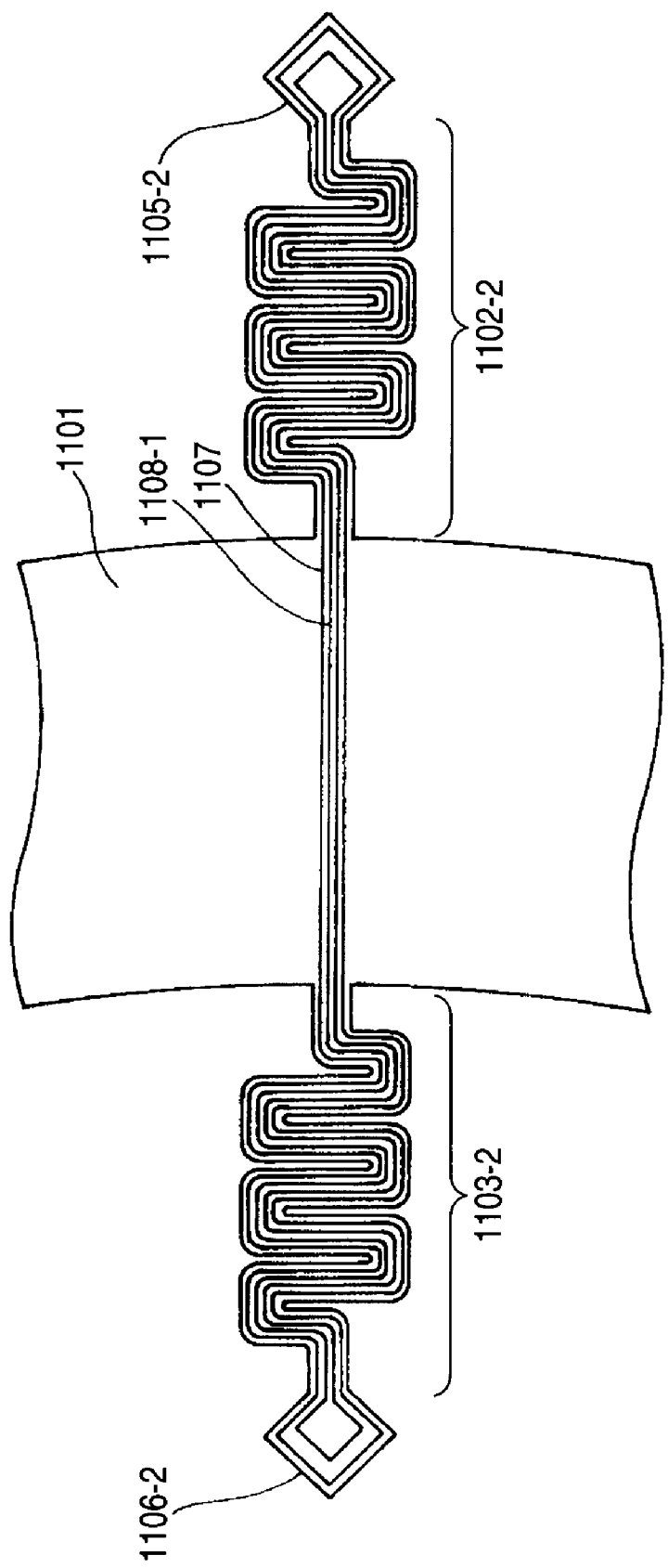
FIG. 2 is a plan view showing one example of the shape of resilient support bodies.

As shown in FIG. 2, one end of the inner spring 1103-2 is connected to the inner support portion 1106-2. The other end of the inner spring 1103-2 is connected to the inside of the vibrator 1101. One end of the outer spring 1102-2 is connected to the outside of the vibrator 1101, while the other end of the outer spring 1102-2 is connected to the outer support portion 1105-2. The inner support portion 1106-2, inner spring 1103-2, outer spring 1102-2, and outer support portion 1105-2 are arranged substantially in a line between the inner spring 1102-2 and outer spring 1103-2 such that the vibrator 1101 is sandwiched between the inner and outer components. The top surfaces of the inner support portion 1106-2, inner spring 1103-2, vibrator 1101, outer spring 1102-2, and outer support portion 1105-2 are formed almost flushly with each other. By making almost flush the top surfaces of the inner support portion 1106-2, inner spring 1103-2, vibrator 1101, outer spring 1102-2, and outer support portion 1105-2 in this way, the insulator film 1107 and driver electrode 1108-1 formed on them can be formed on a plane having no steps. Therefore, it is easy to form the insulator film 1107 and driver electrode 1108-1.

The insulator film 1107 is formed on the top surfaces of the inner support portion 1106-2, inner spring 1103-2, vibrator 1101, outer spring 1102-2, and outer support portion 1105-2. The driver electrode 1108-1 insulated by the insulator film 1107 is formed over the inner support portion 1106-2, over the inner spring 1103-2, over the vibrator 1101, over the outer spring 1102-2, and over the outer support portion 1105-2. Accordingly, the driver electrode 1108-1 extends from over the inner support portion 1106-2 to over the outer support portion 1105-2 while electrically insulated (not directly connected with) from the inner support portion 1106-2, inner spring 1103-2, vibrator 1101, outer spring 1102-2, and outer support portion 1105-2.

When viewed in a plane, each of the inner spring 1103-2 and outer spring 1102-2 is shaped like a rectangular impulsive waveform as shown. Preferably, the bent portion of each spring is rounded. Where it is rounded, the durability of the spring is improved. Furthermore, the bent portion of the driver electrode 1108-1 formed on each spring is preferably rounded for the same reason as for the spring.

On the other hand, as shown in the above-referenced FIGS. 1A-1B, a driver electrode 1108-2 is disposed in the same way as the foregoing over the outer support portion 1105-4, over the outer spring 1102-4, over the inner spring 1103-4, over the inner support portion 1106-2, and over the vibrator 1101 such that the outer support portion 1105-2, outer spring 1102-2, inner spring 1103-2, and inner support portion 1106-2 are symmetrical with respect to the center axis passing through the center of the vibrator 1101.

Furthermore, to detect an induced electromotive force produced when the vibrator is electromagnetically driven to operate, a detection electrode 1109-1 is formed over the outer spring 1102-1, over the inner spring 1103-1, and over the vibrator 1101 such that the outer and inner springs are connected in the present embodiment. Alternatively, the detection electrode 1109-2 may be formed over the outer spring 1102-3, over the inner spring 1103-3, and over the vibrator 1101 so as to connect the outer and inner springs. Yet alternatively, the detection electrodes 1109-1 and 1109-2 may be formed on both.

Furthermore, in the present embodiment, the driver electrode 1108-1 for electromagnetically driving the vibrator is disposed over the outer spring 1102-2 and over the inner spring 1103-2. Also, the driver electrode 1108-2 for electromagnetically driving the vibrator is disposed over the outer spring 1102-4 and over the inner spring 1103-4, it being noted that the outer spring 1102-2, inner spring 1103-2, outer spring 1102-4, and inner spring 1103-4 are symmetrical with respect to the center axis of the vibrator 1101. Alternatively, the driver electrode 1108-1 for electromagnetically driving the vibrator may be disposed over the outer spring 1102-1 and inner spring 1103-1. The driver electrode 1108-2 for electromagnetically driving the vibrator may be disposed over the outer spring 1102-3 and inner spring 1103-3, it being noted that the outer spring 1102-1, inner spring 1103-1, the outer spring 1102-3, and inner spring 1103-3 are symmetrical with respect to the center axis of the vibrator 1101. Yet alternatively, the detection electrode 1109-1 may be disposed over the outer spring 1102-2 and over the inner spring 1103-2 as an electrode for detecting the induced electromotive force produced when the vibrator is electromagnetically driven to operate. The detection electrode 1109-2 may be disposed over the outer spring 1102-4 and over the inner spring 1103-4.

The driver electrode 1108-2 and the detection electrodes 1109-1 and 1109-2 may be identical in structure with the driver electrode 1108-1 already described in connection with FIG. 2.

Electrodes 1201-1, 1201-2, 1201-3, and 1201-4 for detecting capacitance variations are disposed opposite to the vibrator 1101 via a space above the vibrator 1101 over the second substrate 1200. The electrodes 1201-1, 1201-2, 1201-3, and 1201-4 are shaped, for example, sectorially. The electrodes 1201-1 and 1201-3 are arranged symmetrically with respect to the center axis of the vibrator 1101. Furthermore, the electrodes 1201-2 and 1201-4 are disposed symmetrically with respect to the center axis of the vibrator 1101. The electrodes 1201-1, 1201-2, 1201-3, and 1201-4 are disposed opposite to the driver electrode 1109-1, detection electrode 1108-1, driver electrode 1109-2, and detection electrode 1108-2, respectively, over the vibrator 1101.

A magnet 1124 for electromagnetically driving the vibrator is installed under the first substrate 1100. The magnetic field is placed in a direction perpendicular to the first substrate 1100. As described in detail later, the magnet 1124 may be mounted on the second substrate 1200. Also, the magnet may be mounted on the underside of the first substrate 1100 and also on the top surface of the second substrate 1200. In addition, a thin magnet may be used as the magnet 1124 and buried in the first substrate 1100. Similarly, the magnet may be buried in the second substrate 1200. Additionally, the magnet 1124 may be mounted in a position opposite to the vibrator 1101 either via the first substrate 1100 or via the electrode 1201 and second substrate 1200.

In the angular velocity detector 1001, the driving amplitude of the vibrator 1101 can be set large because the vibrator is electromagnetically driven using the magnet 1124. Therefore, the displacement corresponding to the Coriolis force produced on application of an angular velocity can be set large. Furthermore, the gap between the second substrate 1200 and the vibrator 1101 can be narrowed by producing driving vibrations on the X-Y plane that is the main face of the vibrator 1101. The main face is in the form of an annular flat plate. Hence, the spacings between the electrodes of the displacement detection means, i.e., the space between the electrode 1201-1 and the detection electrode 1109-1 and the space between the electrode 1201-3 and the detection electrode 1109-2, can be narrowed. As a result, a high-sensitivity angular velocity detector producing large capacitance variations can be offered. Further, the electromagnetically driving interconnect is enabled by arranging the four springs at intervals of 90°. Displacements in two axial directions can be detected at the same time using the single vibrator 1101 by disposing the two pairs of electrodes, 1201-1 and 1201-3, and 1201-2 and 1201-4, on the side of the second substrate 1200.

Figure 3:
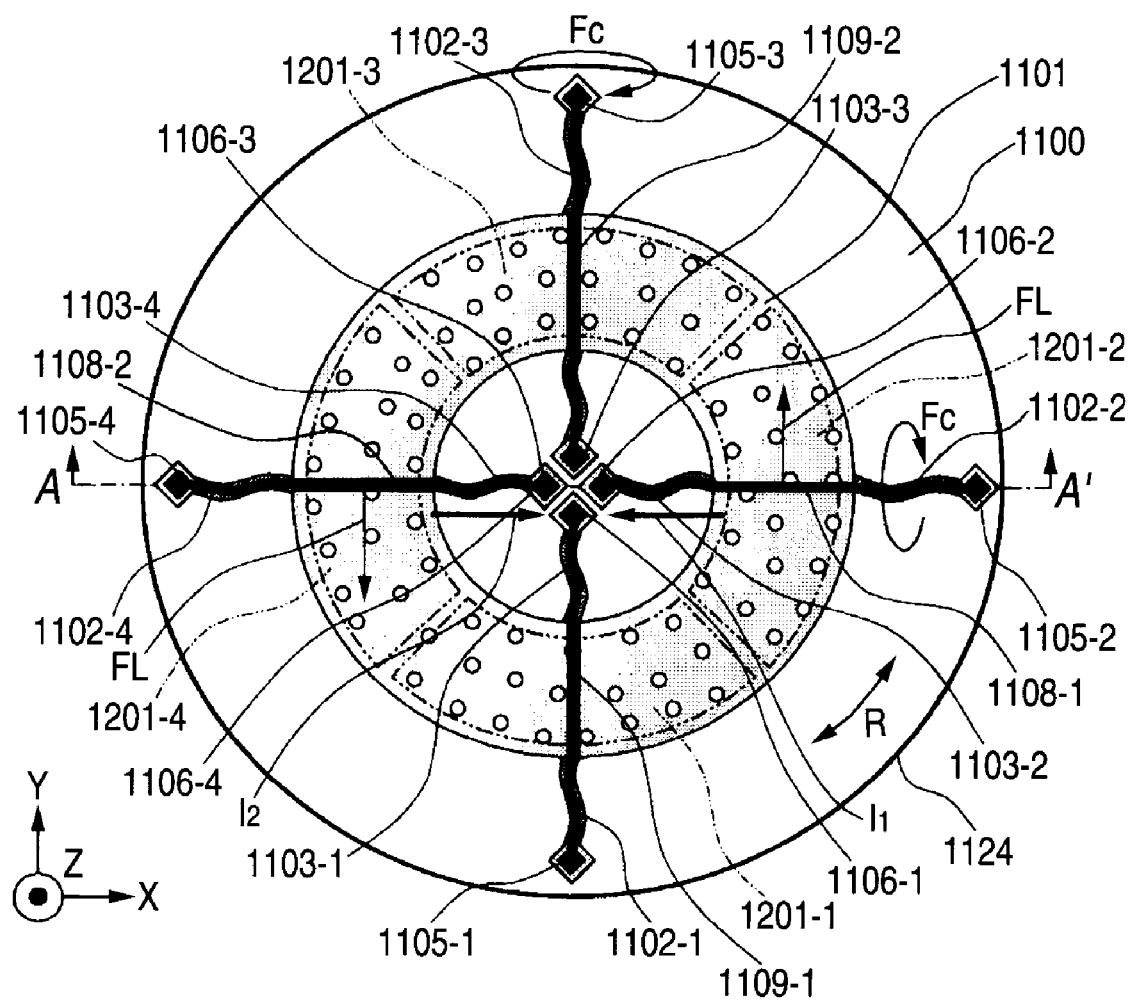
FIG. 3 is a schematic structural plan view illustrating a method of detecting an angular velocity implemented by an angular velocity detector of the invention.

A method of detecting angular velocities with the angular velocity detector of the invention already described in connection with FIGS. 1A-1B is next described by referring to FIG. 3.

An electrical current having a certain period flows from above the outer spring 1102-2, then over the vibrator 1101, and through the driver electrode 1108-1 from the side of the outer spring 1102-2 toward the inner spring 1103-2, the driver electrode 1108-1 being mounted over the inner spring 1103-2. For example, assume that an electrical current $I_1$ flows from the outer spring 1102-2 toward the inner spring 1103-2 at some instant of time. At this time, an electrical current $I_2$ shifted in phase by 180° is made to flow through the driver electrode 1108-2, it being noted that the driver electrodes 1108-1 and 1108-2 are symmetrical with respect to the center axis of the vibrator 1101. In this case, the current $I_2$ flows from the side of the outer spring 1102-4 toward the inner spring 1103-4.

Since the currents $I_1$ and $I_2$ have periodicity, the direction of flow may be reversed at other instant of time. If the currents $I_1$ and $I_2$ flow through the driver electrodes 1108-1 and 1108-2, the magnetic field produced from the magnet 124 disposed under the first substrate 1100 sets up a Lorentz force $F_L$. This Lorentz force $F_L$ is given by Eq. (1) and induced in a direction perpendicular to the driver electrodes 1108-1 and 1108-2.

$$F_L = IBL \quad (1)$$

where I is the electrical current flowing through the driver electrodes, B is the magnetic flux density, and L is the length of each driver electrode.

The Lorentz force $F_L$ is applied to the vibrator 1101 with the same periodicity as that of the applied currents $I_1$ and $I_2$. An amplitude motion is repeated under the condition that the outer support portion 1105-2 and inner support portion 1106-2 to which the outer spring 1102-2 and inner spring 1103-2 are connected are fixed points. An amplitude motion is repeated with a phase shift of 180° under the condition that the outer support portion 1105-4 and inner support portion 1106-4 connected with the other outer spring 1102-4 and inner spring 1103-4 are fixed points. Because of the motions, a rotary vibration R having some amplitude is given to the vibrator 1101. The axis of the rotary vibration is in the center of the structure of the vibrator. At this time, if an angular velocity $\Omega$ is given from the outside in the X-axis direction, the Coriolis force $F_C$ is produced in a direction perpendicular to the direction of vibrations. The Coriolis force $F_C$ is given by Eq. (2).

$$F_C = 2mv\Omega \quad (2)$$

where m is the mass of the vibrator, v is the vibration velocity in the direction along which the vibrator is driven, and $\Omega$ is the angular velocity applied from the outside.

To set large the displacement produced by the Coriolis force $F_C$, it is necessary to set large the mass m, driving angular frequency $\omega X$, and driving displacement Xm ($\omega X$ and Xm are parameters corresponding to the driving vibrational speed v). In the case of electromagnetic driving, it is possible to assume a large displacement because any comb-toothed electrode, which would have been necessary for electrostatic driving as in the prior art technique, is not necessary. If the Coriolis force $F_C$ around the Y-axis is produced, the vibrator 1101 vibrates around the Y-axis. At this time, the capacitance between the electrode 1201-2 and the vibrator 1101 and the capacitance between the electrode 1201-4 and the vibrator 1101 mounted on the side of the second substrate 1200 vary. On one hand, the vibrator 1101 tilts in the direction approaching the electrode 1201-2 or 1201-4 on the side of the second substrate 1200. On the other hand, the vibrator 1101 tilts in the direction going away from the electrode 1201-4 or 1201-2 on the side of the second substrate 1200. The applied angular velocity is calculated by detecting the difference between the capacitances.

It is important here that the electrodes 1201-2 and 1201-4 on the side of the second substrate 1200 are arranged opposite to each other and symmetrically with respect to the center axis of the vibrator 1101. When an angular velocity is applied, the capacitance between the electrode 1201-2 and the vibrator 1101 and the capacitance between the electrode 1201-4 and the vibrator are different in amount of produced variation. However, when a translational acceleration is applied, the produced variations of the capacitances do not differ and so any capacitance difference is not produced if their difference is taken. Consequently, a structure is achieved which can remove the acceleration component produced when an angular velocity is applied.

In the foregoing description, an angular velocity is applied around the X-axis. A similar situation occurs when an angular velocity is applied around the Y-axis. At this time, it follows that the capacitance variations produced between the electrode 1201-1 and the vibrator 1101 and between the electrode 1201-3 and the vibrator 1101 are detected.

Therefore, in the structure of the above-described angular velocity detector 1001, angular velocities in two axial directions can be detected at the same time using the single vibrator 1101.

When the Lorentz force $F_L$ is produced, an induced electromagnetic force is produced across the detection electrode 1109-1 which is disposed over the vibrator 1101 and which extends over the outer spring 1102-1 and over the inner spring 1103-1 so as to connect them. Similarly, an induced electromotive force is produced across the detection electrode 1109-2 that is disposed over the vibrator 1101, the electrode 1109-2 being disposed over the outer spring 1102-3 and inner spring 1103-3 so as to connect them. These induced electromotive forces are produced at the same period as the Lorentz force $F_L$. When a capacitance variation is read, a carrier wave is superimposed between the electrode 1201 and the vibrator 1101 on the side of the second substrate (not shown). An electrical current produced by the capacitance variation is amplified, whereby an actual signal is taken. The carrier wave is removed by synchronous detection. With respect to the driving wave, an AC signal corresponding to the angular velocity can be taken out by detecting the wave with the periodic component of the induced electromotive force.

In the angular velocity detector 1001 of the invention, the space between the second substrate 1200 and the vibrator 1101 can be narrowed by producing driving vibrations on the annular flat X-Y plane that is the main face of the vibrator 1101. Therefore, the spaces between the electrodes of the displacement detection means, i.e., the space between the electrode 1201-1 and the detection electrode 1109-1 and the space between the electrode 1201-3 and the detection electrode 1109-2, can be narrowed. Consequently, a high-sensitivity angular velocity detector producing large capacitance variations can be offered.

Embodiment 2

One embodiment associated with a method of fabricating an angular velocity detector of the invention is next described by referring to schematic cross sections and schematic plan views of FIGS. 4A to 13C illustrating a fabrication sequence. Here, as an example, a method of fabricating the angular velocity detector of the above-described Embodiment 1 is described.

Figure 4A:
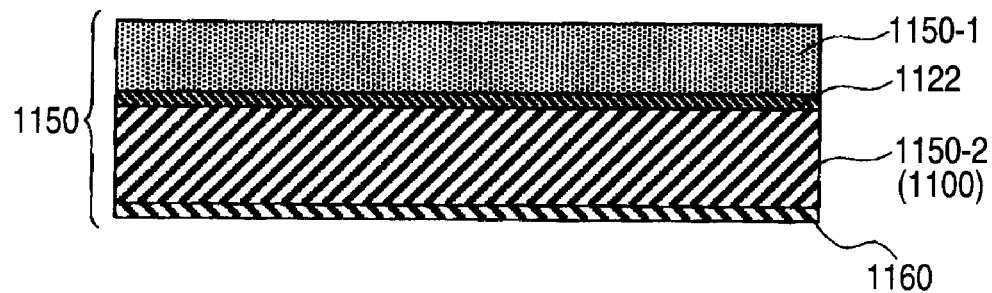
FIGS. 4A-4C are schematic cross sections showing one embodiment associated with a method of fabricating an angular velocity detector (Embodiment 2) in accordance with the invention.

As shown in FIG. 4A, an SOI (silicon-on-insulator) substrate 1150 having the insulator layer 1122 sandwiched between an upper silicon layer 1150-1 and a lower silicon layer 1150-2 is used. The insulator layer 1122 is made, for example, of a film of silicon oxide ($SiO_2$). Here, the lower silicon layer 1150-2 corresponds to the first substrate 1100 of the above-described Embodiment 1. The silicon layer is described as the first substrate 1100. A vibrator and resilient support bodies (such as springs) are fabricated from this SOI substrate 1150. A masking layer 1160 is formed on the surface of the lower silicon layer 1150-2. The masking layer can be made, for example, of an insulator film such as a film of resist or silicon oxide.

Figure 4B:
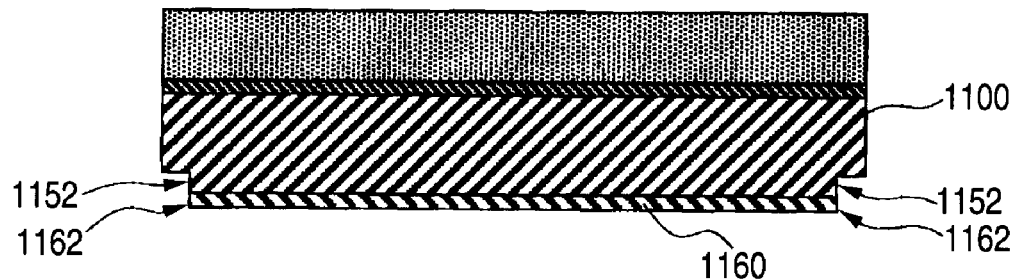

First, as shown in FIG. 4B, where the masking layer 1160 is made of a film of resist, the resist film is exposed by an ordinary lithography technique and then developed to form alignment marks and a mark pattern 1162 on the masking layer 1160. The alignment marks are used for alignment with a second substrate (not shown). The mark pattern becomes dicing lines. Where the masking layer 1160 is an inorganic film such as a silicon oxide film, alignment marks used for alignment with the second substrate (not shown) and the mask pattern 1162 becoming dicing lines are formed by an etching technique using an etching mask of an ordinary resist. Then, using the masking layer 1160 as an etching mask, alignment marks used for alignment with the second substrate (not shown) and marks 1152 becoming dicing lines are formed on the first substrate 1100. These act as indicia during alignment and when the first substrate 1100 is cut out during anodic bonding of the first substrate 1100 and second substrate (not shown) consisting of a silicon substrate (described later).

Figure 4C:
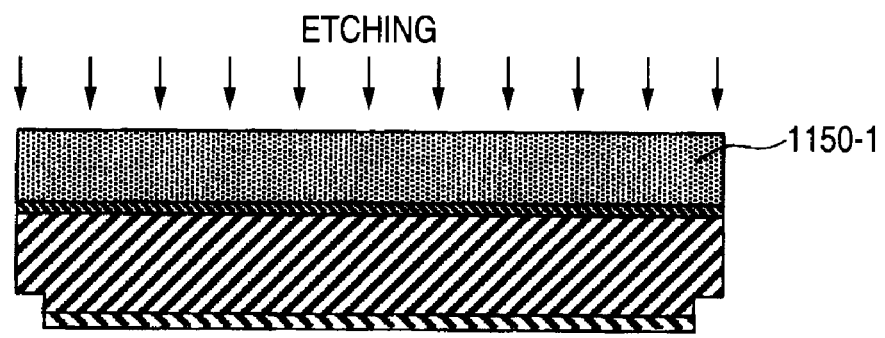

Then, as shown in FIG. 4C, the whole surface of the SOI substrate 1150 on the side of the upper silicon layer 1150-1 is etched such that the upper silicon layer 1150-1 assumes a desired film thickness. This method of etching can be implemented by wet etching using tetramethyl ammonium hydroxide (TMAH) or potassium hydroxide (KOH) or by chemical or physical dry etching. If the desired film thickness of the upper silicon layer 1150-1 is previously known, an SOI substrate having the upper silicon layer 1150-1 of the desired film thickness may be prepared.

Figure 5A:
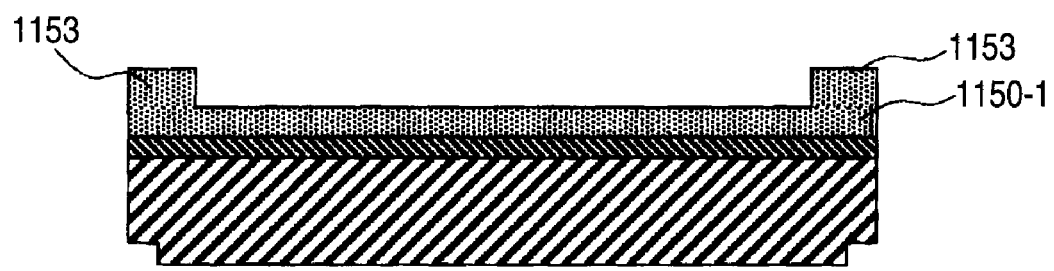
FIGS. 5A-5C are schematic cross sections showing one embodiment associated with a method of fabricating an angular velocity detector (Embodiment 2) of the invention.

Then, as shown in FIG. 5A, an anodic bonding frame 1153 is formed by processing the upper silicon layer 1150-1 by normal lithography technique and etching technique. This method of etching can be implemented by wet etching using tetramethyl ammonium hydroxide (TMAH) or potassium hydroxide (KOH) or by chemical or physical dry etching. This etching determines the film thickness of the vibrator.

Figure 5B:
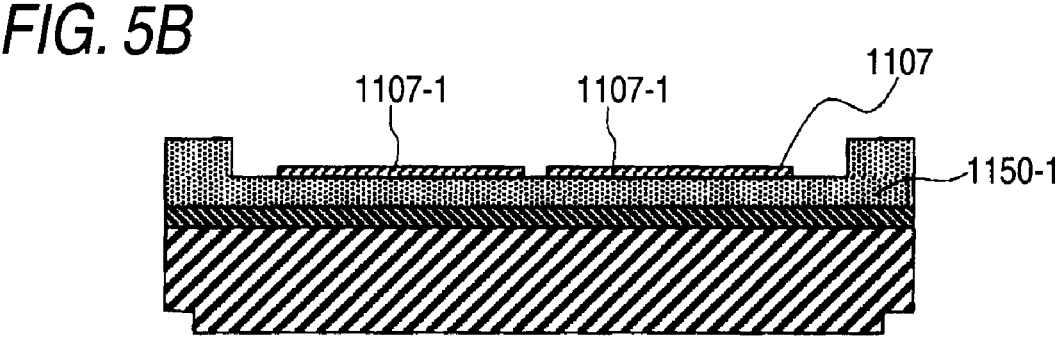
Figure 6:
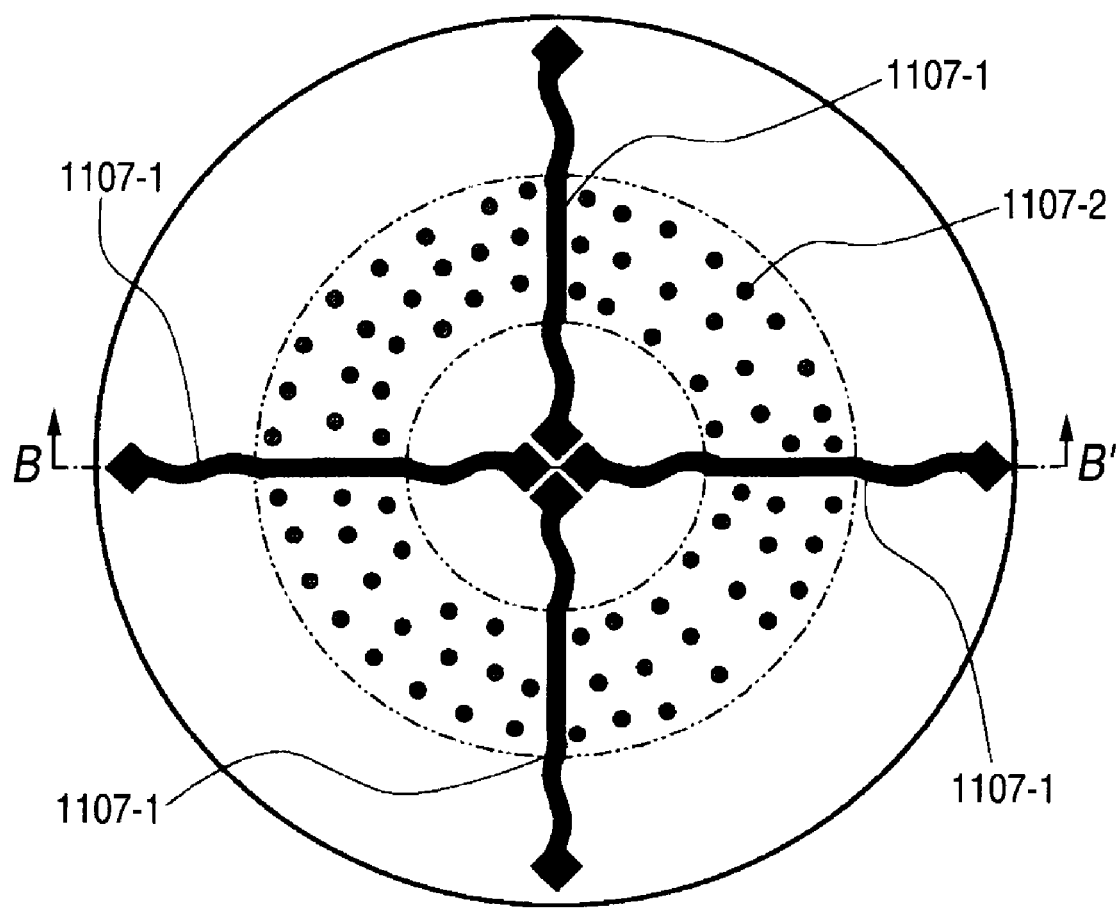
FIG. 6 is a schematic plan view showing one embodiment associated with a method of fabricating an angular velocity detector (Embodiment 2) of the invention.

Then, as shown in FIGS. 5B and 6, the insulator film 1107 is formed on the upper silicon layer 1150-1 and then the insulator film 1107 is patterned using a lithography or etching technique to form an insulator film 1107-1 over parts of a planned region of the vibrator, over planned regions of springs, and over planned regions of support portions. Also, an insulator film 1107-2 becoming a stopper for the vibrator is formed. The insulator film 1107-2 is so positioned that it does not overlap the positions at which holes are formed in the vibrator in a subsequent process step. Any film can be used as the insulator film 1107 as long as it can maintain the insulation between the electrode and the lower silicon layer 1150-2. For example, the insulator film can be made of silicon oxide ($SiO_2$) or silicon nitride (SiN). Since the insulator film 1107-2 is formed over the planned region of the vibrator, the insulation can be maintained when the vibrator and the electrodes on the second substrate side touch each other. FIG. 5B is a cross-sectional view taken on line B-B' of FIG. 6. Note that FIGS. 5B and 6 are not always drawn to the same scale.

Figure 5C:
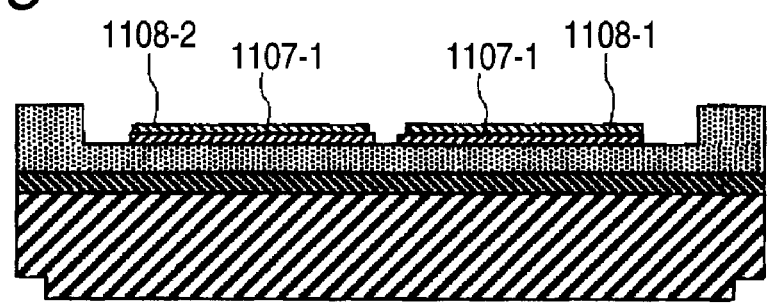
Figure 7:
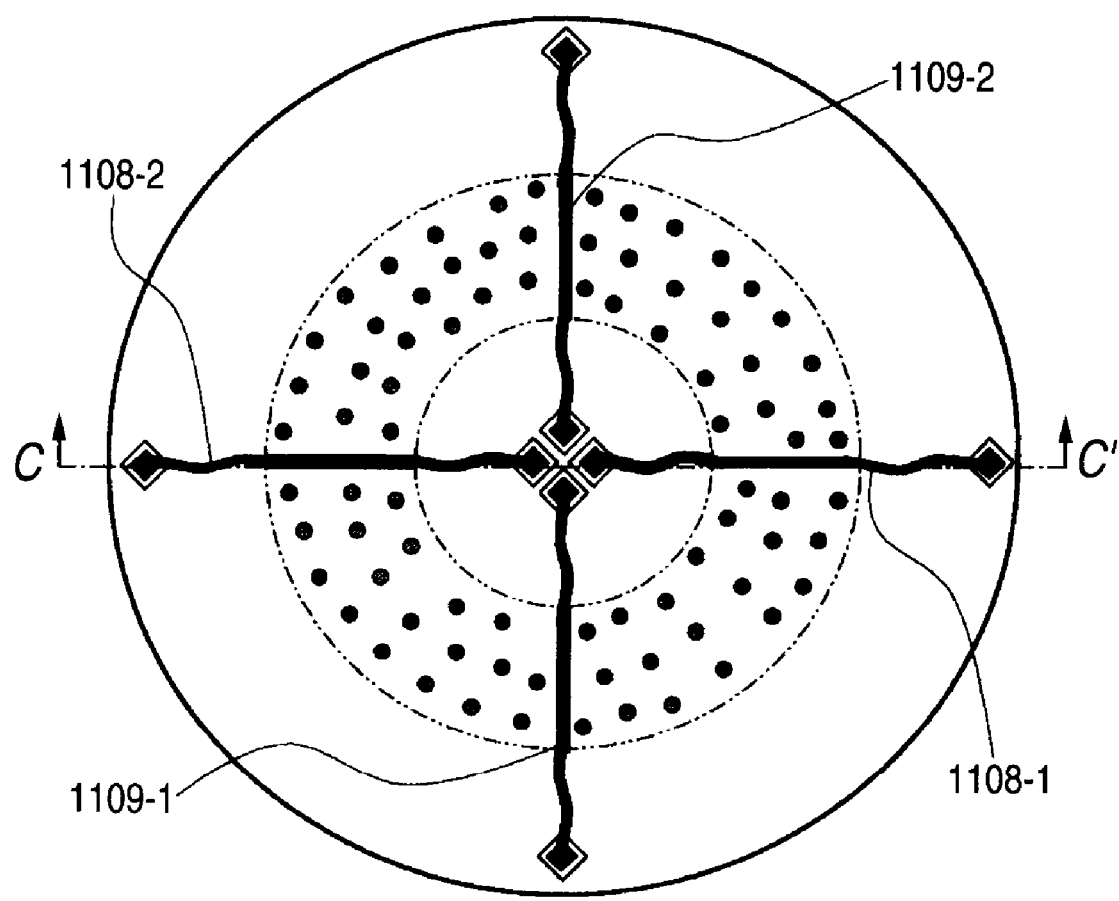
FIG. 7 is a schematic plan view showing one embodiment associated with a method of fabricating an angular velocity detector (Embodiment 2) of the invention.

Then, as shown in FIGS. 5C and 7, driver electrodes (interconnects) 1108-1, 1108-2 for application of a Lorentz force and detection electrodes (interconnects) 1109-1, 1109-2 (not shown in FIG. 5C) for detection of an induced electromotive force are formed on the insulator film 1107-1 (not shown in FIG. 7). The interconnect material is formed by electron beam evaporation. In the present embodiment, the patterning of the interconnects can be done by a lift-off method. Alternatively, after forming a mask by a lithography technique, the patterning may be done by wet etching or dry etching using the mask. Also, in the present embodiment, a three-layer metal material of gold, platinum, and chromium is used as an interconnect material. A three-layer metal material of gold, platinum, and titanium may also be used. Furthermore, two-layer metal materials such as gold-chromium, gold-platinum, and gold-titanium may also be used. Instead of the titanium, a laminate material of titanium nitride and titanium may be used. In addition, copper may be used instead of chromium or titanium. A sputtering method or CVD process can be used as the method of formation. FIG. 5C is a cross-sectional view taken on line C-C' of FIG. 7. Note that FIGS. 5C and 7 are not always drawn to the same scale.

Figure 8A:
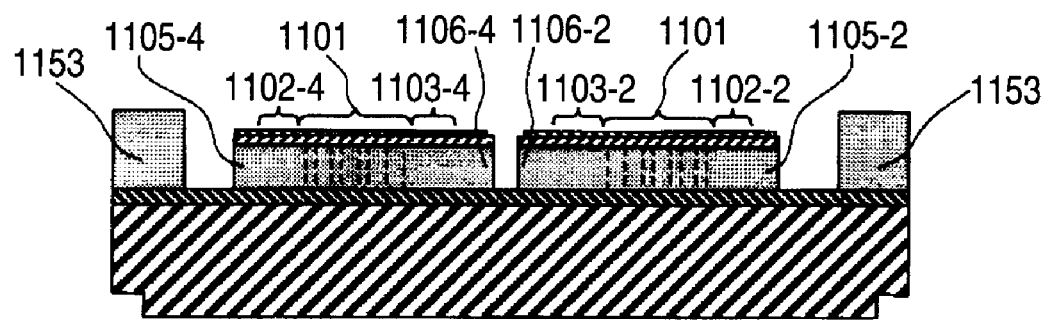
FIGS. 8A-8B are schematic cross sections showing one embodiment associated with a method of fabricating an angular velocity detector (Embodiment 2) of the invention.
Figure 9:
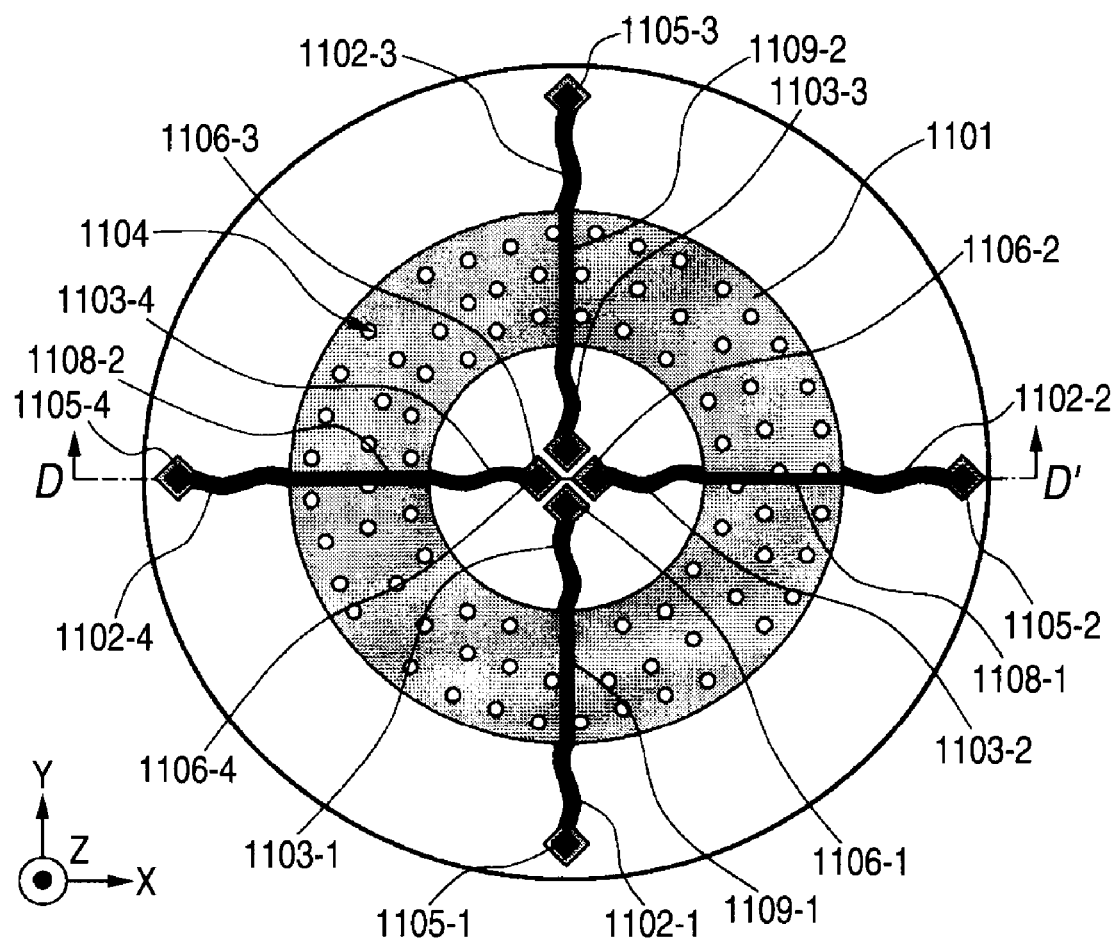
FIG. 9 is a schematic plan view showing one embodiment associated with a method of fabricating an angular velocity detector (Embodiment 2) of the invention.

Then, as shown in FIGS. 8A and 9, a mask for the vibrator, springs, and a frame for anodic bonding is built by an ordinary lithography technique. Using an etching technique employing the mask, the vibrator 1101, outer springs 1102-1, 1102-2, 1102-3, and 1102-4 for supporting outer peripheral portions of the vibrator 1101, support portions 1105-1, 1105-2, 1105-3, and 1105-4 for supporting the outer springs 1102-1, 1102-2, 1102-3, and 1102-4 that support the outer peripheral portions, inner springs 1103-1, 1103-2, 1103-3, and 1103-4 for supporting inner portions of the vibrator 1101, and support portions 1106-1, 1106-2, 1106-3, and 1106-4 for supporting the inner springs 1103-1, 1103-2, 1103-3, and 1103-4 are formed. The frame 1153 for anodic bonding is also formed. For example, reactive ion etching can be used as the aforementioned etching. During the etching step for forming the vibrator 1101, a number of through-holes 1104 are preferably formed in the vibrator 1101. Where the inside of the surface of the vibrator 1101 is partitioned into small regions, the through-holes 1104 may be arranged at random if the through-holes 1104 in each region are distributed at a uniform density. The through-holes may also be arranged at equal intervals. In the plan view of FIG. 9, the insulator film 1107 is omitted. FIG. 8A is a cross-sectional view taken on line D-D' of FIG. 9. Note that FIGS. 8A and 9 are not always drawn to the same scale.

As a result, the support portion 1105-2, outer spring 1102-2, vibrator 1101, inner spring 1103-2, and support portion 1106-2 are formed while carrying the driver electrode 1108-1 thereover via the insulator film 1107. The support portion 1105-4, outer spring 1102-4, vibrator 1101, inner spring 1103-4, and support portion 1106-4 are formed while carrying the driver electrode 1108-2 thereover via the insulator film 1107. Furthermore, the support portion 1105-1, outer spring 1102-1, vibrator 1101, inner spring 1103-1, and support portion 1106-1 are formed while carrying the detection electrode 1109-1 thereover via the insulator film 1107. The support portion 1105-3, outer spring 1102-3, vibrator 1101, inner spring 1103-3, and support portion 1106-3 are formed while carrying the detection electrode 1109-2 thereover via the insulator film 1107.

Figure 8B:
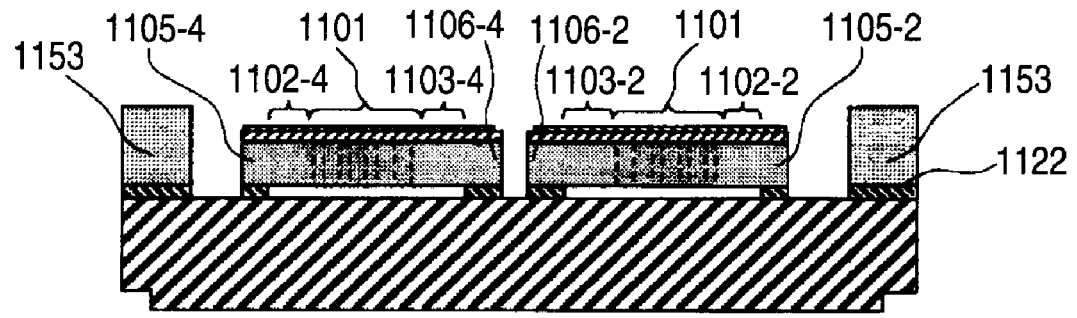
Figure 10:
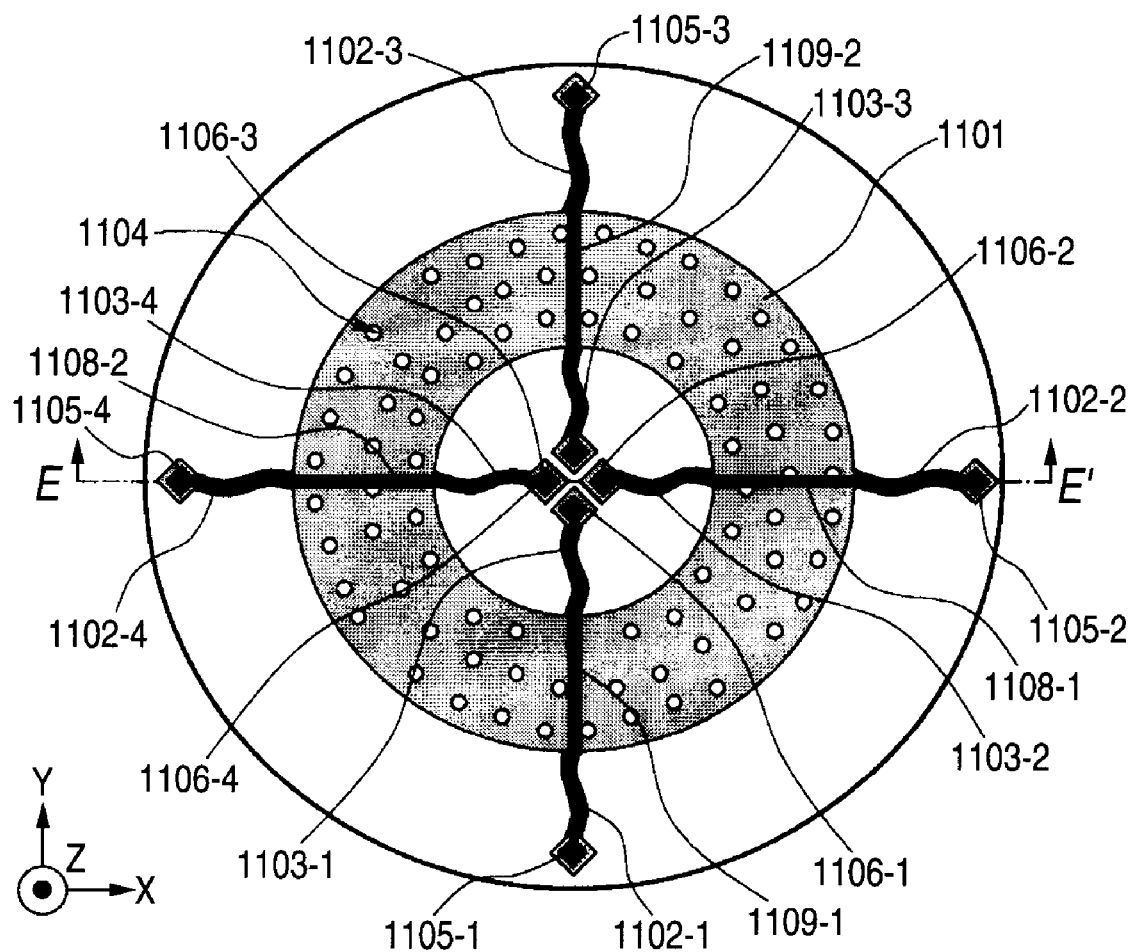
FIG. 10 is a schematic plan view showing one embodiment associated with a method of fabricating an angular velocity detector (Embodiment 2) of the invention.

Finally, as shown in FIGS. 8B and 10, the insulator layer 1122 is etched away. At this time, the portions of the insulator layer 1122 which are under the support portions 1105-1, 1105-2, 1105-3, and 1105-4, under the support portions 1106-1, 1106-2, 1106-3, and 1106-4, and under the frame 1153, respectively, are left unetched and connected with the first substrate 1100. The other portions become a hollow structure. In consequence, the vibrator 1101, outer springs 1102-1, 1102-2, 1102-3, and 1102-4 supporting the vibrator 1101, and inner springs 1103-1, 1103-2, 1103-3, and 1103-4 are poised. FIG. 8B is a cross-sectional view taken on line E-E' of FIG. 10. Note that FIGS. 8B and 10 are not always drawn to the same scale.

A method of fabricating the second substrate is next described.

Figure 11A:
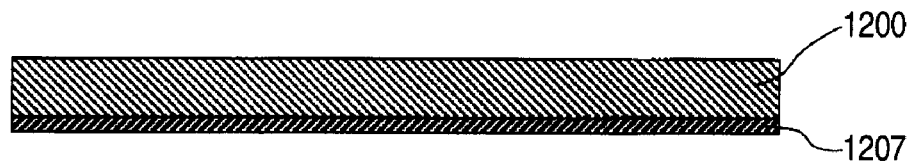
FIGS. 11A-11C are schematic cross sections showing one embodiment associated with a method of fabricating an angular velocity detector (Embodiment 2) of the invention.

As shown in FIG. 11A, an electrode (interconnect) material layer 1207 is formed on the second substrate 1200 by electron beam evaporation. For example, a glass substrate can be used as the second substrate 1200. A three-layer metal material of gold, platinum, and chromium can be used as the electrode material. Furthermore, a three-layer metal material of gold, platinum, and titanium may also be used. In addition, a two-layer metal material such as gold-chromium, gold-platinum, platinum-chromium, gold-titanium, or platinum-titanium may also be used. Instead of the titanium, a laminate material of titanium nitride and titanium may be used. In addition, copper may be used instead of chromium or titanium. A sputtering method or CVD process may be used as the method of formation.

Figure 11B:
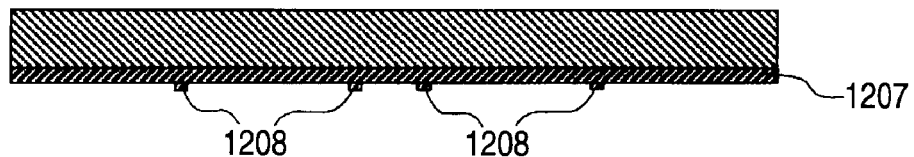

Then, as shown in FIG. 11B, a contact portion 1208 is formed on the surface of the electrode material layer 1207 by an electrolytic plating method. For example, the contact portion 1208 is formed by gold plating. This makes contact with the electrodes on the first substrate (see the above-referenced FIG. 9(k)) after the anodic bonding. Accordingly, the contact portion is formed in positions opposite to the contact portions of the electrodes formed on the first substrate after the anodic bonding. In the present embodiment, an electrolytic plating method is used. However, the contact portion is formed also by an electroless plating method.

Figure 11C:
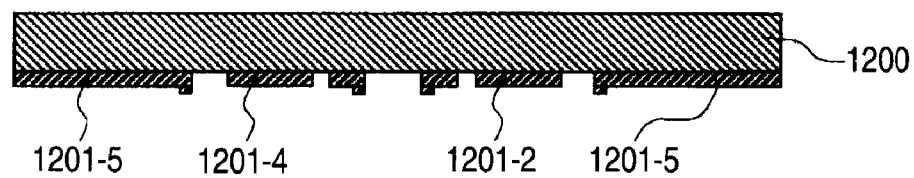
Figure 12:
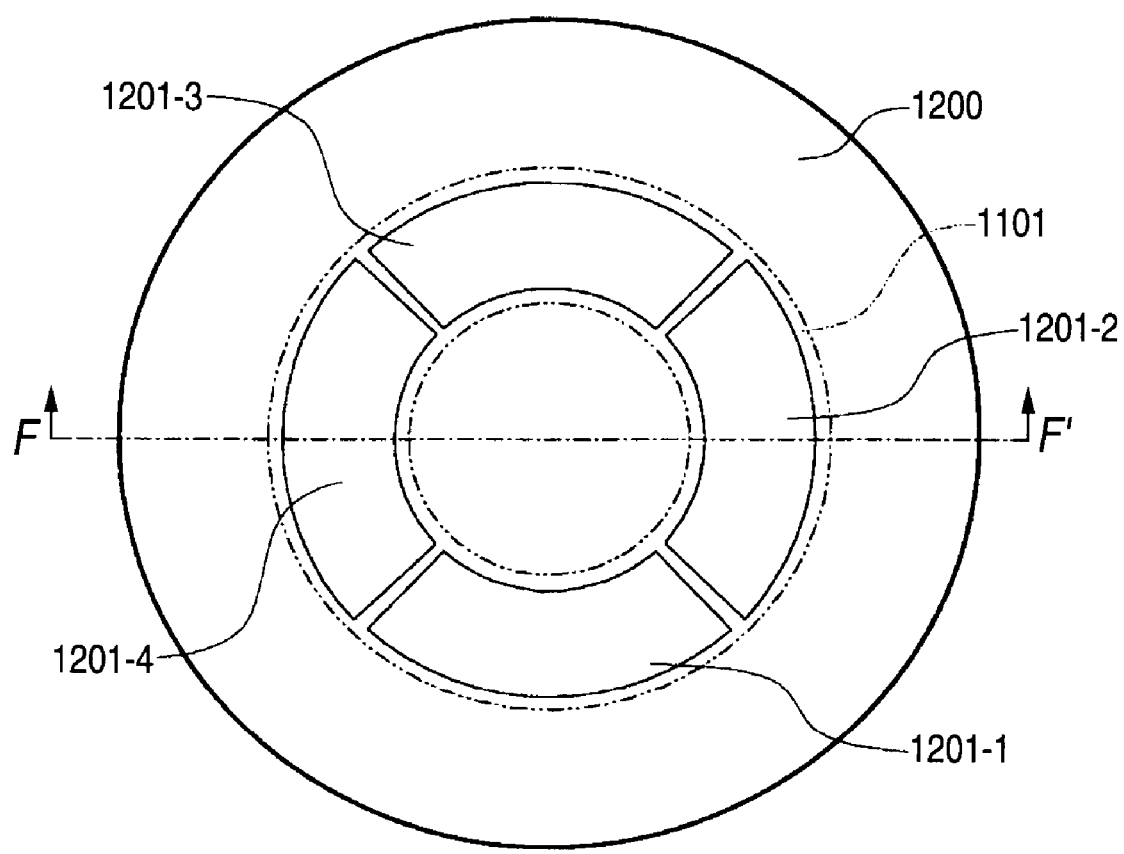
FIG. 12 is a schematic plan view showing one embodiment associated with a method of fabricating an angular velocity detector (Embodiment 2) of the invention.

Then, as shown in the electrode layout diagrams of FIGS. 11C and 12, after forming a mask for forming electrodes by lithography technique, the electrode material layer 1207 is patterned by an etching technique using the mask to form electrodes 1201-1, 1201-2, 1201-3, 1201-4 on the side of the second substrate 1200 and extraction electrodes 1201-5. That is, the electrodes 1201-2 and 1201-4 are disposed in positions rotated through 90° from the electrodes 1201-1 and 1201-3. The double-dot-dash lines in the plan views indicate the position at which the vibrator 1101 is disposed. FIG. 11C is a cross-sectional view taken on line F-F' of FIG. 12. Note that FIGS. 11C and 12 are not always drawn to the same scale.

Figure 13A:
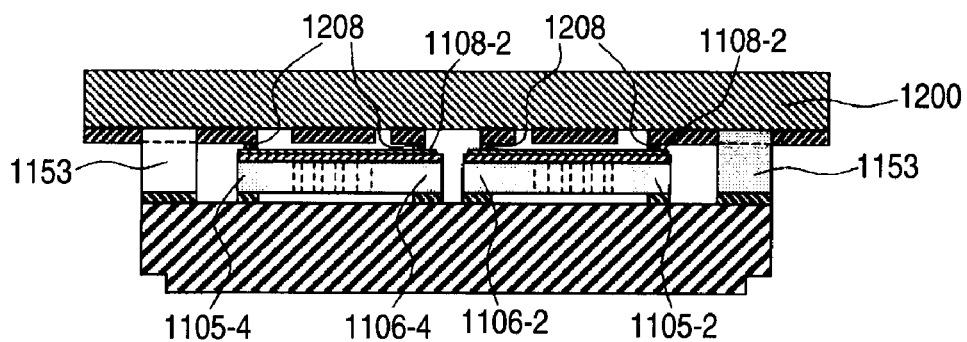
FIGS. 13A-13C are schematic cross sections showing one embodiment associated with a method of fabricating an angular velocity detector (Embodiment 2) of the invention.
Figure 13B:
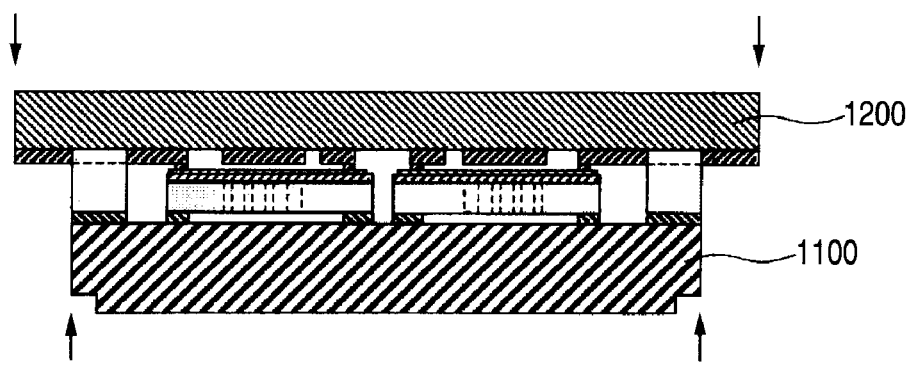
Figure 13C:
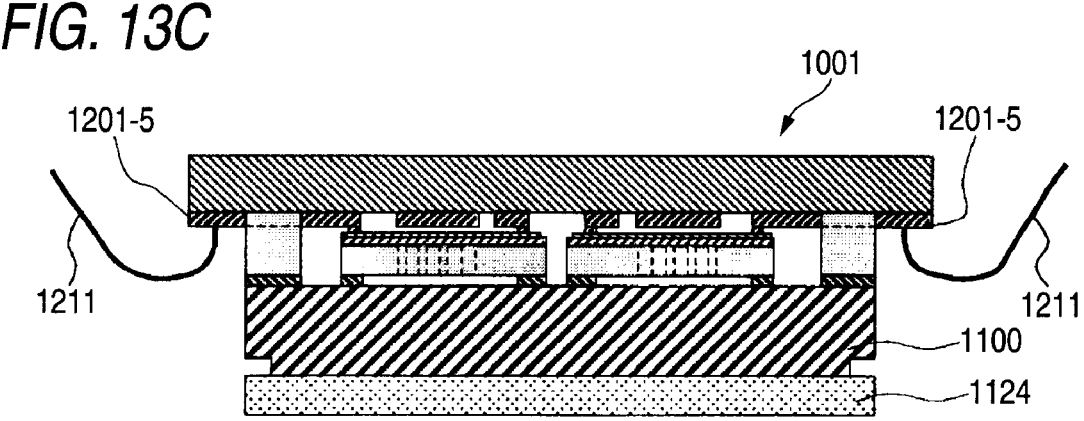

A method of assembling the first and second substrates is next described by referring to FIGS. 13A-13C.

Then, as shown in FIG. 13A, the second substrate 1200 made of a glass substrate and the frame 1153 made of silicon are bonded together by an anodic bonding method. At this time, the contact portions 208 are brought into contact with the pad portions of the driver electrodes 1108-1, 1108-2 and with the pad portions of the detection electrodes 1109-1, 1109-2 (see the above-referenced FIG. 10). The driver electrodes 1108-1 and 1108-2 are formed on the support portions 1105-2, 1105-4 and support portions 1106-2, 1106-4 and act to produce a Lorentz force. The detection electrodes 1109-1 and 1109-2 are formed on the support portions 1105-1, 1105-3 and on the support portions 1106-1, 1106-3 and act to detect an induced electromotive force produced when the vibrator is electromagnetically driven to operate.

Then, as shown in FIG. 13B, the portions of the first substrate 1100 and second substrate 1200 indicated by the arrows, for example, are cut by dicing into individual chips.

Finally, as shown in FIG. 13C, the magnet 1124 is formed under the first substrate 1100. A wire 1211 is brought out, for example, by wire bonding using the extraction electrodes 1120-5. Thus, a chip for the angular velocity detector 1001 is fabricated.

In the method of fabricating the angular velocity detector of the invention, the outer springs 1102-1 to 1102-4 and inner springs 1103-1 to 1103-4 are formed simultaneously with the vibrator 1101 using the upper silicon layer 1201-1 formed on the insulator layer 1122. Therefore, the vibrator can be formed such that it is supported by the springs. Furthermore, the magnet is mounted as an excitation means. Consequently, an angular velocity detector is fabricated in which the driving amplitude can be set large by electromagnetically driving the vibrator using the magnet. For this reason, the angular velocity detector fabricated by the method of fabrication of the invention has the advantage that the displacement corresponding to the Coriolis force produced on application of an angular velocity can be set large. In addition, the spacings between the electrodes of the displacement detection means can be narrowed by producing driving vibrations on the X-Y plane and adjusting the thickness of the upper silicon layer 1201-1 forming the frame 1153 during formation of the upper silicon layer. There is the advantage that a high-sensitivity angular velocity detector producing large capacitance variations can be offered. The driver electrodes 1108-1, 1108-2 becoming electromagnetically driving interconnects and the detection electrodes 1109-1, 1109-2 can be formed by arranging the four outer springs 1102-1 to 1102-4 and inner springs 1103-1 to 1103-4 at intervals of 90 degrees. There is the advantage that a structure can be fabricated which permits simultaneous detection of angular velocities in two axial directions using the single vibrator 1101 by disposing the two pairs of electrodes 1201-1 to 1201-4 on the side of the second substrate 1200.

Embodiment 3

With respect to the shapes of the inner and outer springs described in the above-described Embodiments 1 and 2, another structure is described next by referring to FIGS. 14-16. As typical ones of them, the outer spring 1102 and inner spring 1103 are shown here. However, the above-described outer spring 1102-1 and inner spring 1103-1, the outer spring 1102-2 and inner spring 1103-2, the outer spring 1102-3 and inner spring 1103-3, and the outer spring 1102-4 and inner spring 1103-4 can also assume a similar structure.

Figure 14:
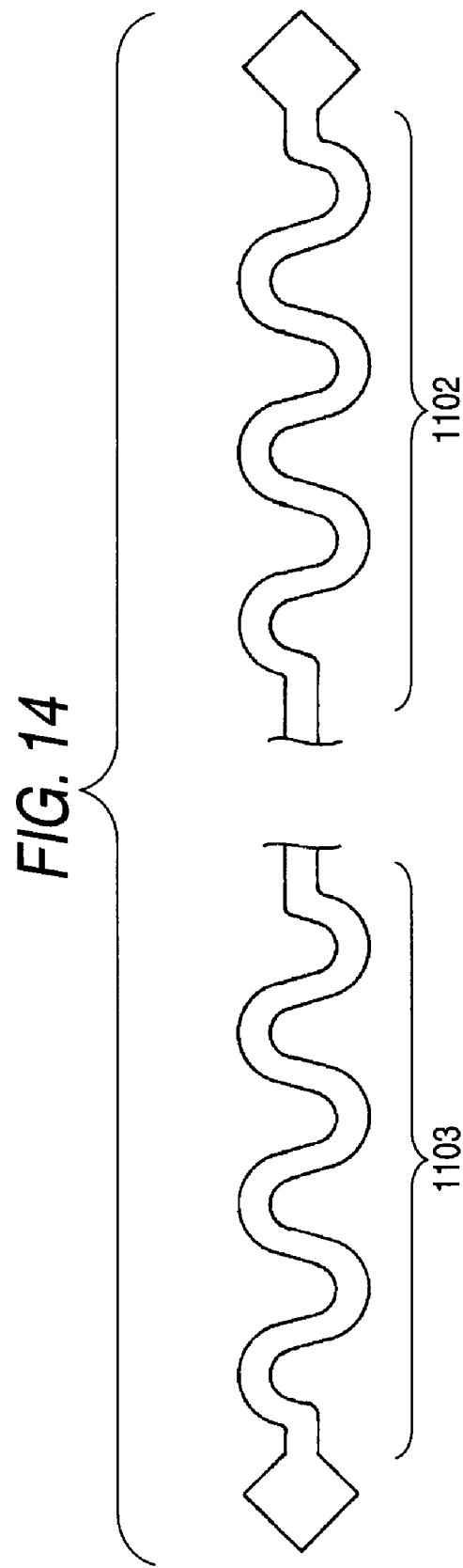
FIG. 14 is a schematic plan view showing one embodiment of the shape of resilient support bodies (Embodiment 3)

As shown in FIG. 14, the inner spring 1103 and outer spring 1102 are shaped wavily when viewed on a plane. The number of folds may be one or more. Preferably, the bent portion of each spring is rounded as shown. The rounding improves the durability of the spring. Furthermore, the bent portion of the driver electrode (not shown) formed on each spring is preferably rounded for the same reason as for the springs.

Figure 15:
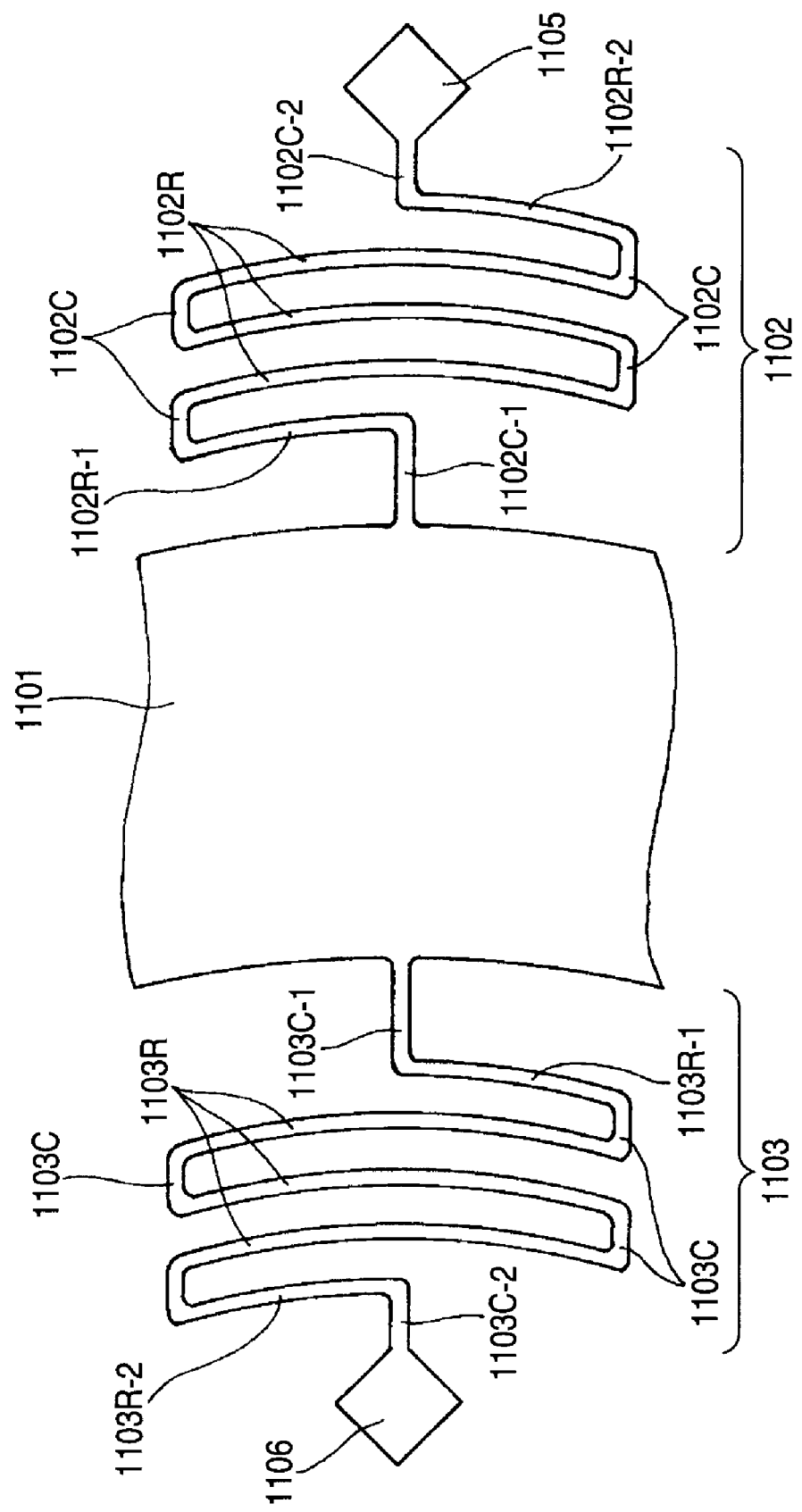
FIG. 15 is a schematic plan view showing one embodiment of the shape of the resilient support bodies (Embodiment 3)

As shown in FIG. 15, each of the inner spring 1103 and outer spring 1102 has plural semi-arcuate portions 1103R and 1102R when viewed on a plane. The adjacent ends of the semi-arcuate portions 103R are alternately connected continuously by connector portions 1103C. The adjacent ends of the semi-arcuate portions 1102R are alternately connected continuously by connector portions 1102C. Respective one ends of the semi-arcuate portions 1103R-1 and 1102R-1 on the side of the vibrator 1101 are connected with the vibrator 1101 via connector portions 1103C-1 and 1102C-1. One end of the semi-arcuate portion 1102R-2 on the side of the support portion 1105 is connected with the support portion 1105 via a connector portion 1102C-2. One end of the semi-arcuate portion 1103R-2 on the side of the support portion 1106 is connected with the support portion 1106 via a connector portion 1103C-2. Preferably, the bent portion of each spring is rounded as shown. The rounding improves the durability of the spring. Also, the bent portion of the driver electrode (not shown) formed on each spring is preferably rounded for the same reason as for the springs. The semi-arcuate portions can be formed semi-arcuately along the outer or inner surface of the vibrator 1101, for example.

Figure 16:
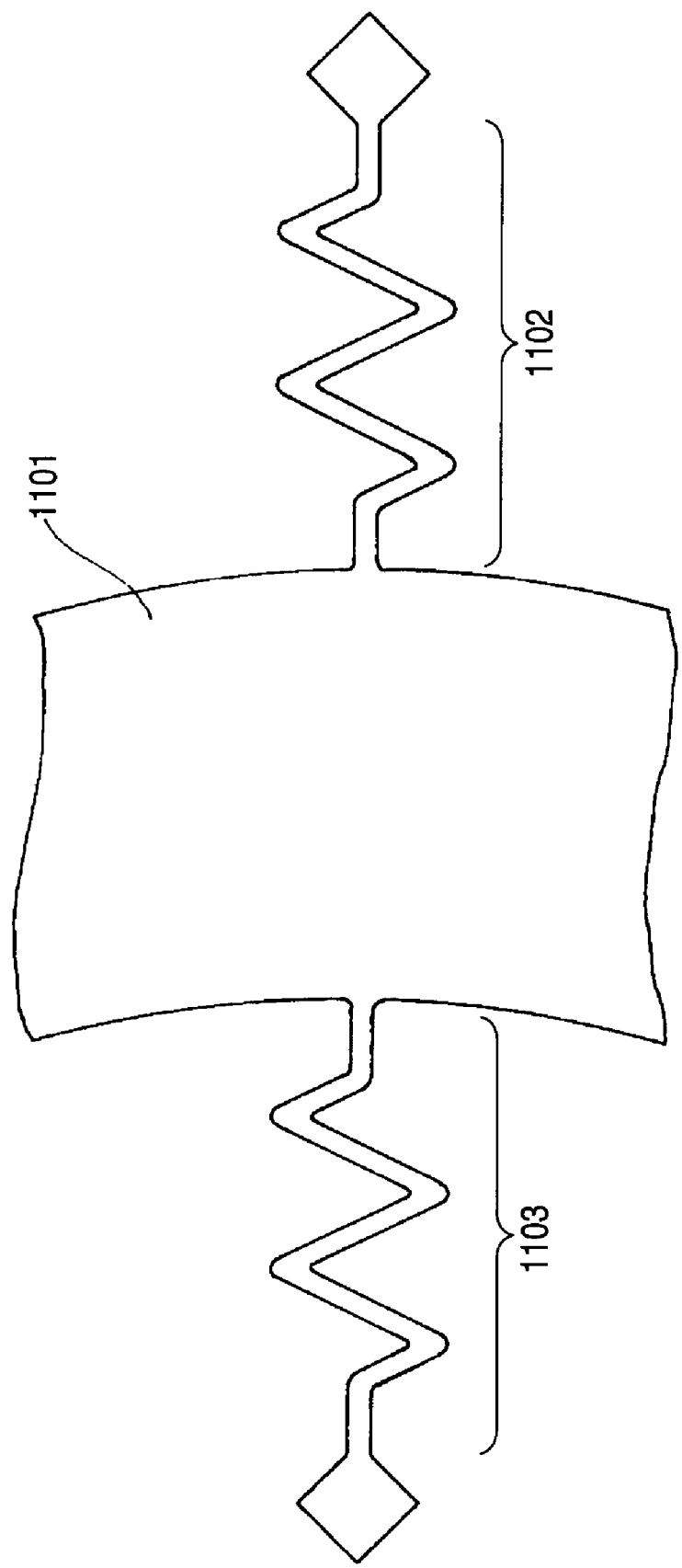
FIG. 16 is a schematic plan view showing one embodiment of the shape of the resilient support bodies (Embodiment 3)

As shown in FIG. 16, the inner spring 1103 and outer spring 1102 can be formed like fold lines as viewed on a plane. The number of folds may be one or more. At this time, the inner spring 1103 is preferably disposed perpendicularly (normal) to the arcuate shape inside the vibrator 1101. The outer spring 1102 is preferably disposed perpendicularly (normal) to the arcuate shape outside the vibrator 1101, for the following reason. The electrodes formed on the inner spring 1103 and the outer spring 1102 can pick up large displacements of the vibrator 1101. Preferably, the bent portion of each spring is rounded as shown. The rounding improves the durability of the spring. The bent portion of the driver electrode (not shown) formed on each spring is preferably rounded for a similar reason to that of the springs.

The width of displacement of the springs can be increased by increasing the total length of the springs as in the structure described already in connection with FIGS. 2 and 14-16. Therefore, the vibrator 101 can assume large displacements. It is anticipated that the accuracy at which angular velocities are detected will be improved.

Embodiment 4

Figure 17A:
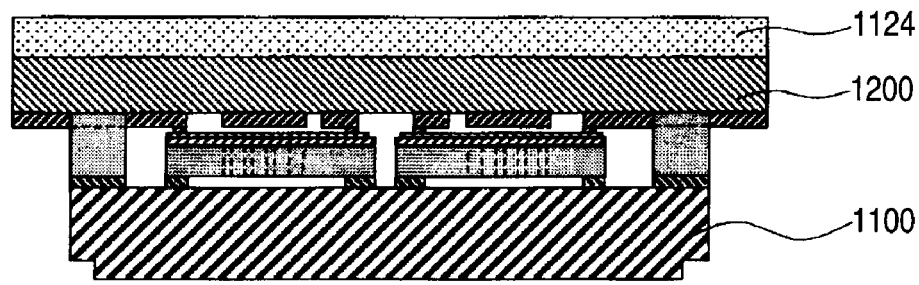
FIGS. 17A-17C are schematic cross sections showing another embodiment associated with an angular velocity detector (Embodiment 4) of the invention.

In the above-described Embodiment 1, the magnet 1124 is disposed under the first substrate 1100 consisting of silicon, i.e., on the underside of the first substrate 1100 on the opposite side of the second substrate 1200 as viewed from the first substrate 1100, as shown in the above-referenced FIGS. 1A and 1B. As shown in FIG. 17A, the magnet 1124 may be disposed over the second substrate 1200 consisting of a glass substrate, i.e., on the top surface of the second substrate 1200 facing away from the first substrate 1100 as viewed from the second substrate 1200.

Figure 17B:
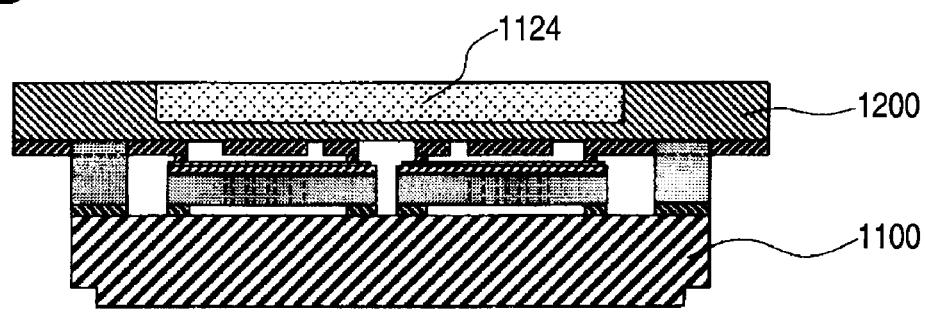

Furthermore, as shown in FIG. 17B, the magnet 1124 may be disposed in an upper part of the second substrate 1200 consisting of a glass substrate, i.e., buried in the top surface of the second substrate 1200 on the opposite side of the first substrate 1100 as viewed from the second substrate 1200.

Figure 17C:
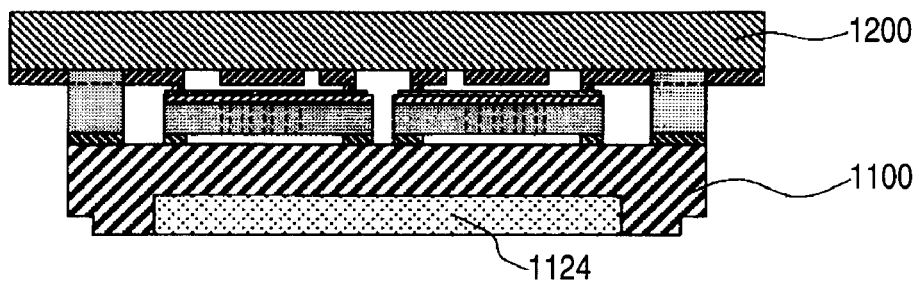

Furthermore, as shown in FIG. 17C, the magnet 1124 may be disposed under the first substrate 1100 consisting of a glass substrate, i.e., buried in the lower surface of the first substrate 1100 on the opposite side of the second substrate 1200 as viewed from the first substrate 1100.

Figure 18A:
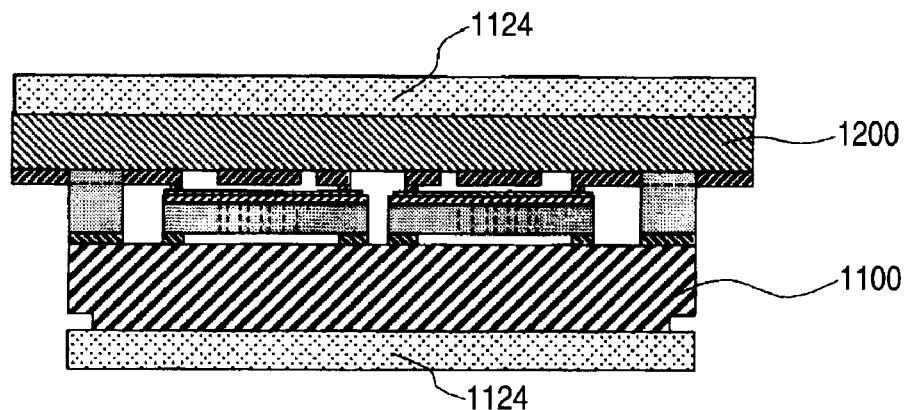
FIGS. 18A-18C are schematic cross sections showing another embodiment associated with an angular velocity detector (Embodiment 4) of the invention.

In addition, as shown in FIG. 18A, the magnet 1124 may be disposed over the second substrate 1200 consisting of a glass substrate, i.e., on the top surface of the second substrate 1200 on the opposite side of the first substrate 1100 as viewed from the second substrate 1200. Also, the magnet may be disposed under the first substrate 1100 consisting of a glass substrate, i.e., on the underside of the first substrate 1100 on the opposite side of the second substrate 1200 from the first substrate 1100.

Figure 18B:
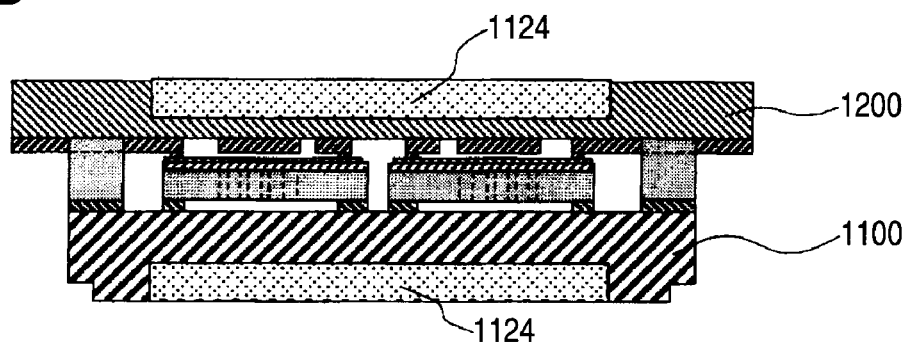

As shown in FIG. 18B, the magnet 1124 may be disposed in an upper part of the second substrate 1200 consisting of a glass substrate, i.e., buried in the top surface of the second substrate 1200 on the opposite side of the first substrate 1100 as viewed from the second substrate 1200. The magnet may be disposed in a lower part of the first substrate 1100 consisting of a glass substrate, i.e., buried in the lower surface of the first substrate 1100 on the opposite side of the second substrate 1200 as viewed from the first substrate 1100.

Figure 18C:
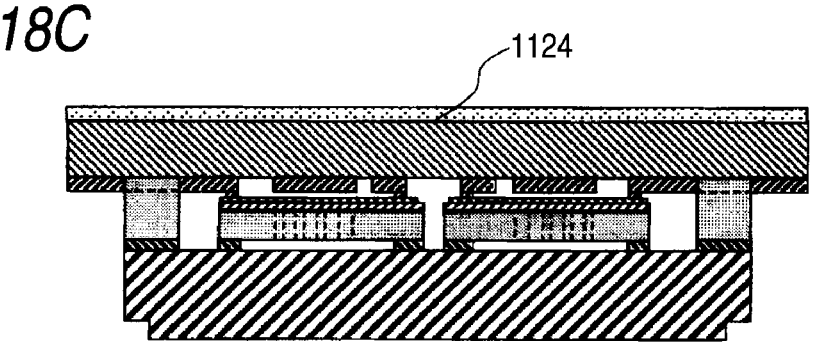
Figure 19:
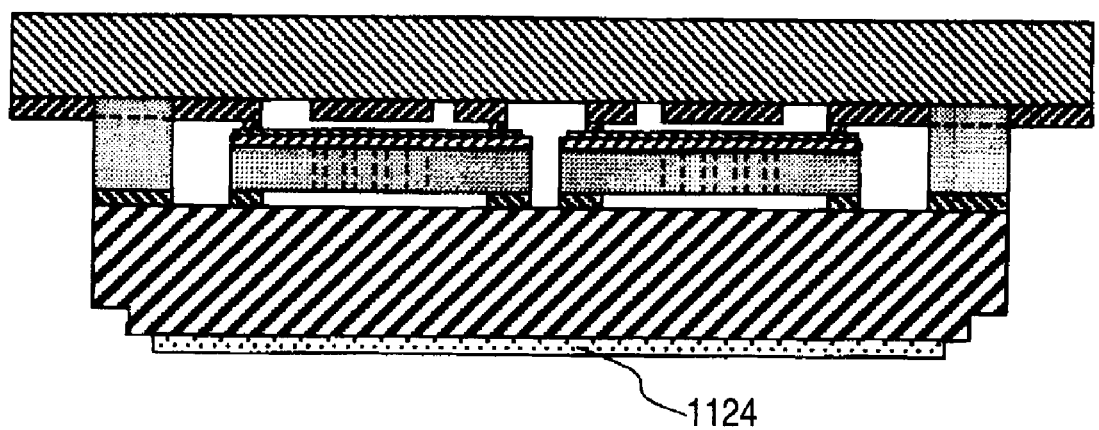
FIG. 19 is a schematic cross section showing another embodiment associated with an angular velocity detector (Embodiment 4) of the invention.

Similar results can be obtained by thinning the magnet 1124 itself as shown in FIGS. 18C and 19, the magnet 1124 being of any of the various structures described previously. That is, the magnet 1124 already described in connection with FIGS. 18A-18C and 19 can be thinned and used.

In any of the above-described structures, the magnet is required to be disposed in a position opposite to the vibrator 1101.

Embodiment 5

Figure 20:
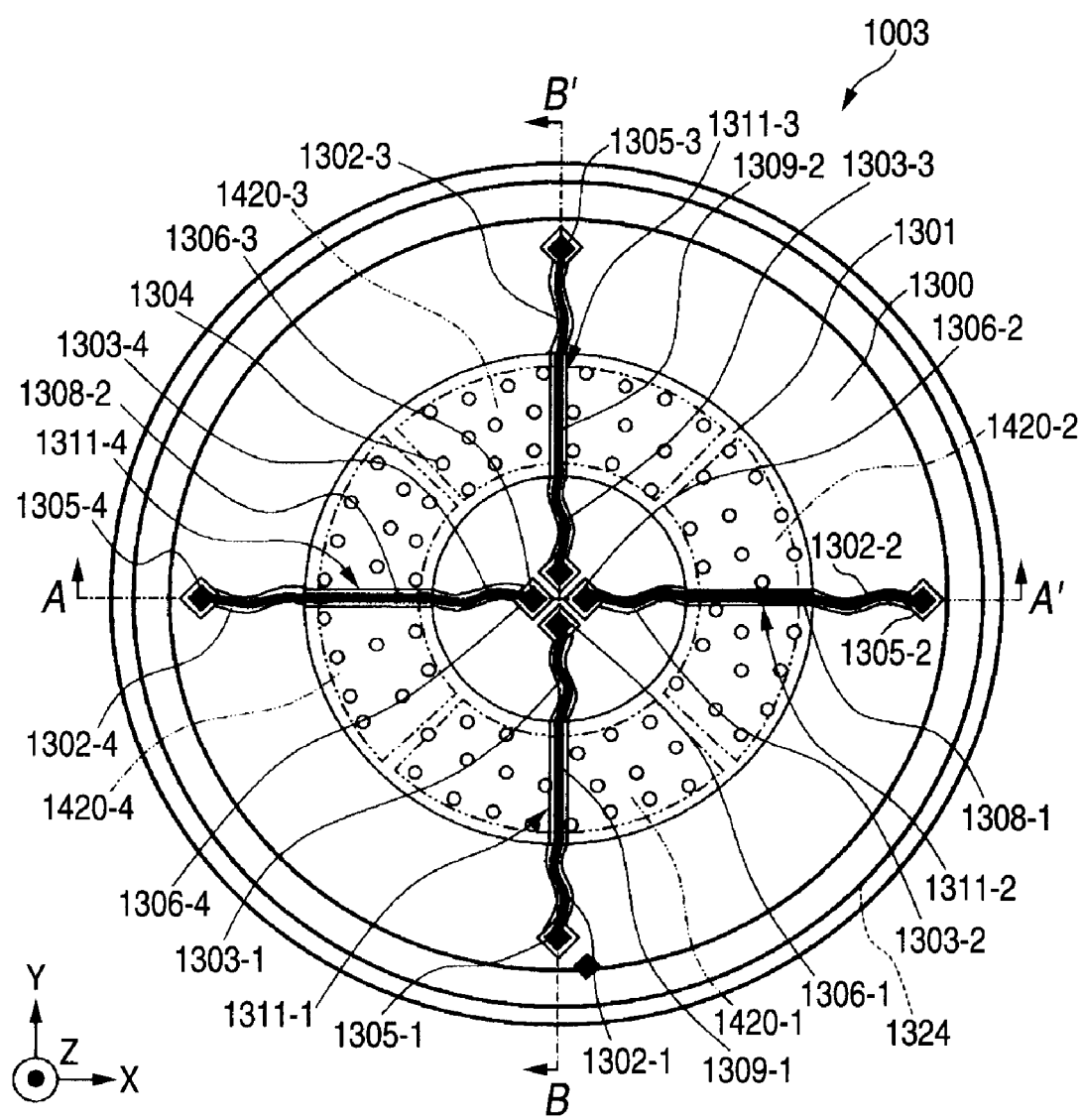
FIG. 20 is a schematic structural plan view showing one embodiment associated with an angular velocity detector (Embodiment 5) of the invention.
Figure 21:
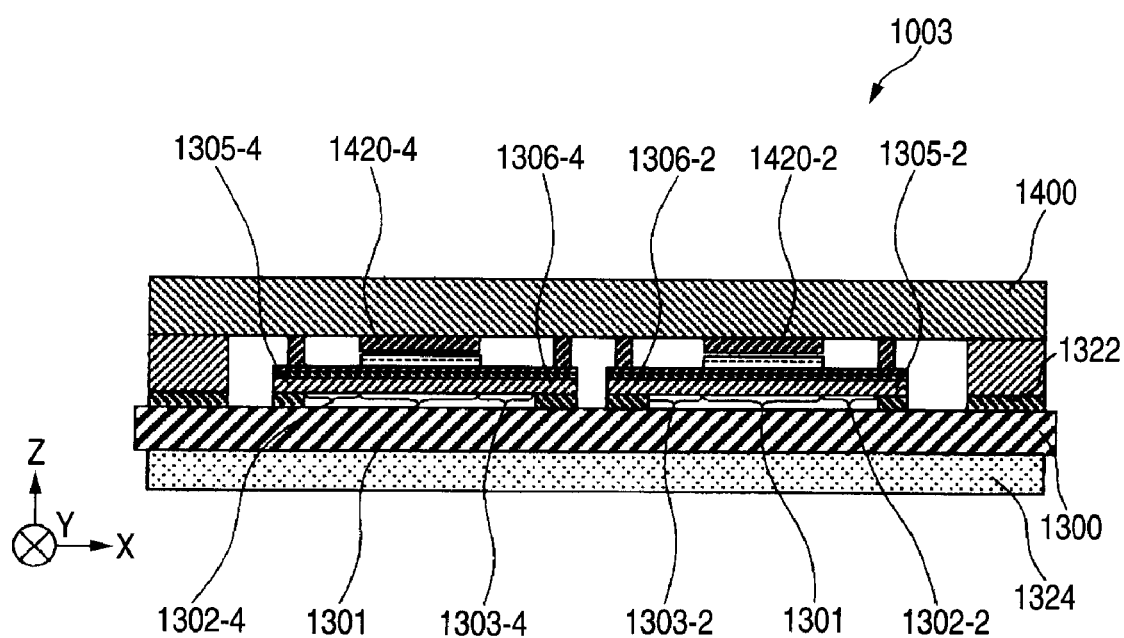
FIG. 21 is a schematic cross section showing one embodiment associated with an angular velocity detector (Embodiment 5) of the invention.

A second embodiment associated with the angular velocity detector of the invention is described by referring to the plan view of FIG. 20 and the cross-sectional view of FIG. 21 taken on line A-A of FIG. 20. FIG. 20 is a schematic plan view of the first substrate as viewed from the electrodes shown in FIG. 21. FIG. 21 is a schematic cross section taken on line A-A' of FIG. 3. FIG. 21 becomes similar to the schematic cross section taken on line B-B of FIG. 20 if the driver electrodes are replaced by detection electrodes. The cross-sectional view of FIG. 21 merely schematically shows the structure and is not drawn to the same scale as the plan view of FIG. 20.

As shown in FIGS. 20 and 21, an angular velocity detector 1003 of the invention is equipped with a vibrator 1301. The vibrator 1301 is made, for example, of an annular thin film. Four springs 1302 (in the illustrated example, outer springs 1302-1, 1302-2, 1302-3, and 1302-4) are disposed as a plurality of resilient support bodies on the outside of the vibrator 1301. Four springs 1303 (in the illustrated example, inner springs 1303-1, 1303-2, 1303-3, and 1303-4) are disposed as a plurality of resilient support bodies on the inside of the vibrator 1301.

One end of the outer spring 1302-1 is connected with the vibrator 1301, while the other end is connected and supported to the support portion 1305-1. The support portion 1305-1 is fixedly mounted to the first substrate 1300 via an insulator layer (not shown). Similarly to the outer spring 1302-1, the other outer springs 1302-2, 1302-3, and 1302-4 are connected with the vibrator 1301 at their respective one ends and connected and supported to the support portions 1305-2, 1305-3, and 1305-4 at their respective ends. The support portions 1305-2, 1305-3, and 1305-4 are fixedly mounted to the first substrate 1300 via an insulator layer 1322.

One end of the inner spring 1303-1 is connected with the vibrator 1301, whereas the other end is connected and supported to the support portion 1306-1. The support portion 1306-1 is fixedly mounted to the first substrate 1300 via an insulator layer (not shown). Similarly to the inner spring 1303-1, the other inner springs 1303-2, 1303-3, and 1303-4 are connected with the vibrator 1301 at their respective one ends and connected and supported to the support portions

1306-2, 1306-3, and 1306-4 at their respective other ends. The support portions 1306-2, 1306-3, and 1306-4 are fixedly mounted to the first substrate 1300 via an insulator layer 1322.

In this way, the outer springs 1302-1, 1302-2, 1302-3, and 1302-4 are supported by the support portions 1305-1, 1305-2, 1305-3, and 1305-4, respectively. The inner springs 1303-1, 1303-2, 1303-3, and 1303-4 are supported by the support portions 1306-1, 1306-2, 1306-3, and 1306-4, respectively. The vibrator 1301, outer springs 1302-1, 1302-2, 1302-3, 1302-4 and inner springs 1303-1, 1303-2, 1303-3, 1303-4 are completely poised above the first substrate 1300.

The vibrator 1301 is provided with a plurality of through-holes 1304 to mitigate air damping. The through-holes 1304 reduce the squeezing effect of the narrow gap with electrodes 1420-1 to 1420-4 (some of which are not shown) of a second substrate 1400 mounted above the vibrator 1301. The second substrate 1400 will be described later.

In the angular velocity detector 1003 of the invention, the surfaces of the outer springs 1302-1, 1302-2, 1302-3, and 1302-4 on which electrodes are formed and the surfaces of the inner springs 1303-1, 1303-2, 1303-3, and 1303-4 on which electrodes are formed are made lower toward the first substrate 1300 from the top surface of the vibrator 1301. The portions of the vibrator 1301 in which the electrodes are formed are dug portions 1311-1, 1311-2, 1311-3, and 1311-4 formed into parts of the top surface of the vibrator 1301.

A driver electrode 1308-1 for electromagnetically driving the vibrator extends continuously from over the inner spring 1303-2, through the dug portion 1311-2 in the vibrator 1301, and to over the outer spring 1302-2 so as to connect the inner support portion 1306-2 and outer support portion 1305-2 in a spaced relation from the outer spring 1302-2, vibrator 1301, and inner spring 1303-2, i.e., via the insulator film 1307.

One example of the disposition of the driver electrode 1308-1 is described below in further detail by referring to FIG. 22.

Figure 22:
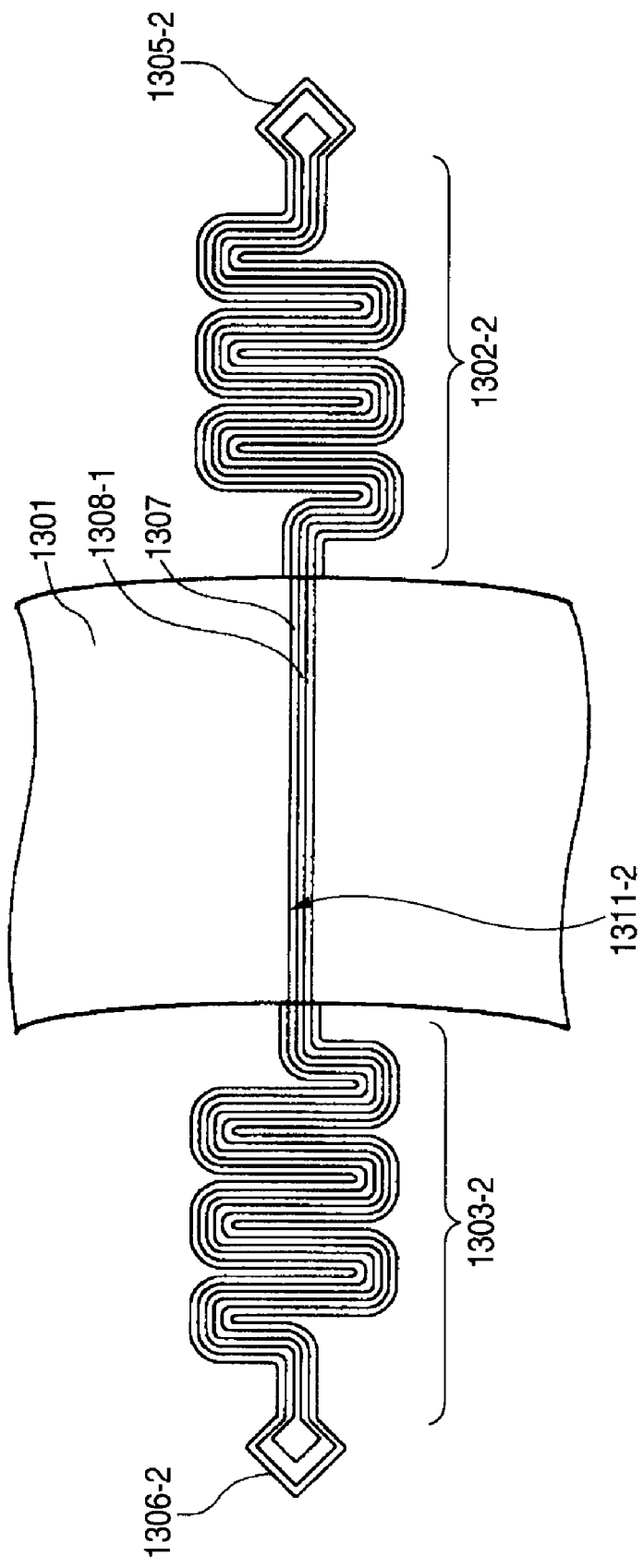
FIG. 22 is a plan view showing one example of the shape of the resilient support bodies (Embodiment 5)

As shown in FIG. 22, one end of the inner spring 1303-2 is connected to the inner support portion 1306-2, while the other end of the inner spring 1303-2 is connected to the inside of the vibrator 1301. One end of the outer spring 1302-2 is connected to the outside of the vibrator 1301, while the other end of the outer spring 1302-2 is connected to the outer support portion 1305-2. The inner support portion 1306-2, inner spring 1303-2, outer spring 1302-2, and outer support portion 1305-2 are arranged substantially in a line between the inner spring 1302-2 and the outer spring 1303-2 such that the vibrator 1301 is located among them. Furthermore, the top surface of the inner support portion 1306-2, the top surface of the inner spring 1303-2, the bottom surface of the dug portion 1311-2 formed in the vibrator 1301, the top surface of the outer spring 1302-2, and the top surface of the outer support portion 1305-2 are formed at substantially the same height. By making the top surface of the inner support portion 1306-2, the top surface of the inner spring 1303-2, the bottom surface of the dug portion 1311-2 formed in the vibrator 1301, the top surface of the outer spring 1302-2, and the top surface of the outer support portion 1305-2 substantially at the same height in this way, the insulator film 1307 and the driver electrode 1308-1 formed on them can be formed on a flat plane having no steps. Consequently, it is easy to form the insulator film 1307 and driver electrode 1308-1. The insulator film 1307 is also formed on the vibrator 1301. Holes 1304 formed in the vibrator 1301 are omitted in the figure.

The insulator film 1307 is formed on the top surface of the inner support portion 1306-2, on the top surface of the inner spring 1303-2, on the bottom surface of the dug portion 1311-2 formed in the vibrator 1301, on the top surface of the outer spring 1302-2, and on the top surface of the outer support portion 1305-2. The driver electrode 1308-1 that is electrically isolated by the insulator film 1307 is formed on the top surface of the inner support portion 1306-2, on the top surface of the inner spring 1303-2, on the bottom surface of the dug portion 1311-2 formed in the vibrator 1301, on the top surface of the outer spring 1302-2, and on the top surface of the outer support portion 1305-2. Accordingly, the driver electrode 1308-1 extends from over the inner support portion 1306-2 to over the outer support portion 1305-2 while electrically isolated (not directly in contact with) from the inner support portion 1306-2, inner spring 1303-2, vibrator 1301, outer spring 1302-2, and outer support portion 1305-2.

When viewed in a plane, each of the inner spring 1303-2 and outer spring 1302-2 is shaped like a rectangular impulsive waveform. Preferably, the bent portion of each spring is rounded as shown. Where it is rounded, the durability of the spring improves. Furthermore, the bent portion of the driver electrode 1308-1 formed on each spring is preferably rounded for a similar reason to that of the spring. The inner spring 1303-2 and outer spring 1302-2 are not limited to the shape described in connection with FIG. 22. Various spring forms can be adopted if they support the vibrator 1301 in a floated state.

Meanwhile, as shown in FIGS. 20 and 21, the driver electrode 1308-2 extends in the same way as the foregoing over the outer support portion 1305-4, over the outer spring 1302-4, over the inner spring 1303-4, over the inner support portion 1306-2, and over the vibrator 1301 symmetrically about the center axis passing through the center of the vibrator 1301 relative to the outer support portion 1305-2, outer spring 1302-2, inner spring 1303-2, and inner support portion 1306-2.

Furthermore, in the present embodiment, the detection electrode 1309-1 is formed over the outer spring 1302-1 and over the inner spring 1303-1 so as to connect them over the vibrator 1301 to detect an induced electromotive force produced when the vibrator is electromagnetically driven to operate. Alternatively, the detection electrode 1309-2 may be formed over the vibrator 1301 and over the outer spring 1302-3 and inner spring 1303-3 so as to connect them. Further alternatively, detection electrodes 1309-1 and 1309-2 may be formed on both.

Also, in the present embodiment, the driver electrode 1308-1 for electromagnetically driving the vibrator is disposed over the outer spring 1302-2 and inner spring 1303-2. The driver electrode 1308-2 for electromagnetically driving the vibrator is disposed over the outer spring 1302-4 and inner spring 1303-4 that are symmetrical with respect to the center axis of the vibrator 1301 relative to the outer spring 1302-2 and inner spring 1303-2. The driver electrode 1308-1 for electromagnetically driving the vibrator is disposed over the outer spring 1302-1 and inner spring 1303-1. The driver electrode 1308-2 for electromagnetically driving the vibrator is disposed over the outer spring 1302-3 and inner spring 1303-3 that are symmetrical with respect to the center axis of the vibrator 1301 relative to the outer spring 1302-1 and inner spring 1303-1. Furthermore, the detection electrode 1309-1 may be disposed as an electrode for detecting the induced electromotive force produced when the vibrator is electromagnetically driven to operate over the outer spring 1302-2 and inner spring 1303-2. The detection electrode 1309-2 may be disposed over the outer spring 1302-4 and inner spring 1303-4.

The driver electrode 1308-2 and the detection electrodes 1309-1 and 1309-2 can be made similar in structure with the driver electrode 1308-1 already described in connection with FIG. 22.

Electrodes 1420-1, 1420-2, 1420-3, and 1420-4 are disposed over the second substrate 1400 to detect capacitance variations and located opposite to the vibrator 1301 above the vibrator 1301 via a space. The electrodes 1420-1, 1420-2, 1420-3, and 1420-4 are shaped, for example, sectorially. The electrodes 1420-1 and 1420-3 are disposed symmetrically with respect to the center axis of the vibrator 1301. Furthermore, the electrodes 1420-2 and 1420-4 are disposed symmetrically with respect to the center axis of the vibrator 1301. The electrodes 1420-1, 1420-2, 1420-3, and 1420-4 are disposed opposite to the driver electrode 1309-1, the detection electrode 1308-1, the driver electrode 1309-2, and the detection electrode 1308-2 over the vibrator 1301. The second substrate 400 is joined to a frame 1321 formed over the first substrate 1300 via an insulator film 1322.

A magnet 1324 for electromagnetically driving the vibrator is mounted under the first substrate 1300. The magnetic field is arranged vertically to the first substrate 1300. As described in detail later, the magnet 1324 may be mounted over the second substrate 1400. The magnet may also be mounted on both the lower surface of the first substrate 1300 and the upper surface of the second substrate 1400. A thin magnet may be used as the magnet 1324 and buried in the first substrate 1300. Similarly, the magnet may be buried in the second substrate 1400. Furthermore, the magnet 1324 may be disposed in a position opposite to the vibrator 1301 via the first substrate 1300 or in a position opposite to the vibrator 1301 via the electrodes 1420 and the second substrate 1400.

In the above-described angular velocity detector 1003, since the vibrator is electromagnetically driven using the magnet 1324, the amplitude at which the vibrator 1301 is driven can be set large. Therefore, the displacement corresponding to the Coriolis force produced on application of an angular velocity can be increased. Furthermore, the space between the second substrate 1400 and the vibrator 1301 can be narrowed by producing driving vibrations on the X-Y plane that is the main face of the vibrator 1301 in an annular flat form. Therefore, the spaces between the electrodes of the displacement detection means, i.e., the space between the electrode 1420-1 and the detection electrode 1309-1 and the space between the electrode 1420-3 and the detection electrode 1309-2, can be narrowed. A high-sensitivity angular velocity detector producing large capacitance variations can be offered. Further, the electromagnetically driving interconnect is enabled by arranging the four springs at intervals of 90°. Displacements in two axial directions can be detected at the same time using the single vibrator 1301 by disposing the two pairs of electrodes, 1420-1 and 1420-3, and 1420-2 and 1420-4, on the side of the second substrate 1400.

The method of detecting angular velocities by the above-described angular velocity detector provided with the dug portions in regions where the electrodes are disposed is similar to the method of detection of angular velocities already described in connection with FIG. 3.

Accordingly, in the angular velocity detector 1003 of the invention, the space between the second substrate 1400 and the vibrator 1301 can be narrowed by producing driving vibrations on the X-Y plane that is a main face of the vibrator 1301 in an annular flat form. Therefore, the spaces between the electrodes of the displacement detection means, i.e., the space between the electrode 1420-1 and the detection electrode 1309-1 and the space between the electrode 1420-3 and the detection electrode 1309-2, can be narrowed. A high-sensitivity angular velocity detector producing large capacitance variations can be offered.

In the same way as the embodiment already described in connection with FIG. 3, there is a possibility that the driver electrode 1308-1 for producing a Lorentz force, the driver electrode 1308-2 arranged with 180° symmetry, and detection electrodes 1309-1, 1309-2 for taking out the induced electromotive force, and so on are brought into contact with the electrode (counter electrode) 1420 installed on top of the vibrator 1301 by an external large impact. Since it is necessary to supply an electrical current of several mA into the driver electrodes 1308-1 and 1308-2, if an excessive current flows into the electrode 1420 for detecting capacitance variations, there is a possibility that a minute capacitance-detecting amplifier connected with the electrode is damaged. Accordingly, in the invention, dug portions 1311-1 to 1311-4 are formed in the electrode interconnect portions of the vibrator 1301. The total of the thickness of the driver electrodes 1308-1, 1308-2 and detection electrodes 1309-1, 1309-2 and the thickness of the insulator layer 1307 is set not greater than the depth of the dug portions 1311-1 to 1311-4. If the vibrator 1301 is brought into contact with the electrode 1420 by a large impact, the driver electrodes 1308-1, 1308-2 and detection electrodes 1309-1, 1309-2 are prevented from making contact with it. The springs 1302-1, 1302-2, 1302-3, 1302-4, 1303-1, 1303-2, 1303-3, and 1303-4 are so fabricated that the driver electrode 1308-1 formed on the springs 1302-2 and 1303-2, the driver electrode 1308-2 formed on the springs 1302-4 and 1303-4, the detection electrode 1309-1 formed on the springs 1302-1 and 1303-1, and the detection electrode 1309-2 formed on the springs 1302-3 and 1303-3 are made lower in height than the top surface of the vibrator 1301 (surface that is opposite to the second substrate 1400) as viewed from the side of the first substrate 1300. Therefore, with respect to the springs 1302-1, 1302-2, 1302-3, 1302-4, 1303-1, 1303-2, 1303-3, and 1303-4, the driver electrodes 1308-1, 1308-2 and detection electrodes 1309-1, 1309-2 are prevented from touching the electrode 1420.

Embodiment 6

A second embodiment associated with a method of fabricating an angular velocity detector of the invention is next described by referring to the schematic cross sections and schematic plan view of FIGS. 23A-28 illustrating a fabrication sequence. A method of fabricating an angular velocity detector of the above-described structure of Embodiment 1 is described as one example herein.

Figure 23A:
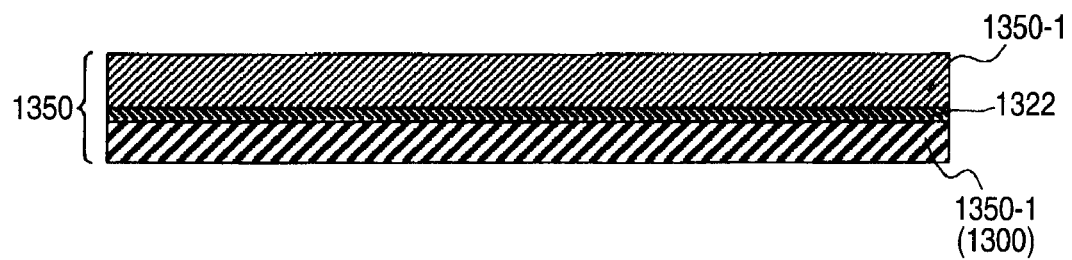
FIGS. 23A-23C are schematic cross sections showing one embodiment associated with a method of fabricating an angular velocity detector (Embodiment 6) of the invention.

As shown in FIG. 23A, an SOI (silicon-on-insulator) substrate 1350 having an insulator layer 1322 sandwiched between an upper silicon layer 1350-1 and a lower silicon layer 1350-2 is used. The insulator layer 1322 is made, for example, of a film of silicon oxide ($SiO_2$). Here, the lower silicon layer 1350-2 corresponds to the first substrate 1300 of the above-described Embodiment 1. The silicon layer is hereinafter described as the first substrate 1300. A vibrator and resilient support bodies (such as springs) are fabricated from this SOI substrate 1350. Alignment marks used for alignment with a second substrate (not shown) and marks (not shown) becoming dicing lines are formed by an ordinary lithography technique and an etching technique in an unillustrated manner. These act as indicia during alignment when the first substrate 1300 and second substrate (not shown) consisting of a silicon substrate (described later) are anodically bonded and when the first substrate 1300 is cut out.

Figure 23B:
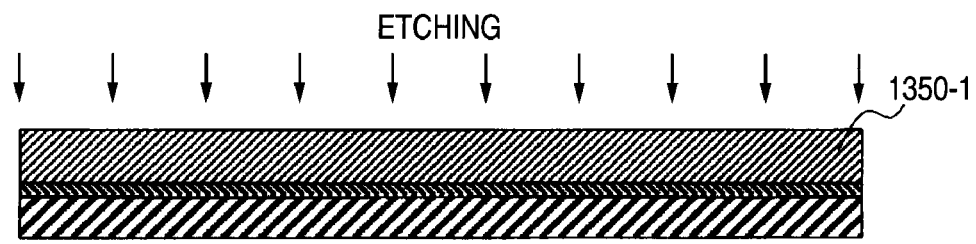

Then, as shown in FIG. 23B, the whole surface of the SOI substrate 1350 on the side of the upper silicon layer 1350-1 is etched such that the upper silicon layer 1350-1 assumes a desired film thickness. This method of etching can be implemented by wet etching using tetramethyl ammonium hydroxide (TMAH) or potassium hydroxide (KOH) or by chemical or physical dry etching. If the desired film thickness of the upper silicon layer 1350-1 is previously known, an SOI substrate having the upper silicon layer 1350-1 of the desired film thickness may be prepared.

Figure 23C:
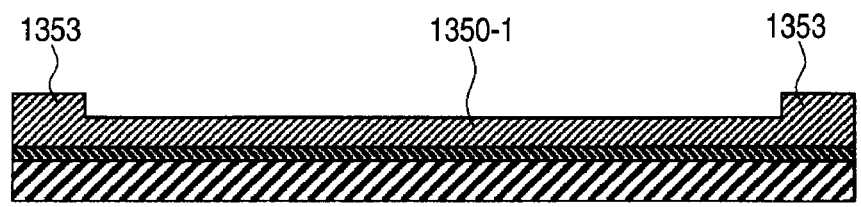

Then, as shown in FIG. 23C, an anodic bonding frame 1353 is formed by processing the upper silicon layer 1350-1 by ordinary lithography technique and etching technique. This method of etching can be implemented by wet etching using tetramethyl ammonium hydroxide (TMAH) or potassium hydroxide (KOH) or by chemical or physical dry etching. This etching determines the film thickness of the vibrator.

Figure 24A:
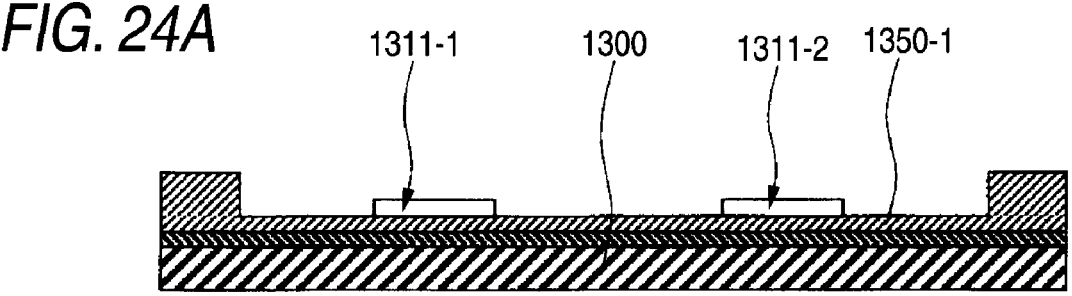
FIGS. 24A-24C are schematic cross sections showing one embodiment associated with a method of fabricating an angular velocity detector (Embodiment 6) of the invention.
Figure 25:
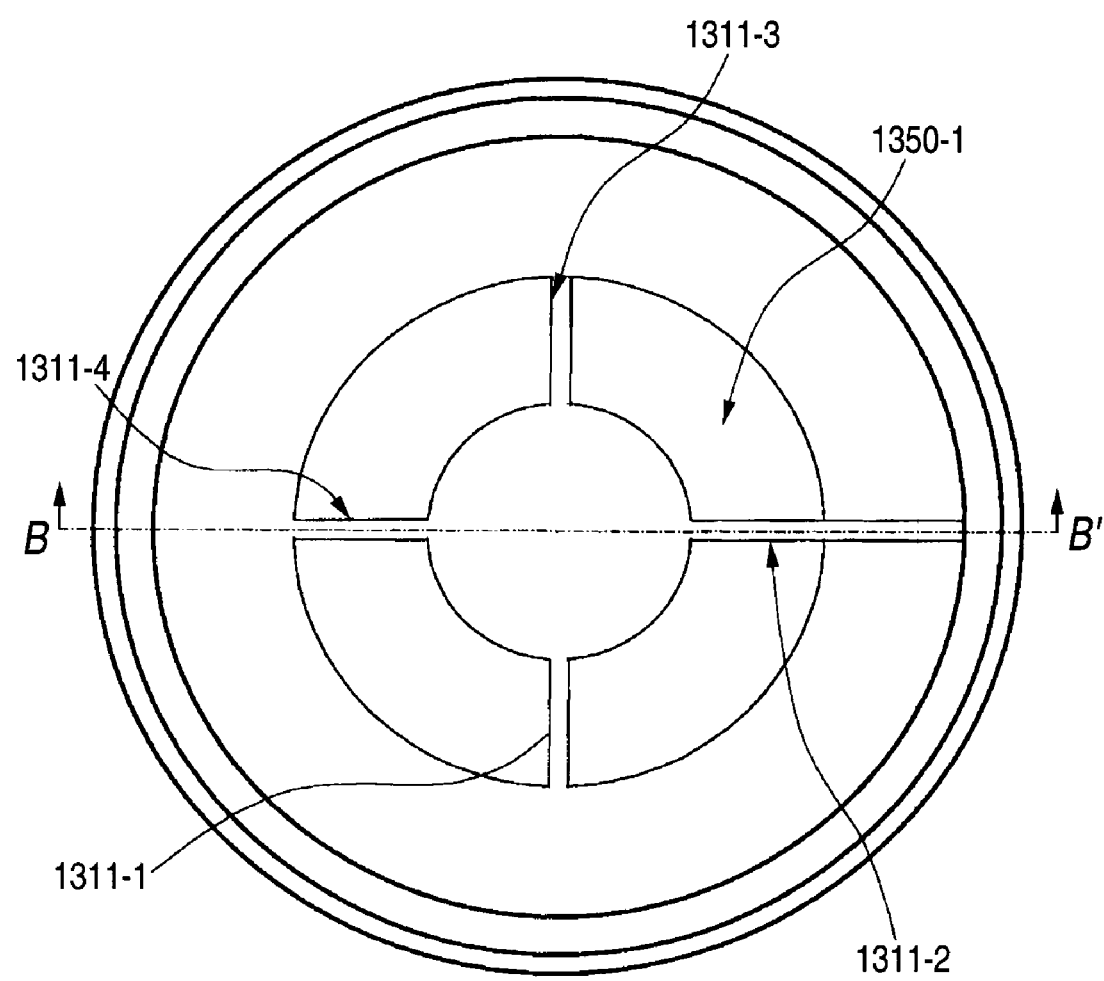
FIG. 25 is a schematic structural plan view showing one embodiment associated with a method of fabricating an angular velocity detector (Embodiment 6) of the invention.

Then, as shown in FIGS. 24A and 25, dug portions 1311-1, 1311-2, 1311-3, and 1311-4 are formed in the upper silicon layer 1350-1 to dispose electrodes in a region where the vibrator will be fabricated. At the same time, regions in which outer and inner springs will be formed are formed at the same height as the bottom surface of the dug portions 1311-1, 1311-2, 1311-3, and 1311-4. That is, at least the surface on which the electrodes of the vibrator are formed, the surface on which the electrodes on the inner springs are formed, and the surface on which the electrodes on the outer springs are formed are made lower toward the first substrate 1300 from the top surface of the vibrator. The depth is so determined that when the electrodes are formed on the electrode formation surface via the insulator film, the top surface of the electrodes does not protrude from the top surface of the vibrator. FIG. 24A is a cross-sectional view taken on line B-B' of FIG. 25. Note that FIGS. 24A and 25 are not always drawn to the same scale.

Figure 24B:
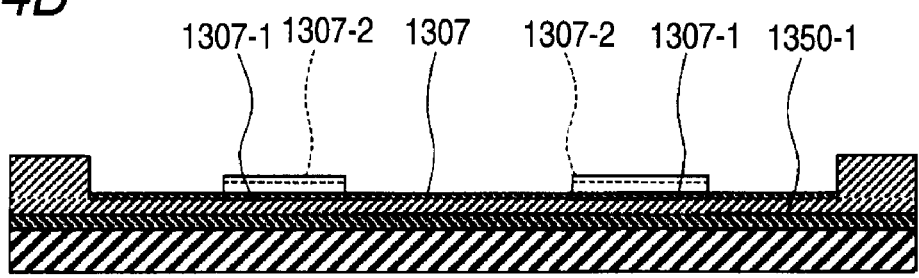

Then, as shown in FIG. 24B, after forming the insulator film 1307 on the upper silicon layer 1350-1, the insulator film 1307 is patterned using a lithography technique and an etching technique. An insulator film 1307-1 is formed on parts of the region on which the vibrator will be fabricated, on the regions on which the springs will be formed, and the region on which support portions will be formed. An insulator film 1307-2 becoming a stopper for the vibrator is formed. The insulator film 1307-2 is so positioned that it does not overlap the positions at which holes will be formed in the vibrator in a subsequent process step. Any film can be used as the insulator film 1307 as long as it can maintain the insulation between the electrode and the upper silicon layer 1350-1. For example, the insulator film can be made of silicon oxide ($SiO_2$) or silicon nitride (SiN). Since the insulator film 1307-2 is formed also over the planned region of the vibrator, the insulation can be maintained when the vibrator and the electrodes on the second substrate side touch each other.

Figure 24C:
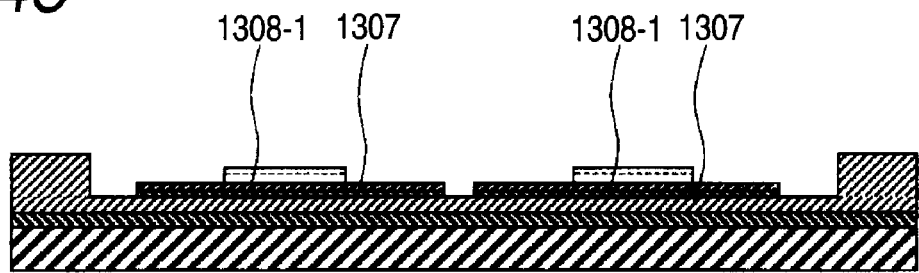
Figure 26:
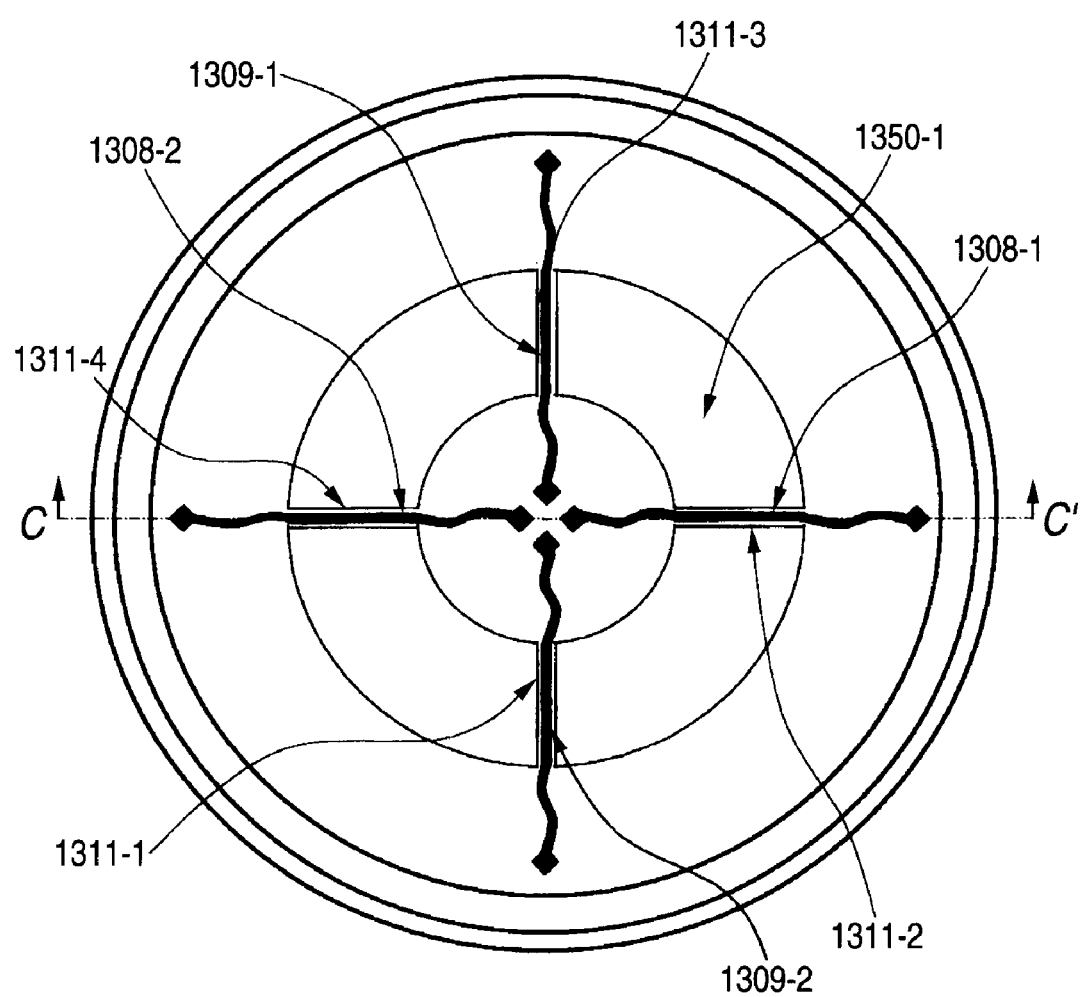
FIG. 26 is a schematic structural plan view showing one embodiment associated with a method of fabricating an angular velocity detector (Embodiment 6) of the invention.

Then, as shown in FIGS. 24C and 26, driver electrodes (interconnects) 1308-1 and 1308-2 for application of a Lorentz force and detection electrodes (interconnects) 1309-1 and 1309-2 (not shown in FIG. 24C) for detection of the induced electromotive force are formed on the insulator film 1307-1 (not shown in FIG. 26). The interconnect material is formed by electron beam evaporation. In the present embodiment, the patterning of the interconnects can be done by a lift-off method. Alternatively, after forming a mask by a lithography technique, the patterning may be done by wet etching or dry etching using the mask. Also, in the present embodiment, a three-layer metal material of gold, platinum, and chromium is used as an interconnect material. A three-layer metal material of gold, platinum, and titanium may also be used. Furthermore, two-layer metal materials such as gold-chromium, gold-platinum, and gold-titanium may also be used. Instead of the titanium, a laminate material of titanium nitride and titanium may be used. In addition, copper may be used instead of chromium or titanium. A sputtering method or CVD process can be used as the method of formation. FIG. 24C is a cross-sectional view taken on line C-C' of FIG. 26. Note that FIGS. 24C and 26 are not always drawn to the same scale.

Figure 27A:
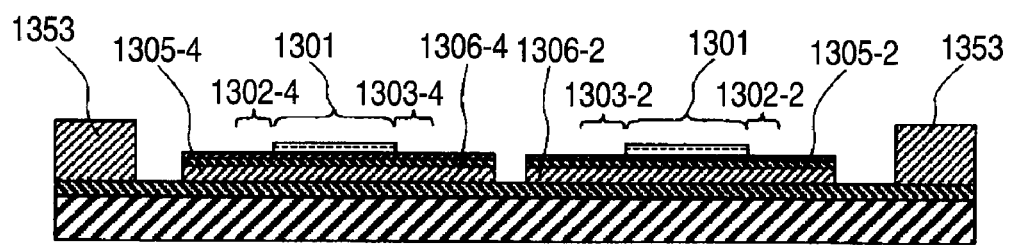
FIGS. 27A-27B are schematic cross sections showing one embodiment associated with a method of fabricating an angular velocity detector (Embodiment 6) of the invention.
Figure 27B:
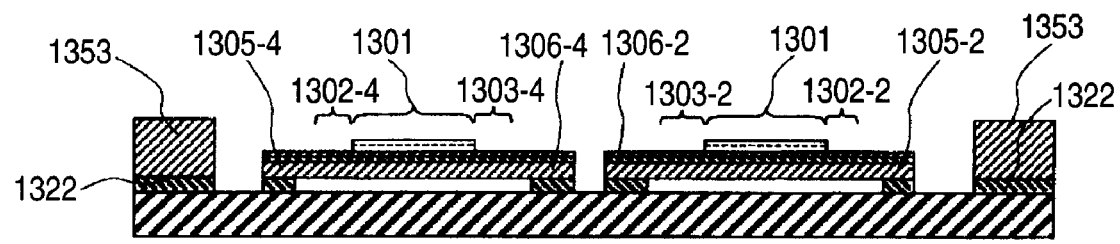
Figure 28:
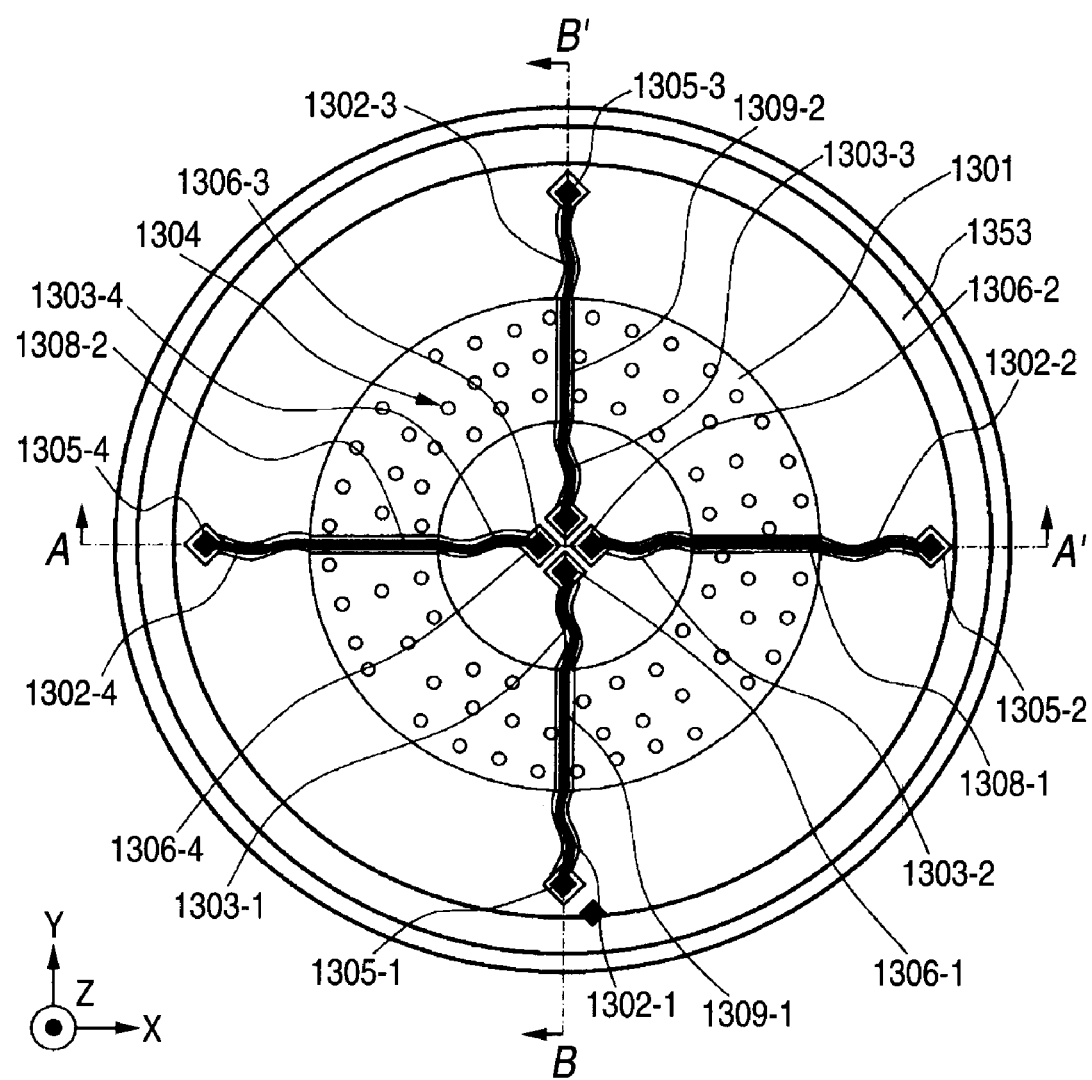
FIG. 28 is a schematic structural plan view showing one embodiment associated with a method of fabricating an angular velocity detector (Embodiment 6) of the invention.

Then, as shown in FIGS. 27A and 28, a mask for the vibrator, springs, and a frame for anodic bonding is built by an ordinary lithography technique. Using an etching technique employing the mask, the vibrator 1301, outer springs 1302-1, 1302-2, 1302-3, and 1302-4 for supporting outer peripheral portions of the vibrator 1301, support portions 1305-1, 1305-2, 1305-3, and 1305-4 for supporting the outer springs 1302-1, 1302-2, 1302-3, and 1302-4 that support the outer peripheral portions, inner springs 1303-1, 1303-2, 1303-3, and 1303-4 for supporting inner portions of the vibrator 1301, and support portions 1306-1, 1306-2, 1306-3, and 1306-4 for supporting the inner springs 1303-1, 1303-2, 1303-3, and 1303-4 are formed. A frame 1353 for anodic bonding is also formed. For example, reactive ion etching can be used as the aforementioned etching. During the etching step for forming the vibrator 1301, a number of through-holes 1304 are preferably formed in the vibrator 1301. Where the inner surface of the vibrator 1301 is partitioned into small regions, the through-holes 1304 may be arranged at random if the through-holes 1304 in each region are distributed at a uniform density. The through-holes may also be arranged at equal intervals. In the plan view of FIG. 28, the insulator film 1307 is omitted. FIG. 27A is a cross-sectional view taken on line D-D' of FIGS. 27A-27B. Note that FIGS. 27A and 28 are not always drawn to the same scale.

As a result, the support portion 1305-2, outer spring 1302-2, vibrator 1301, inner spring 1303-2, and support portion 1306-2 are formed while carrying the driver electrode 1308-1 thereover via the insulator film 1307. The support portion 1305-4, outer spring 1302-4, vibrator 1301, inner spring 1303-4, and support portion 1306-4 are formed while carrying the driver electrode 1308-2 thereover via the insulator film 1307. Furthermore, the support portion 1305-1, outer spring 1302-1, vibrator 1301, inner spring 1303-1, and support portion 1306-1 are formed while carrying the detection electrode 1309-1 thereover via the insulator film 1307. The support portion 1305-3, outer spring 1302-3, vibrator 1301, inner spring 1303-3, and support portion 1306-3 are formed while carrying the detection electrode 1309-2 thereover via the insulator film 1307.

Finally, as shown in FIGS. 27B and 28, the insulator layer 1322 is etched away. At this time, those portions of the insulator layer 1322 which are under the support portions 1305-1, 1305-2, 1305-3, and 1305-4 and under the support portions 1306-1, 1306-2, 1306-3, and 1306-4, respectively, and the portion of the insulator layer 1322 under the frame 1353 are left unetched and connected with the first substrate 1300. The other portions become a hollow structure. In consequence, the vibrator 1301, outer springs 1302-1, 1302-2, 1302-3, and 1302-4 supporting the vibrator 1301, and inner springs 1303-1, 1303-2, 1303-3, and 1303-4 are poised. FIG. 27B is a cross-sectional view taken as the same position as the above-referenced FIG. 27A.

A method of fabricating the second substrate is next described.

Figure 29A:
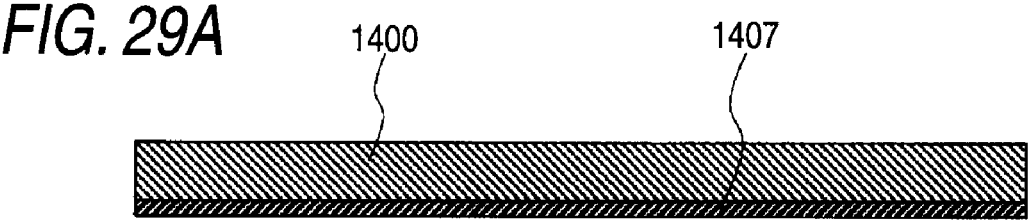
FIGS. 29A-29C are schematic cross sections showing one embodiment associated with a method of fabricating an angular velocity detector (Embodiment 6) of the invention.

As shown in FIG. 29A, an electrode (interconnect) material layer 1407 is formed on the second substrate 1400 by electron beam evaporation. For example, a glass substrate can be used as the second substrate 1400. A three-layer metal material of gold, platinum, and chromium can be used as the electrode material. Furthermore, a three-layer metal material of gold, platinum, and titanium may also be used. In addition, a two-layer metal material such as gold-chromium, gold-platinum, platinum-chromium, gold-titanium, or platinum-titanium may also be used. Instead of the titanium, a laminate material of titanium nitride and titanium may be used. In addition, copper may be used instead of chromium or titanium. A sputtering method or CVD process may be used as the method of formation.

Figure 29B:
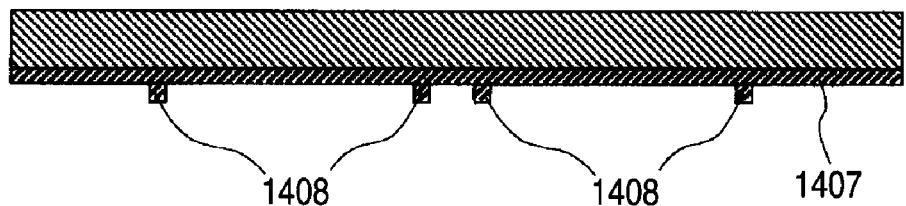

Then, as shown in FIG. 29B, a contact portion 1408 is formed on the surface of the electrode material layer 1407 by an electroless plating method. For example, the contact portion 1408 is made by gold plating. This makes contact with the electrodes on the first substrate (not shown) after the anodic bonding. Accordingly, the contact portion is formed in a position opposite to the contact portions of the electrodes formed on the first substrate after the anodic bonding. In the present embodiment, an electroless plating method is used. However, the contact portion is formed also by an electrolytic plating method.

Figure 29C:
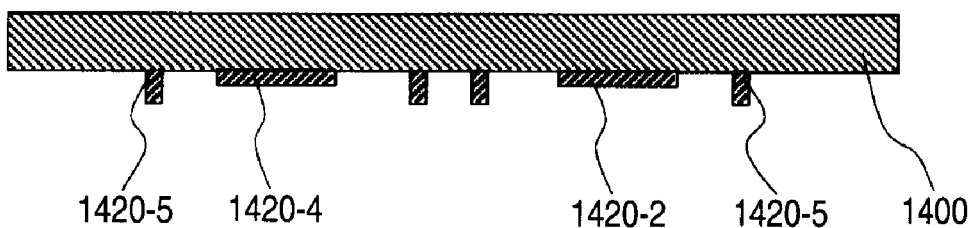
Figure 30:
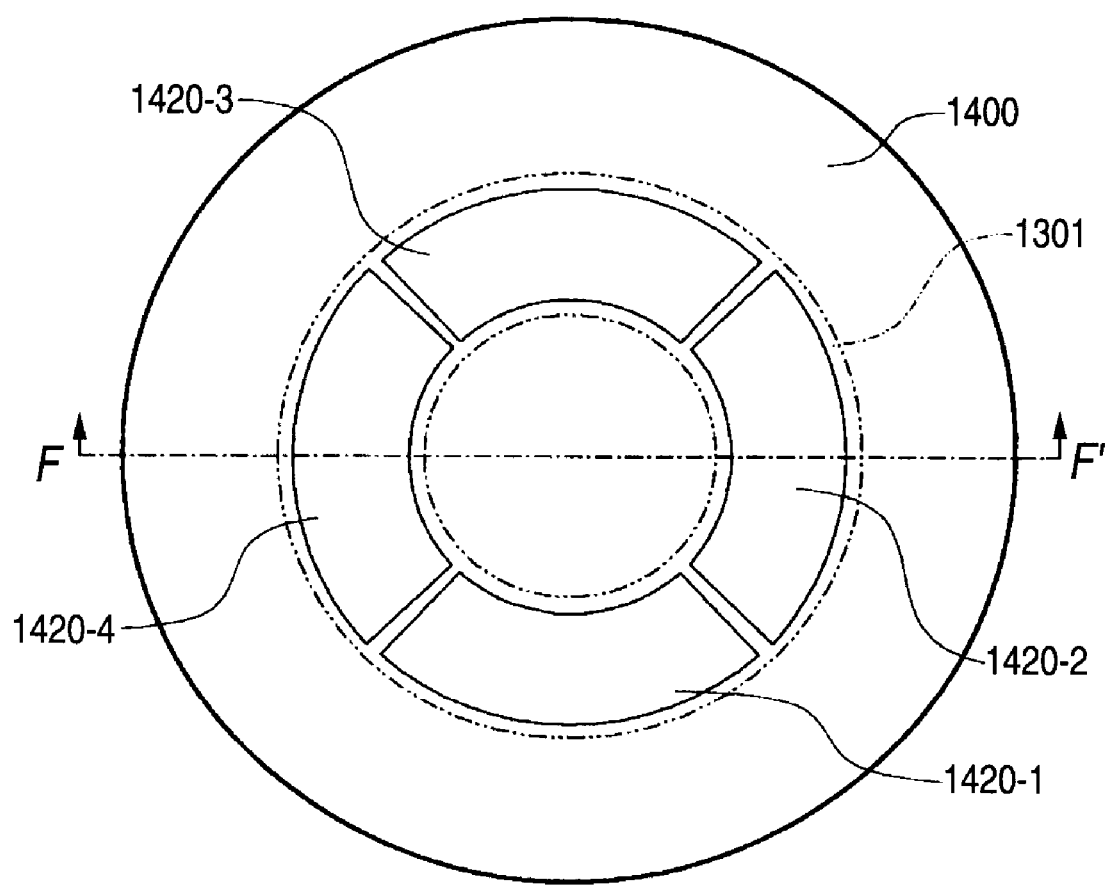
FIG. 30 is a schematic structural plan view showing one embodiment associated with a method of fabricating an angular velocity detector (Embodiment 6) of the invention.

Then, as shown in the electrode layout diagrams of FIGS. 29C and 30, after forming a mask for forming electrodes by a lithography technique, the electrode material layer 1407 (see the above-referenced FIG. 29B) is patterned by an etching technique using the mask to form electrodes 1420-1, 1420-2, 1420-3, 1420-4 on the side of the second substrate 1400 and an extraction electrode 1420-5. That is, the electrodes 1420-2 and 1420-4 are disposed in positions rotated through 90° from the electrodes 1420-1 and 1420-3. The double-dot-dash lines in the plan views indicate the position at which the vibrator 1301 is disposed. FIG. 29C is a cross-sectional view taken on line F-F' of FIG. 21. Note that FIGS. 29C and 30 are not always drawn to the same scale.

Figure 31A:
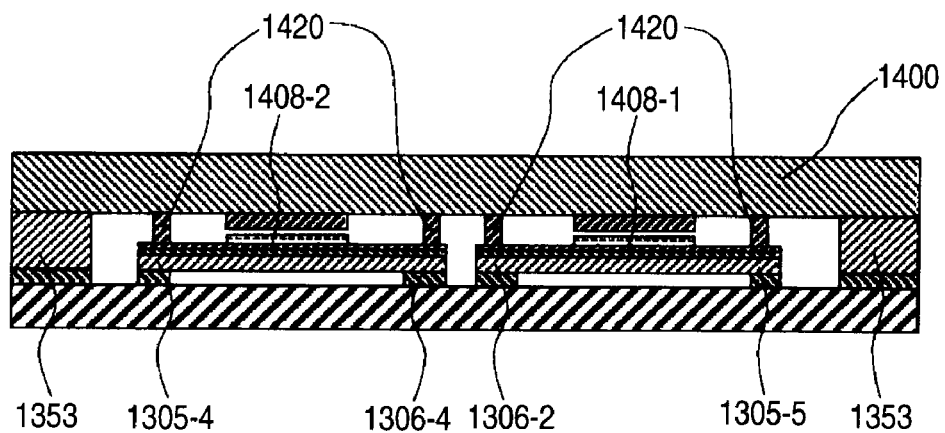
FIGS. 31A-31B are schematic cross sections showing one example associated with a method of fabricating an angular velocity detector (Embodiment 6) of the invention.
Figure 31B:
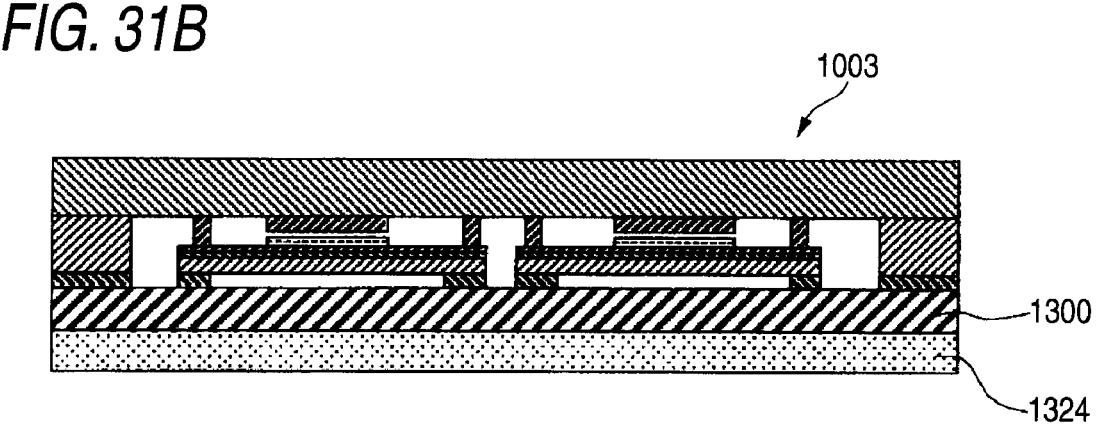

A method of assembling the first and second substrates is next described by referring to FIGS. 31A-31B.

Then, as shown in FIG. 31A, the second substrate 1400 made of a glass substrate and the frame 1353 made of silicon are bonded together by an anodic bonding method. At this time, the contact portion 1408 is made contact with pad portions of the driver electrodes 1308-1 and 1308-2 and of the detection electrodes 1309-1 and 1309-2 (see the above-referenced FIG. 28). The driver electrodes 1308-1 and 1308-2 are formed on the support portions 1305-2, 1305-4 and support portions 1306-2, 1306-4 and act to produce a Lorentz force. The detection electrodes 1309-1 and 1309-2 are formed on the support portions 1305-1 and 1305-3 and on the support portions 1306-1 and 1306-3 and act to detect an induced electromotive force produced when the vibrator is electromagnetically driven.

Then, the first substrate 1300 and second substrate 1400 are cut by dicing into individual chips in an unillustrated manner. Finally, as shown in FIG. 31B, a magnet 1324 is formed under the first substrate 1300. An extraction electrode 1420-5 is brought out, for example, by wire bonding in an unillustrated manner. Wire is bonded to this portion to fabricate a chip for the angular velocity detector 1003.

In the method of fabricating the angular velocity detector of the invention, the outer springs 1302-1 to 1302-4 and inner springs 1303-1 to 1303-4 are formed simultaneously with the vibrator 1301 using the upper silicon layer 1350-1 formed on the insulator layer 1322. Therefore, the vibrator can be formed so as to be supported by the springs. Furthermore, the magnet is mounted as an excitation means. Consequently, an angular velocity detector is fabricated in which the driving amplitude can be set large by electromagnetically driving the vibrator using the magnet. For this reason, the angular velocity detector fabricated by the method of fabrication of the invention has the advantage that the displacement corresponding to the Coriolis force produced on application of an angular velocity can be set large. In addition, the spacings between the electrodes of the displacement detection means can be narrowed by producing driving vibrations on the X-Y plane and adjusting the thickness of the upper silicon layer 1350-1 forming the frame 1353 during the formation. There is the advantage that a high-sensitivity angular velocity detector producing large capacitance variations can be offered. The driver electrodes 1308-1 and 1308-2 becoming electromagnetically driving interconnects and the detection electrodes 1309-1 and 1309-2 can be formed by arranging the four outer springs 1302-1 to 1302-4 and inner springs 1303-1 to 1303-4 at intervals of 90 degrees. There is the advantage that a structure permitting simultaneous detection of angular velocities in two axial directions using the single vibrator 1301 can be fabricated by disposing the two pairs of electrodes 1420-1 to 1420-4 on the side of the second substrate 1400.

In the method of fabricating the angular velocity detector of the invention, the driver electrodes 1308-1, 1308-2 and the detection electrodes 1309-1, 1309-2 formed on the vibrator 1301 are formed in the dug portions 1311-1, 1311-2, 1311-3, and 1311-4 after forming the dug portions 1311-1, 1311-2, 1311-3, and 1311-4 in the vibrator 1301. Therefore, the electrodes are so formed that when the vibrator 1301 vibrates, the driver electrodes 1308-1, 1308-2 and detection electrodes 1309-1, 1309-2 are prevented from touching the electrodes 1420-1, 1420-2, 1420-3, and 1420-4. There is the advantage that the angular velocity detector 1003 assuring detection of the displacement of the vibrator 1301 can be offered. Furthermore, the angular velocity detector 1003 yielding the advantages as described in the above-described second embodiment can be fabricated.

Embodiment 7

Figure 32:
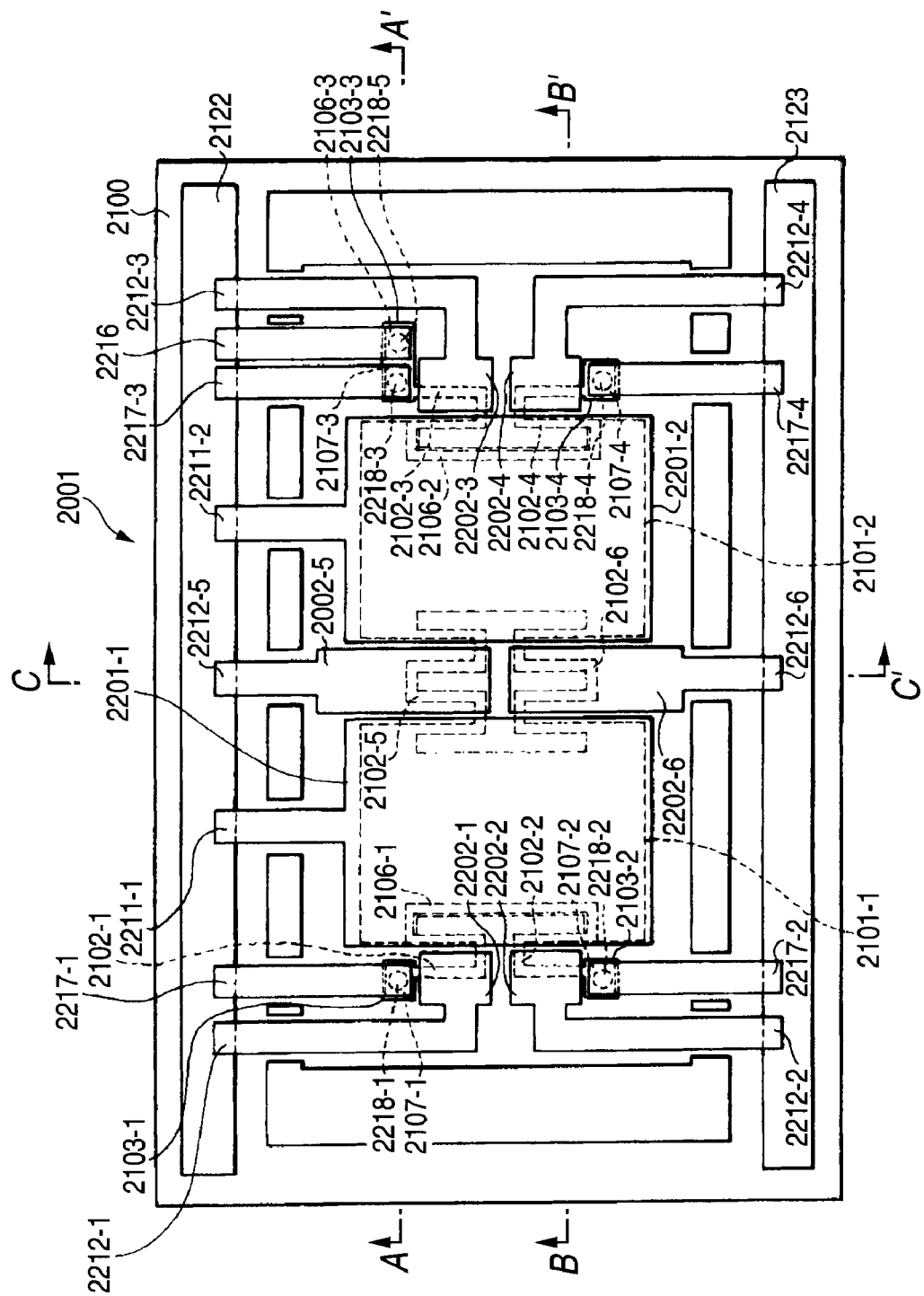
FIG. 32 is a planar layout diagram of main portions showing one example associated with a method of fabricating an angular velocity detector (Embodiment 7) of the invention.
Figure 33:
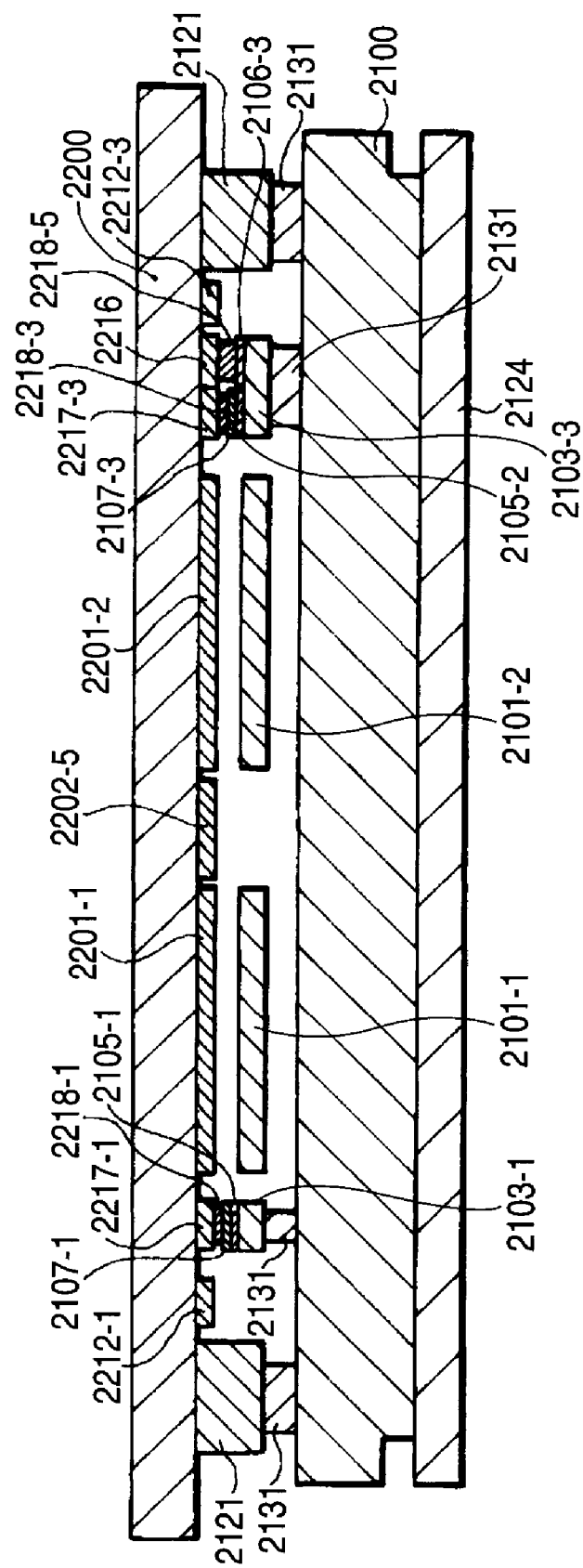
FIG. 33 is a cross-sectional view taken on line A-A' of FIG. 32, showing one embodiment associated with a method of fabricating an angular velocity detector (Embodiment 7) of the invention.
Figure 34:
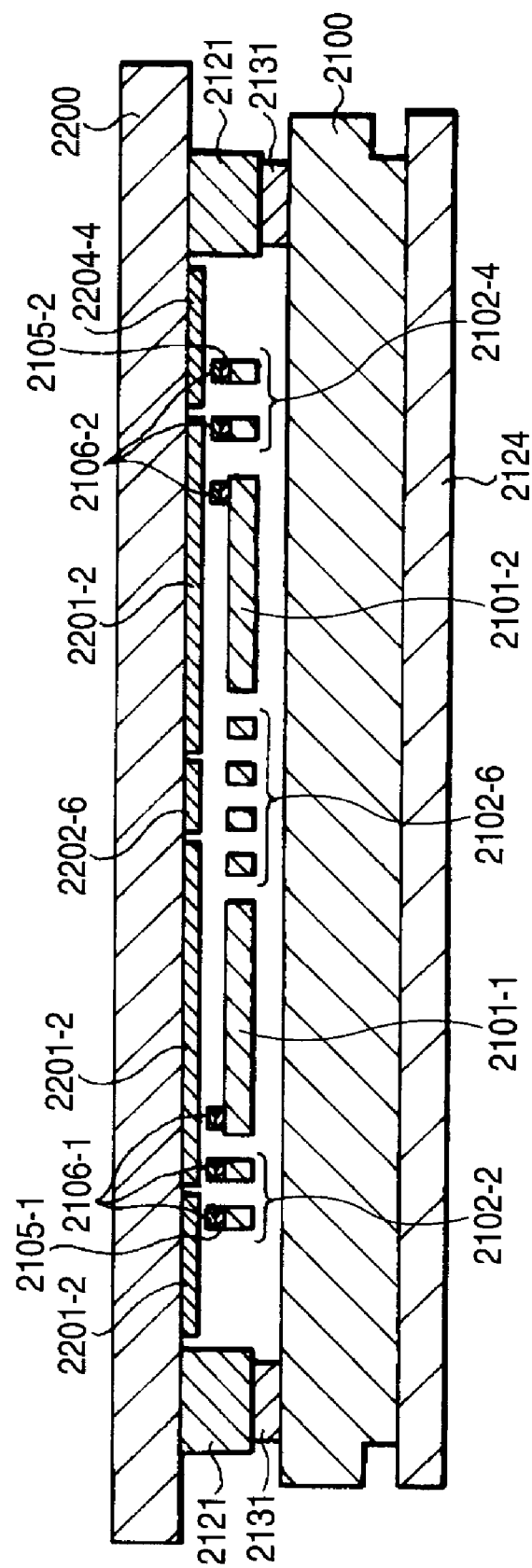
FIG. 34 is a cross-sectional view taken on line B-B' of FIG. 32, showing one embodiment associated with a method of fabricating an angular velocity detector (Embodiment 7) of the invention.
Figure 35:
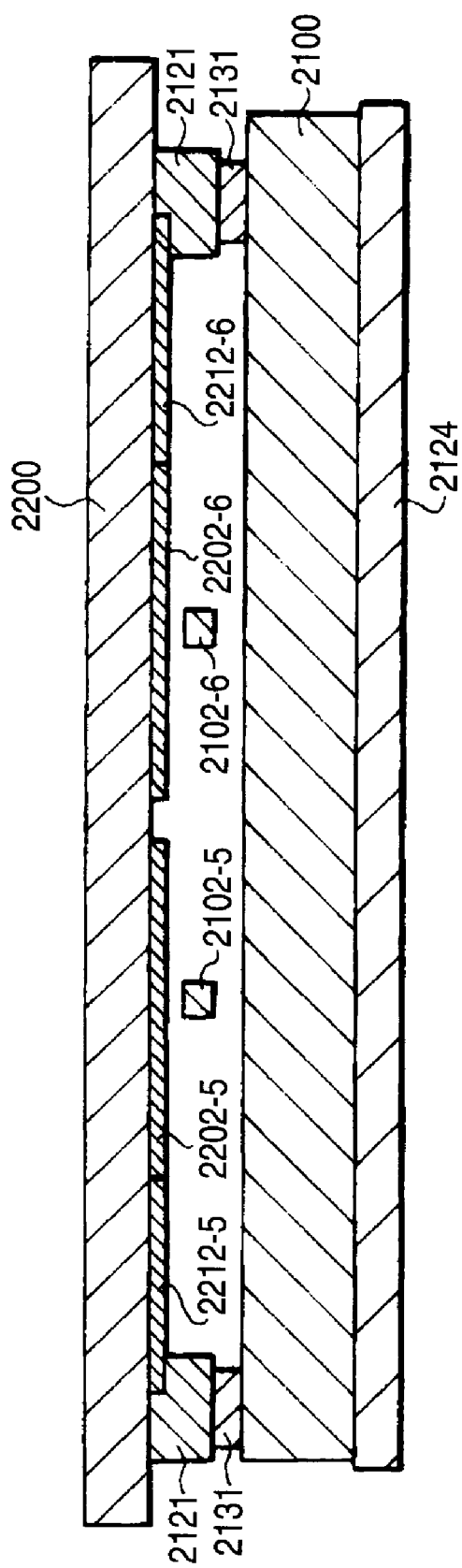
FIG. 35 is a cross-sectional view taken on line C-C' of FIG. 32, showing one embodiment associated with a method of fabricating an angular velocity detector (Embodiment 7) of the invention.
Figure 36:
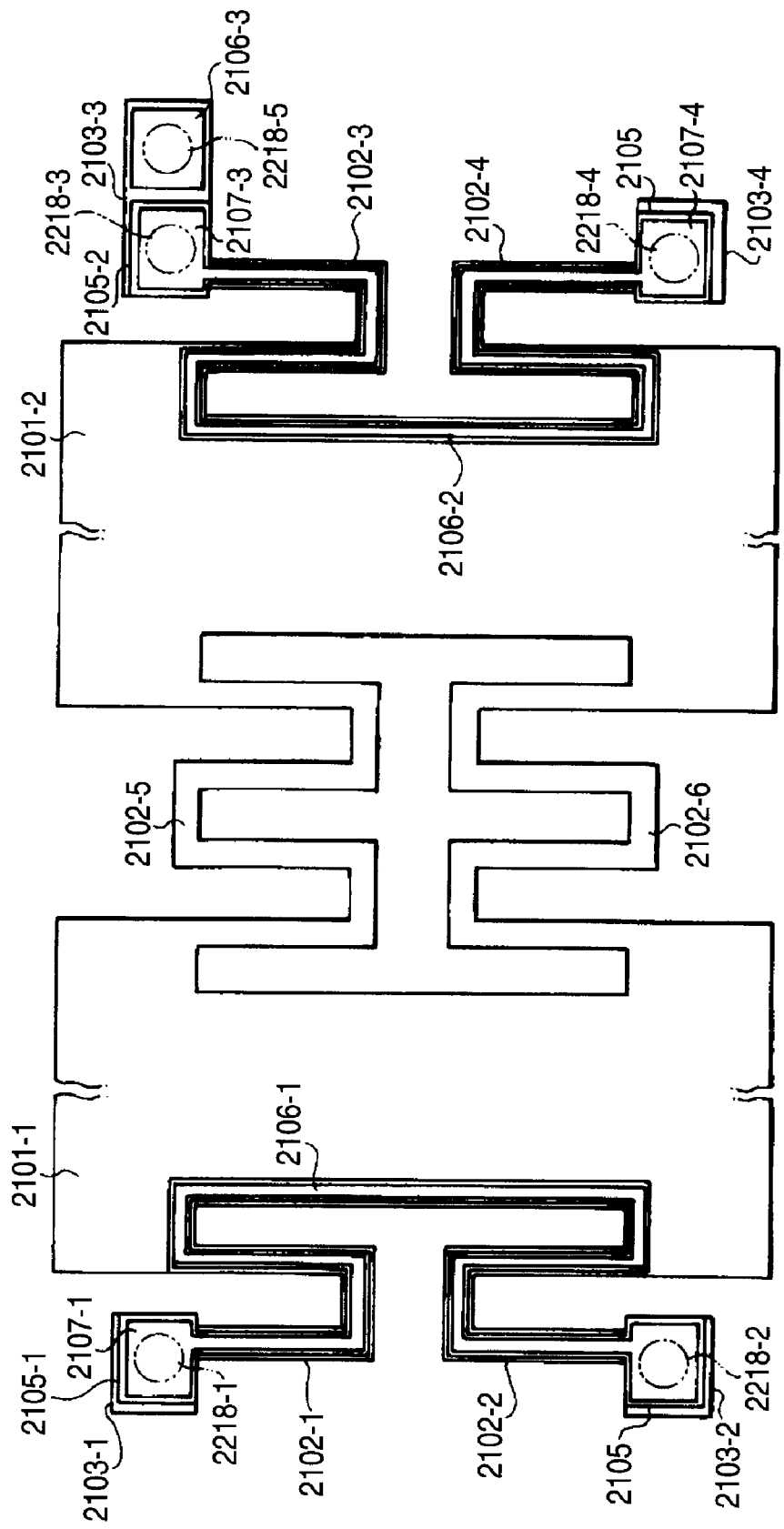
FIG. 36 is an enlarged view of main portions showing one embodiment associated with a method of fabricating an angular velocity detector (Embodiment 7) of the invention.

One embodiment associated with an angular velocity detector of the invention is described by referring to the planar layout diagram of main portions of FIG. 32, the cross-sectional view of FIG. 33 taken on line A-A' of FIG. 32, the cross-sectional view of FIG. 34 taken on line B-B' of FIG. 32, the cross-sectional view of FIG. 35 taken on line C-C' of FIG. 32, and the enlarged view of main portions of FIG. 36. The cross sections of FIGS. 33-35 schematically show the configurations and are not drawn to the same scale as the planar layout diagram of FIG. 32.

As shown in FIGS. 32-36, the angular velocity detector 2001 is equipped with a first vibrator 2101-1 and a second vibrator 2101-2 parallel to each other. Each of the first vibrator 2101-1 and second vibrator 2101-2 consists of a rectangular thin film. As one example, the thin film is made of a silicon layer. The opposite corner portions of the first and second vibrators 2101-1 and 2101-2 are connected by resilient support bodies 2102-5 and 2102-6. The corner portions of the first vibrator 2101-1 on the opposite side of the second vibrator 2101-2 are supported by respective one ends of resilient support bodies 2102-1 and 2102-2. The other ends of the resilient support bodies 2102-1 and 2102-2 are supported and fixed to support portions 2103-1 and 2103-2, respectively. The corner portions of the second vibrator 2101-2 on the opposite side of the first vibrator 2101-1 are supported by respective one ends of resilient support bodies 2102-3 and 2102-4. The other ends of the resilient support bodies 2102-3 and 2102-4 are supported and fixed to support portions 2103-3 and 2103-4, respectively. For example, each of the resilient support bodies 2102-1 to 2102-6 is made of a leaf spring and consists, for example, of a silicon layer. Each resilient support body is shaped, for example, like a square bracket shape, the letter U or a rectangular wave when as viewed as a planar layout. The support portion 2103-1, 2103-2, 2103-3, and 2103-4 are fixedly mounted to the first substrate 2100 via an insulator 2131. Accordingly, the first vibrator 2101-1 and the second vibrator 2101-2 are supported by the resilient support bodies 2102-1, 2102-2, 2102-3, and 2102-4 and completely poised above the first substrate 2100.

An electrode 2106-1 for electromagnetically driving the first vibrator 2101-1 is formed as an electrically conductive interconnect via an insulator film 2105-1, extends from over the support portion 2103-1, over the resilient support body 2102-1, over an end side of the first vibrator 2101-1, and over the resilient support body 2102-2, and reaches to over the support portion 2103-2. Similarly, an electrode 2106-2 becoming a monitor electrode for detecting an induced electromotive force produced when the second vibrator 2101-2 is driven electromagnetically as described previously is formed as an electrically conductive interconnect via an insulator film 2105-2, extends from over the support portion 2103-3, over the resilient support body 2102-3, over an end side of the second vibrator 2101-2, and over the resilient support body 2102-4, and reaches to over the support portion 2103-4. Furthermore, to use the first vibrator 2101-1 and the second vibrator 2101-2 as electrodes for detecting angular velocities, a conductive pad 2106-3 is formed over the support portion 2103-3 and connected to the second vibrator 2101-2, for example, via a resilient support body 2102-3 made of silicon. The conductive pad 2106-3 is electrically isolated from the electrode 2106-2 formed on the support portion 2103-3 by an insulator film 2105-2.

Electrode pads 2107-1, 2107-2, 2107-3, and 2107-4 are formed continuously with the opposite ends of each of the electrodes 2106-1 and 2106-2 and over the support portions 2103-1, 2103-2, 2103-3, and 2103-4, respectively, at the opposite ends of each of the electrodes 2106-1 and 2106-2.

An anodic bonding frame 2121 and equipotential interconnects 2122 and 2123 are shown to be formed. The frame is used when the first substrate 2100 and the second substrate 2200 are anodically bonded together.

Each of the first and second vibrators 2101-1 and 2101-2 is provided with a plurality of through-holes (not shown) to mitigate air damping. The through-holes reduce the squeezing effect of the narrow gaps with a second substrate 2200 mounted above the first and second vibrators 2101-1 and 2101-2. Accordingly, the through-holes are preferably formed to be uniformly distributed to attain a balance between the first and second vibrators 2101-1 and 2101-2.

The structure described above is formed on the first substrate 2100.

The second substrate 2200 is next described. The second substrate 2200 is made, for example, of a glass substrate.

Electrodes for detecting capacitance variations are formed on the second substrate 2200. Detection electrodes 2201-1 and 2201-2 are formed on the surface of the second substrate 2200 opposite to the first substrate 2100 and in positions opposite to the first and second vibrators 2101-1 and 2101-2, respectively. Detection electrodes 2202-1, 2202-2, 2202-3, 2202-4, 2202-5, and 2202-6 are formed on the surface of the second substrate 2200 opposite to the first substrate 2100 and in positions opposite to the resilient support bodies 2102-1, 2102-2, 2102-3, 2102-4, 2102-5, and 2102-6.

Detection electrodes 2201-1, 2201-2 and detection electrodes 2202-1, 2202-3, 2202-5 are formed on the second substrate 2200. Extraction electrodes 2211-1, 2211-2, 2212-1, 2212-3, 2212-5, extraction electrodes 2217-1, 2217-3, and an extraction electrode 2216 are also formed on the second substrate. These extraction electrodes are brought out from the positions on the second substrate 2200 opposite to the electrode pads 2107-1, 2107-3, and the conductive pad 2106-3 toward the equipotential interconnect 2122 formed on the side of the first substrate 2100 when the first substrate 2100 and the second substrate 2200 have been bonded together.

Furthermore, detection electrodes 2202-2, 2202-4, 2202-6 extraction electrodes 2212-2, 2212-4, 2212-6, and extraction electrodes 2217-2, 2217-4 are formed on the second substrate 2200. These extraction electrodes are brought out from the positions on the second substrate 2200 opposite to the electrode pads 2107-2 and 2107-4 toward the equipotential interconnect 2123 formed on the side of the first substrate 2100 when the first substrate 2100 and the second substrate 2200 have been bonded together.

The anodic bonding frame 2121 is provided with recesses 2121-1 to prevent the anodic bonding frame 2121 from touching the extraction electrodes 2211-1, 2211-2, 2212-1 to 2212-6, 2216, 2217-1 to 2217-4 when the first substrate 2100 and the second substrate 2200 are placed opposite to each other and bonded together. The recesses 2121-1 are formed in a corresponding manner to the extraction electrodes. Where extraction electrodes such as 2216 and 2217-3 are formed closely to each other, the two extraction electrodes 2216 and 2217-3 are disposed in one recess. The recesses 2121-1 can be formed after completely removing the anodic bonding frame 2121 or after partially removing the positions where the extraction electrodes are formed. The figures indicate the case where the frame has been completely removed.

Pillar electrodes 2218-1, 2218-2, 2218-3, 2218-4, and 2218-5 are formed at the end portions of the extraction electrodes 2217-1, 2217-2, 2217-3, and 2217-4 which are on the sides of the electrode pads 2107-1, 2107-2, 2107-3, and 2107-4 and at the end portion of the extraction electrode 2216 on the side of the conductive pad 2106-3. The pillar electrodes 2218-1, 2218-2, 2218-3, 2218-4, and 2218-5 are formed, for example, by gold plating. Each of the pillar electrodes 2218-1, 2218-2, 2218-3, 2218-4, and 2218-5 can be singular or plural for each electrode pad or conductive pad.

The structure described above is formed on the second substrate 2200.

With respect to the first substrate 2100 and the second substrate 2200, the anodic bonding frame 2121 and the second substrate 2200 are anodically bonded together, for example, by an anodic bonding method. At this time, equipotential interconnects 2122 and 2123 made of silicon are also anodically bonded to the second substrate 2200.

However, after the anodic bonding, the anodic bonding frame 2121 is cut off from the equipotential interconnects 2122 and 2123, for example, by dicing to make the extraction electrodes 2211-1, 2211-2, 2212-1 to 2212-6, 2216, and 2217-1 to 2217-4 independent of each other completely electrically, the extraction electrodes being commonly connected with the equipotential interconnects 2122 and 2123.

A magnet 2124 is disposed on the underside of the first substrate 2100 facing away from the side on which the vibrators are formed. The angular velocity sensor of the capacitance detection type sensor of the present embodiment is electromagnetically driven by the magnet 2124. Therefore, the magnet 2124 can also be mounted on the side of the second substrate 2200 (described later). Also, in this case, an operation similar to the operation obtained where the magnet is mounted on the underside of the first substrate 2100 can be obtained.

The principle of operation of the angular velocity detector 2001 of the invention is next described.

In the angular velocity detector 2001, an electrical current having a certain period flows through the electrode 2106-1. For example, assume that an electrical current $I_1$ flows through the electrode 2106-1 from the electrode pad 2107-1 toward the electrode pad 2107-2 at some instant of time. At this time, an electrical current $I_2$ shifted in phase by 180° is made to flow through the electrode 2106-2. Since the currents $I_1$ and $I_2$ have periodicity, the direction of flow may be reversed at other instant of time. If an electrical current flows through the electrode 2106-1, the magnetic field produced from the magnet 2124 disposed under the first substrate 2100 sets up a Lorentz force $F_L$ in the x-direction.

The Lorentz force $F_L$ is given by the following equation and induced in a direction perpendicular to the interconnect.

$$F_L = IBL \qquad (1)$$

where I is the electrical current flowing through the electrode 2106-1 acting as a driver electrode, B is the magnetic flux density, and L is the length of the electrode 106-1.

The Lorentz force $F_L$ is applied to the first and second vibrators 2101-1 and 2101-2 with the same periodicity as that of the applied currents $I_1$ and $I_2$. The first vibrator portion 2101-1 repeats an amplitude motion with fixed points given by the support portions 2103-1 and 2103-2 connected to the resilient support bodies 2102-1 and 2102-2. The other, second vibrator 2101-2 repeats an amplitude motion with a phase shift of 180° with fixed points given by the support portions 2103-3 and 2103-4 connected to the resilient support bodies 2102-3 and 2102-4. At this time, if an angular velocity $\Omega$ is given from the outside around the Y-axis, the Coriolis force $F_C$ is produced in a direction perpendicular to the direction of vibration. The Coriolis force $F_C$ is given by Eq. (2).

$$F_c = 2mv\Omega \qquad (2)$$

where m is the mass of the vibrator, v is the vibration velocity in the direction along which the vibrator is driven, and $\Omega$ is the angular velocity applied from the outside.

To set large the displacement produced by the Coriolis force $F_C$, it is necessary to set large the mass m, driving angular frequency $\omega X$, and driving displacement Xm ($\omega X$ and Xm are parameters corresponding to the driving vibrational speed v). In the case of electromagnetic driving, it is possible to assume a large displacement because any comb-toothed electrode, which would have been necessary for electrostatic driving as in the prior art technique, is not necessary. If the Coriolis force $F_C$ is produced, the first and second vibrators 2101-1 and 2101-2 vibrate in the z-axis direction. At this time, the capacitance between the detection electrode 2201-1 installed on the side of the second substrate 2200 and the first vibrator 2101-1 and the capacitance between the detection electrode 2201-2 and the second vibrator 2101-2 vary. On one hand, the vibrators tilt in the direction approaching the second substrate 2200. On the other hand, the vibrators tilt in the direction going away from it. The applied angular velocity is calculated by detecting the difference between the capacitances.

It is important here that when an angular velocity $\Omega$ is applied, the amount of variation of capacitance produced between the detection electrode 2201-1 and the first vibrator 2101-1 is different from the amount of variation of capacitance produced between the detection electrode 2201-2 and the second vibrator 2101-2. However, when a translational acceleration is applied, the produced variations of the capacitances do not differ and so any capacitance difference is not produced if their difference is taken. Consequently, a structure is achieved which can remove the acceleration component produced when an angular velocity is applied.

When the Lorentz force $F_L$ is produced, an induced electromotive force is produced across the electrode 2106-2 formed on the second vibrator 2101-2. The induced electromotive force is produced with the same period as that of the Lorentz force $F_L$. When a capacitance variation is read, a carrier wave is superimposed between the detection electrode 2201-1 and the first vibrator 2101-1 and between the detection electrode 2201-2 and the second vibrator 2101-2. An electrical current produced by the capacitance variation is amplified, whereby an actual signal is taken. The carrier wave is removed by synchronous detection. With respect to the driving wave, an AC signal corresponding to the angular velocity can be taken by detecting the wave with a periodic component of the induced electromotive force.

Figure 37:
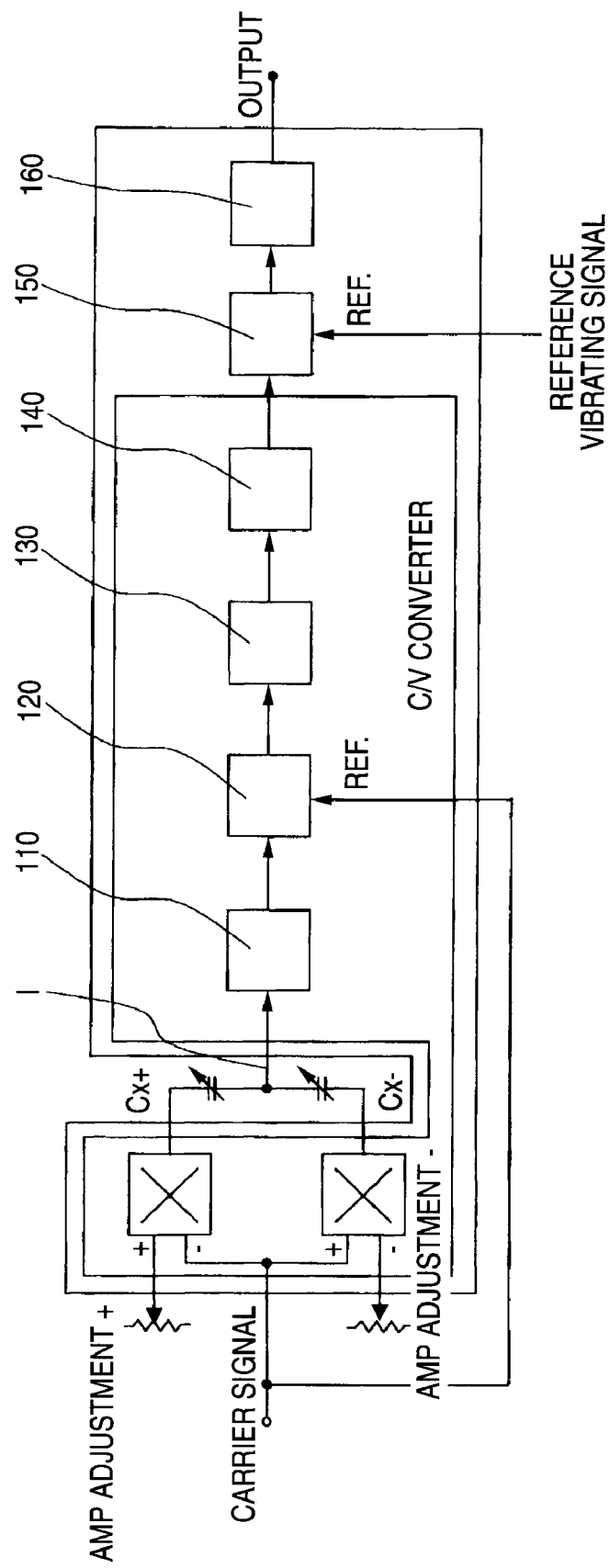
FIG. 37 is a block diagram showing one embodiment associated with a method of detection implemented by an angular velocity detector (Embodiment 7) of the invention.

A method of detecting angular velocities by the above-described angular velocity detector is described by referring to the block diagram of FIG. 37. In the description associated with FIG. 37, the same symbols are given to the components of the angular velocity detector as the symbols already described by referring to FIGS. 32-36.

As shown in FIG. 37, a carrier signal is applied to the detection electrodes 2201-1 and 2201-2 on the side of the second substrate 2200 with a phase difference of 180°. The carrier frequency should be set to a frequency higher than the natural frequencies of the first vibrator 2101-1 and the second vibrator 2101-2 by a factor of 5 to 100. When an angular velocity is applied from the outside, a difference $\Delta C$ is produced between the capacitances of capacitors created by the two vibrators, or first vibrator 2101-1 and second vibrator 2101-2. The difference is taken as an electrical current I. The current I is proportional to the difference $\Delta C$ between the capacitances of the capacitors and to the product of the carrier frequency and the carrier voltage. The signal is amplified by an initial stage of amplifier (AMP) 110. Then, to remove the carrier signal, the signal is added to a signal obtained by amplifying a signal having the same frequency as the carrier signal and synchronously detected by a synchronous detector 120. Noises of frequencies higher than the natural frequencies of the first vibrator 2101-1 and the second vibrator 2101-2 are removed by a low-pass filter 130. The signal is again amplified by an intermediate amplifier 140. Then, to remove the natural frequencies of the first and second vibrators 2101-1 and 2101-2, respectively, a signal is taken from an electrode 2106-2 for taking out the induced electromotive force. The signal is added to an amplified signal with a phase variation of 90°. The signal is input to the amplified signal. Synchronous detection is again performed with a synchronous detector 150. Only the angular velocity component is taken with a low-pass filter 160. Since the capacitance difference is proportional to the angular velocity, if a differential detection is achieved, it is the angular velocity.

The above-described method of detection of angular velocities can be similarly applied to an angular velocity detector equipped with a single vibrator (e.g., an angular velocity detector equipped with a disk-shaped vibrator as described in the first embodiment described above) and to an angular velocity detector equipped with a single rectangular vibrator (described later).

Embodiment 8

One embodiment associated with a method of fabricating an angular velocity detector of the invention is next described by referring to FIGS. 38A-50. In FIGS. 38A-40B, 46A-46C, and 49A-49B, cross sections at the same position as the cross section on line A-A' of FIG. 32 are shown. FIGS. 41-45, 47, 48, and 50 show planar layout diagrams. The cross sections show cross sections on line A-A of the planar layout diagrams. The cross sections and the planar layout diagrams are not always drawn to the same scale.

Figure 38A:
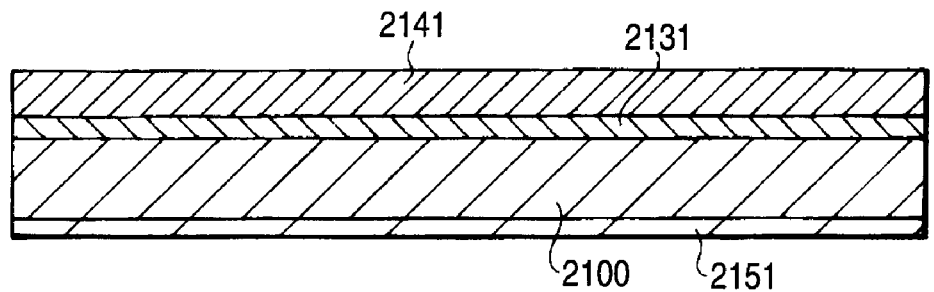
FIGS. 38A-38C are figures showing a specific fabrication sequence (Embodiment 8) for an angular velocity detector of the invention and are schematic structural cross sections showing cross sections at the same position as the cross section on line A-A' of FIG. 32.

FIG. 38A shows a cross section at the same position as the cross section on line A-A' of FIGS. 1A-1B. As shown in FIG. 38A, an SOI (silicon-on-insulator) substrate 2140 is used. The substrate has a silicon layer 2141 formed over a first substrate 2100 via an insulator 2131. The insulator 2131 is made of a layer of silicon oxide ($SiO_2$). A mask 2151 is formed on the rear surface of the first substrate 2100.

Figure 38B:
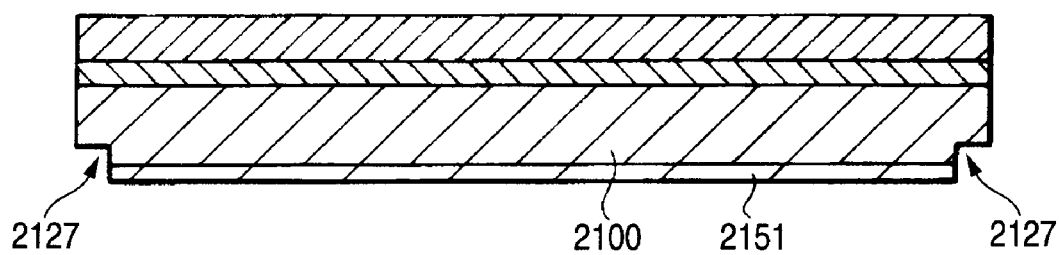

Then, as shown in FIG. 38B, alignment marks and dicing lines 2127 are formed on the rear surface side of the first substrate 2100 by etching the mask 2151 using an etching mask. These act as marks when an alignment is performed during anodic bonding of the first substrate 2100 and a second substrate (described later) and when the first and second substrates are extracted.

Figure 38C:
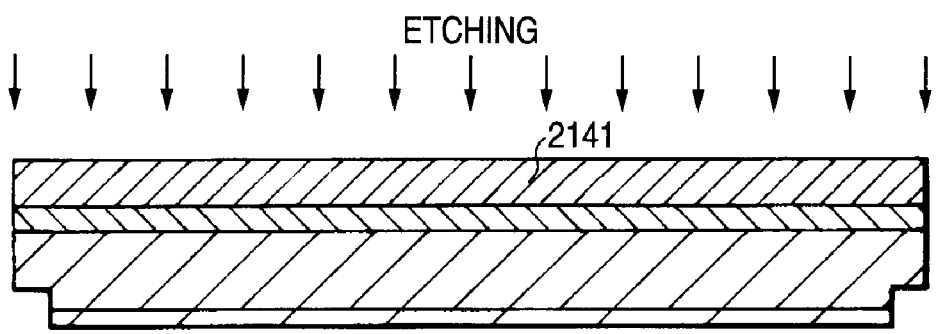

Then, as shown in FIG. 38C, the surface of the substrate is etched until the silicon layer 2141 reaches a desired film thickness. The method of etching is implemented by a wet etching process using an etchant consisting of aqueous solution of tetramethyl ammonium hydroxide (TMAH) or potassium hydroxide (KOH). Alternatively, chemical dry etching or physical dry etching may be done. If a desired film thickness is previously known, such an SOI substrate may be prepared.

Figure 39A:
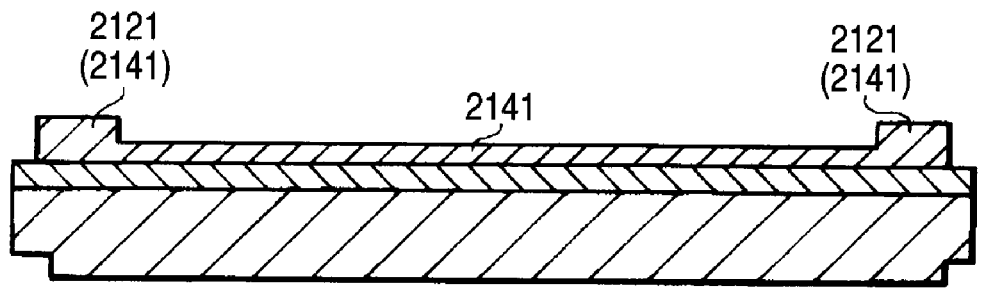
FIGS. 39A-39C are figures showing a specific fabrication sequence for an angular velocity detector (Embodiment 8) of the invention and are schematic structural cross sections showing cross sections at the same position as the cross section on line A-A' of FIG. 32.

Then, as shown in the planar layout diagrams of FIGS. 39A and 41, the silicon layer 2141 is etched to form an anodic bonding frame 2121 such that it surrounds regions in which a vibrator, support portions, resilient support bodies, and so forth will be formed. At this time, using the silicon layer 2141, equipotential interconnects 2122 and 2123 are formed outside the anodic bonding frame 2121 at a desired spacing from the anodic bonding frame 2121 such that the frame 2121 is sandwiched. Then, the silicon layer 2141 of the regions in which the vibrator, support portions, resilient support bodies, etc. will be formed within the anodic bonding frame 2121 is etched to a desired thickness. Resist masks can be used as masks in these etching steps. The etching can be implemented by wet etching using an etchant consisting of aqueous solution of tetramethyl ammonium hydroxide (TMAH) or potassium hydroxide (KOH) or by chemical or physical dry etching. The etching determines the film thicknesses of the vibrator and resilient support bodies formed later.

Figure 39B:
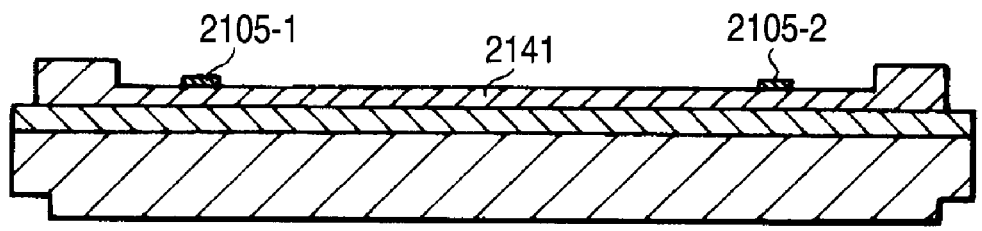
Figure 42:
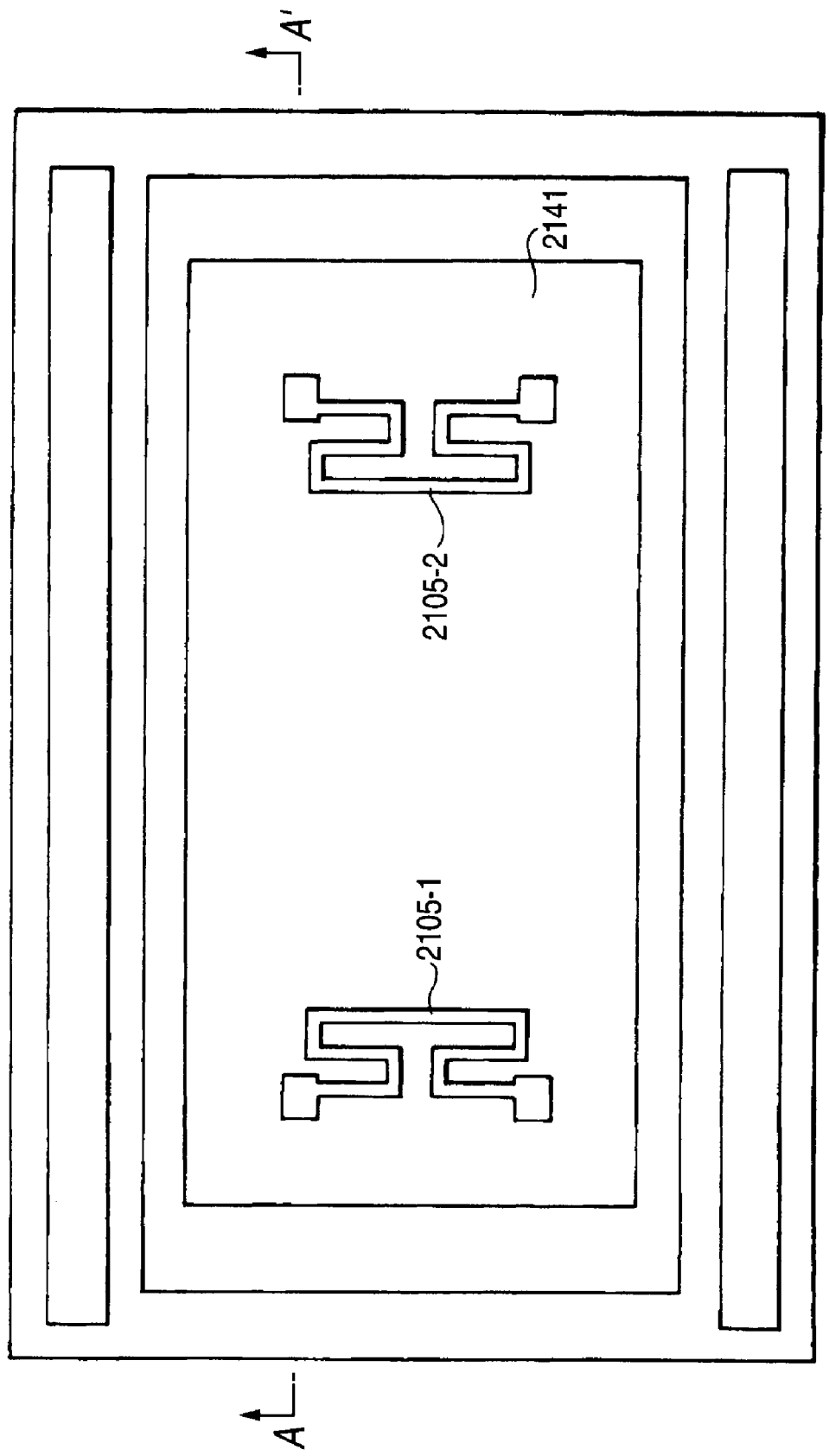
FIG. 42 is a figure showing a specific fabrication sequence (Embodiment 8) of an angular velocity detector of the invention and is a planar layout diagram of FIG. 39B.

Then, as shown in the planar layout diagrams of FIGS. 39B and 42, insulator films 2105-1 and 2105-2 are formed on the silicon layer 2141, on parts of first and second vibrators (formed later), and on resilient support bodies and support portions. The insulator films 2105-1 and 2105-2 are made, for example, of silicon oxide ($SiO_2$), silicon nitride (SiN), or a lamination film thereof. Any films can be used as the insulator films as long as they can maintain the insulation between the underlying silicon layer 2141 and the electrodes formed on the insulator films 2105-1 and 2105-2. The insulator films 2105-1 and 2105-2 can also be formed by a lift-off method. Alternatively, after forming an insulator film over the whole surface, the insulator film may be processed into the two insulator films by a lithography technique and an etching technique.

Figure 39C:
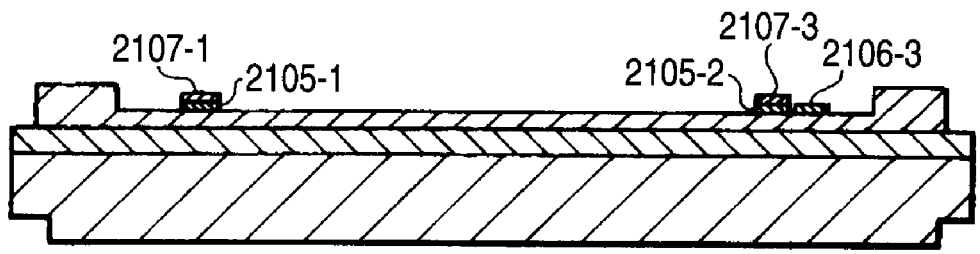
Figure 43:
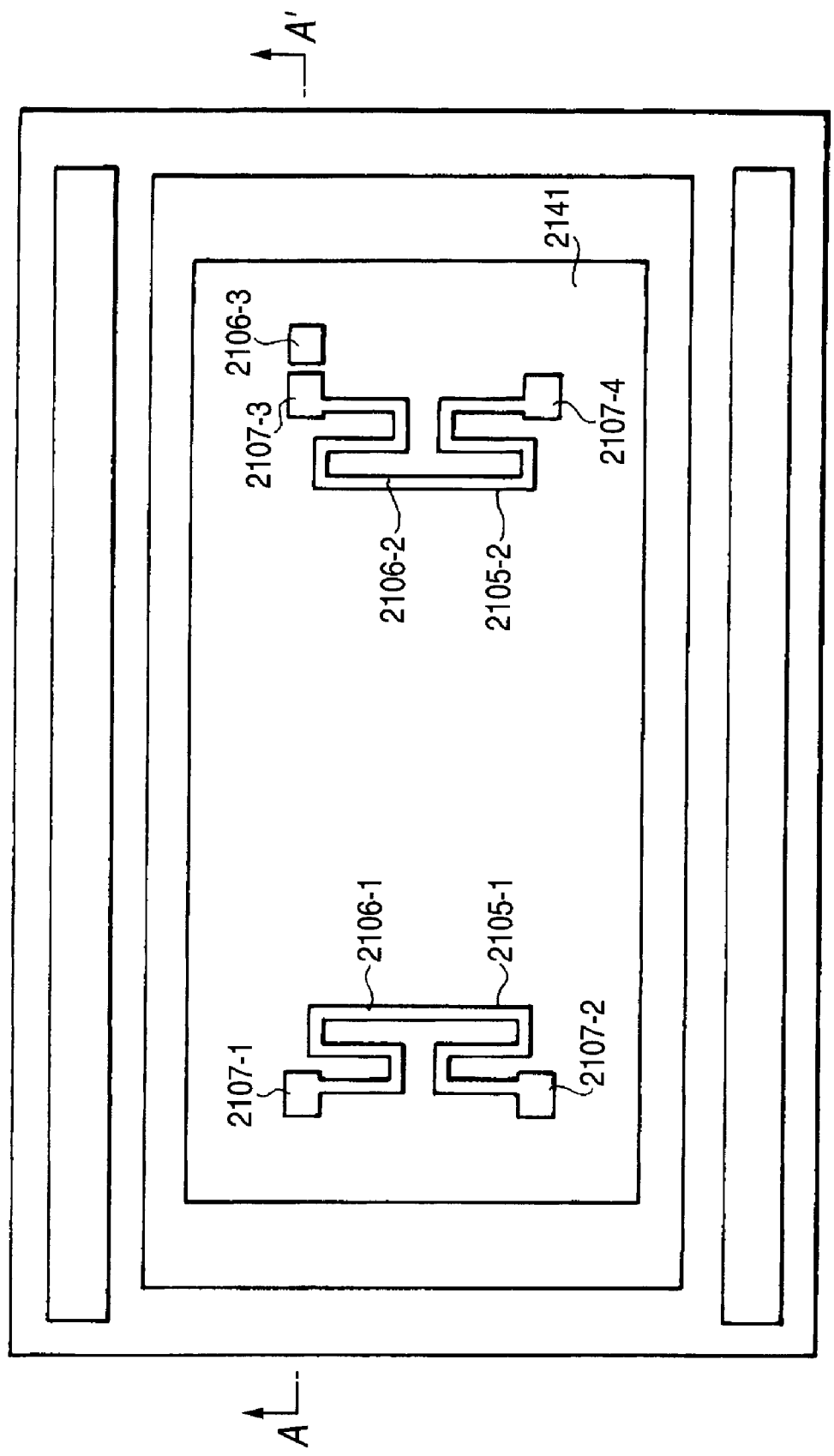
FIG. 43 is a figure showing a specific fabrication sequence (Embodiment 8) of an angular velocity detector of the invention and is a planar layout diagram of FIG. 39C.

Then, as shown in the planar layout diagrams of FIGS. 39C and 43, an electrode 2106-1 becoming a conductive interconnect for application of a Lorentz force and an electrode 2106-2 becoming a conductive interconnect for detecting an induced electromotive force are formed on the insulator film 2105-1 and on the insulator film 2105-2, respectively. Also, a conductive pad 2106-3 is formed in a region giving electrode take out positions for the resilient support bodies on the silicon layer 2141. At the same time, electrode pads 2107-1 to 2107-4 are formed on support portions (formed later) in positions at the opposite ends of the electrodes 2106-1 and 2106-2. A three-layer metal material of gold, platinum, and chromium is used as the electrode material. A three-layer metal material of gold, platinum, and titanium may also be used. Furthermore, two-layer metal materials such as gold-chromium, platinum-chromium, gold-titanium, and platinum-titanium may also be used. Instead of the titanium, a laminate material of titanium nitride and titanium may be used. In addition, copper may be used instead of chromium or titanium as described above. The electrode material can be formed, for example, by electron beam evaporation. Also, in the present embodiment, electrodes are formed by a lift-off method. Electrodes may also be formed by forming a metal material layer and then processing the metal material layer by wet etching or dry etching. A sputtering method or a CVD process may be used to form the film of the metal material, in addition to electron beam evaporation.

Figure 40A:
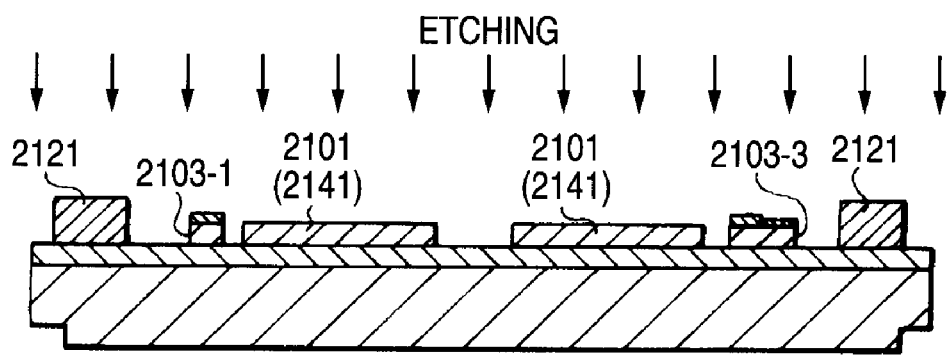
FIGS. 40A-40B are figures illustrating a specific fabrication sequence (Embodiment 8) for an angular velocity detector of the invention and are schematic structural cross sections showing cross sections at the same position as the cross section on line A-A' of FIG. 32.
Figure 44:
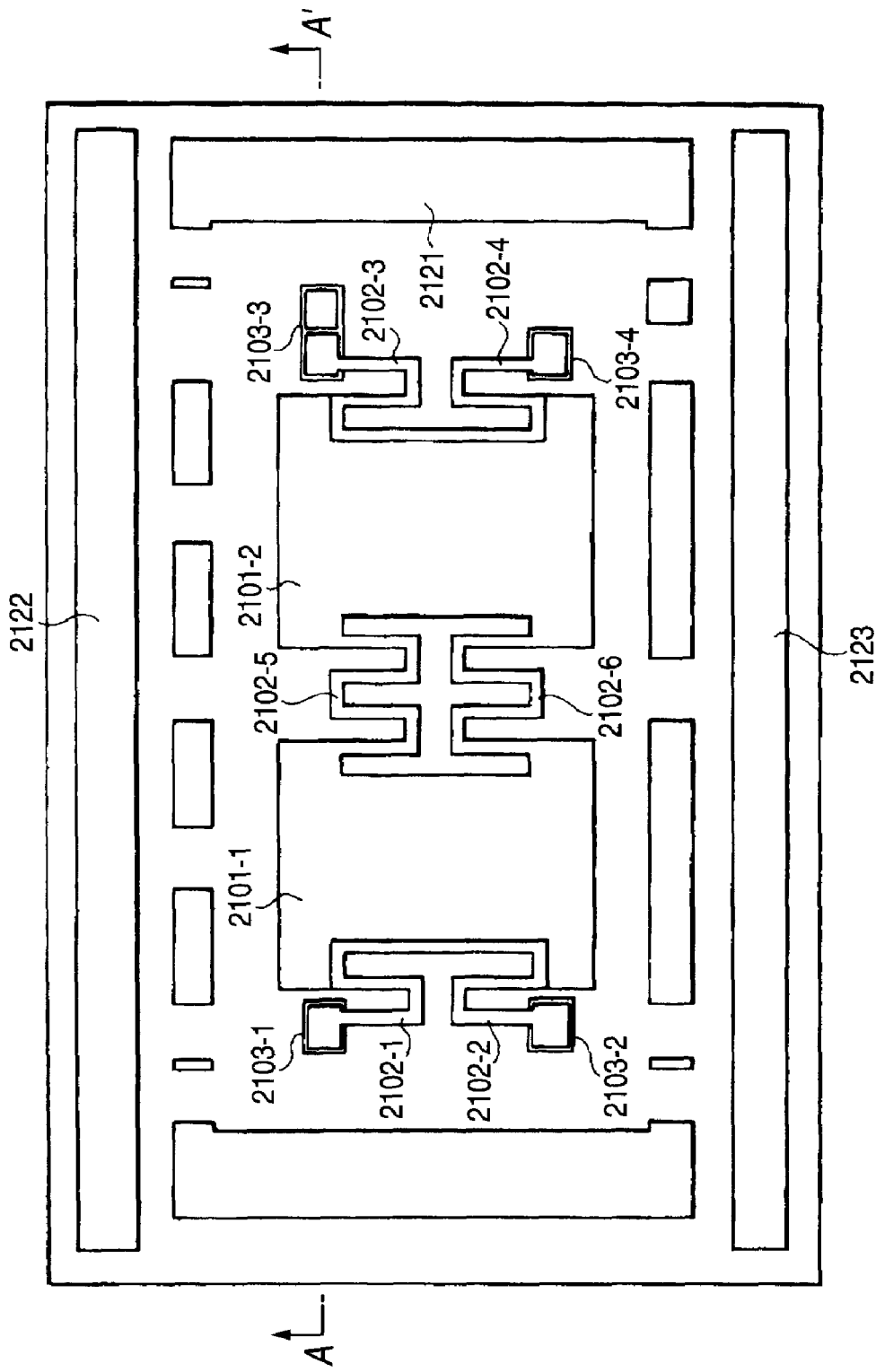
FIG. 44 is a figure showing a specific fabrication sequence (Embodiment 8) of an angular velocity detector of the invention and is a planar layout diagram of FIG. 40A.

Then, as shown in the planar layout diagrams of FIGS. 40A and 44, the silicon layer 2141 is processed using a lithography technique and an etching technique (e.g., reactive ion etching) to form a first vibrator portion 2101-1, a second vibrator 2101-2, resilient support bodies 2102-1 to 2102-6, and support portions 2103-1 to 2103-4. An anodic bonding frame 2121, equipotential interconnects 2122, 2123, etc. are completed. The first vibrator portion 2101-1, second vibrator 2101-2, resilient support bodies 2102-1 to 2102-6, and support portions 2103-1 to 2103-4 are formed. The positions at which the anodic bonding frame 2121, equipotential interconnects 2122, 2123, etc. have been already described in connection with FIGS. 32-36.

Figure 40B:
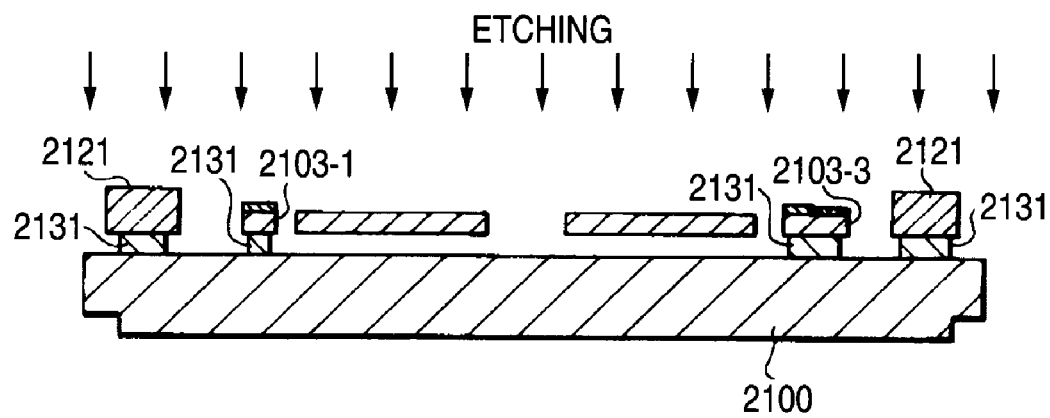
Figure 45:
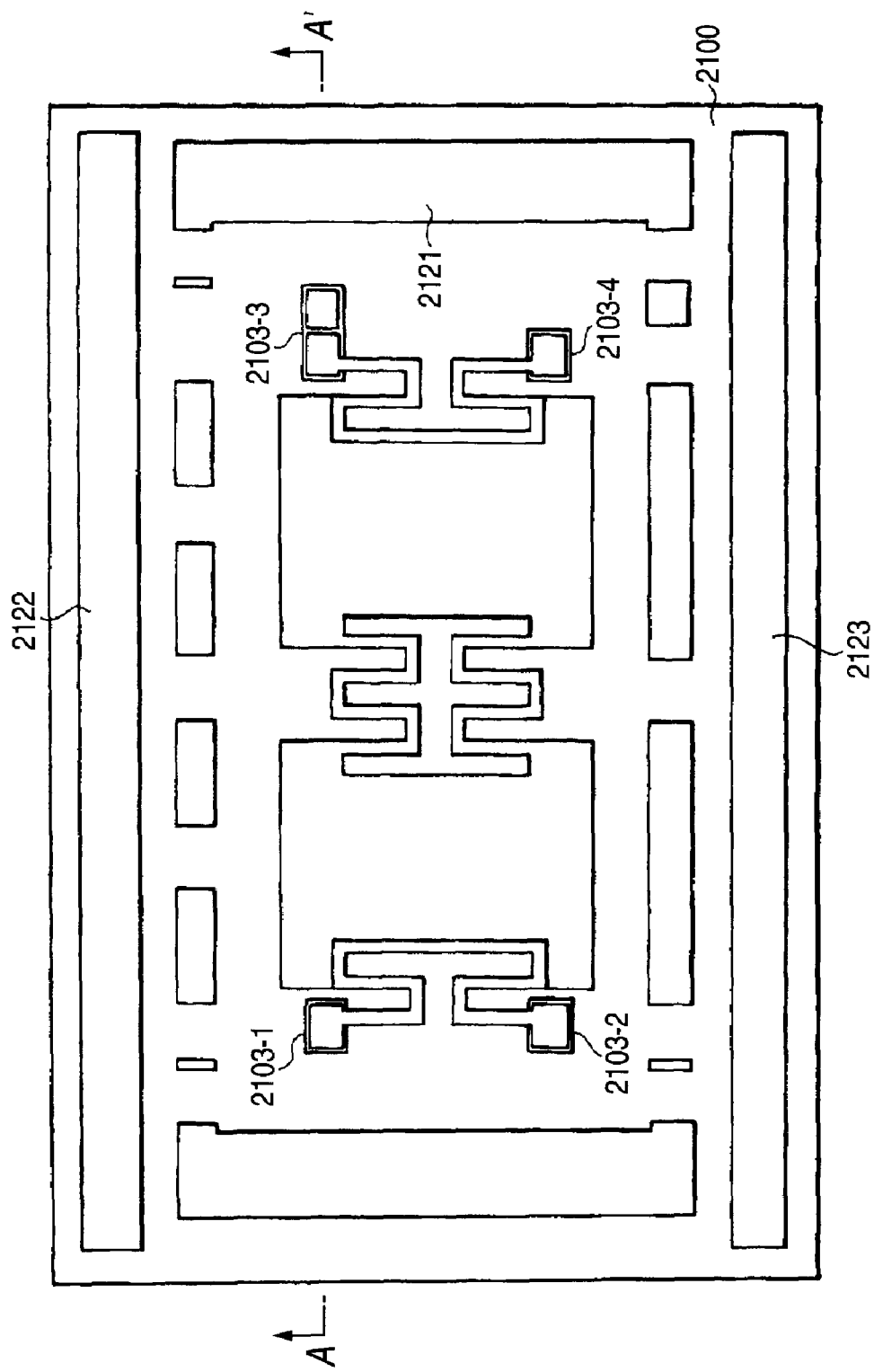
FIG. 45 is a figure showing a specific fabrication sequence (Embodiment 8) of an angular velocity detector of the invention and is a planar layout diagram of FIG. 40B.

Then, as shown in the planar layout diagrams of FIGS. 40B and 45, the insulator 2131 is removed, for example, by etching except for the portions located under the support portions 2103-1 to 2103-4, anodic bonding frame 2121, and equipotential interconnects 2122, 2123. As a result, the first vibrator portion 2101-1, second vibrator 2101-2, and resilient support bodies 2102-1 to 2102-6 are formed. The support portions 2103-1 to 2103-4 are fixed to the first substrate 2100 via the insulator 2131.

Then, a method of fabricating the second substrate 2200 is described.

Figure 46A:
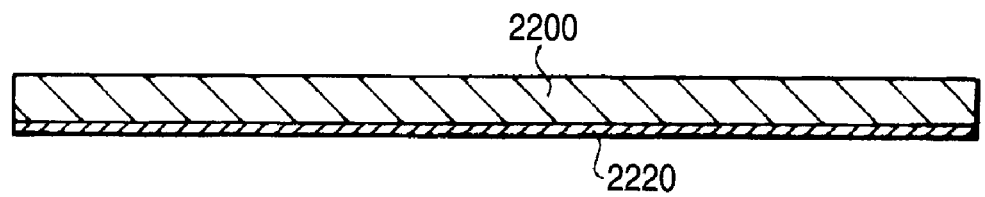
FIGS. 46A-46C are figures showing a specific fabrication sequence for an angular velocity detector (Embodiment 8) of the invention and are schematic structural cross sections showing cross sections at the same position as the cross section on line A-A' of FIG. 32.

As shown in FIG. 46A, the second substrate 2200 made of a glass substrate is prepared. Then, an interconnect electrode layer 2220 is formed on the second substrate 2200, for example, by electron beam evaporation. A three-layer metal material of gold, platinum, and chromium can be used as the interconnect electrode layer 2220. Alternatively, a three-layer metal material of gold, platinum, and titanium may be used. Alternatively, a two-layer metal material such as combinations of gold-chromium, platinum-chromium, gold-titanium, or platinum-titanium can be used. Instead of the titanium, a laminate material of titanium nitride and titanium can also be used. Also, copper can be used instead of chromium or titanium. In addition, the method of formation is not limited to electron beam evaporation. A sputtering method or CVD process can also be adopted.

Figure 46B:
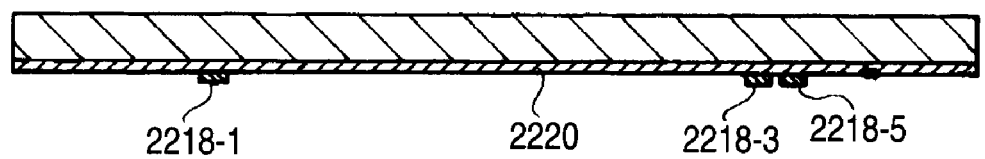
Figure 47:
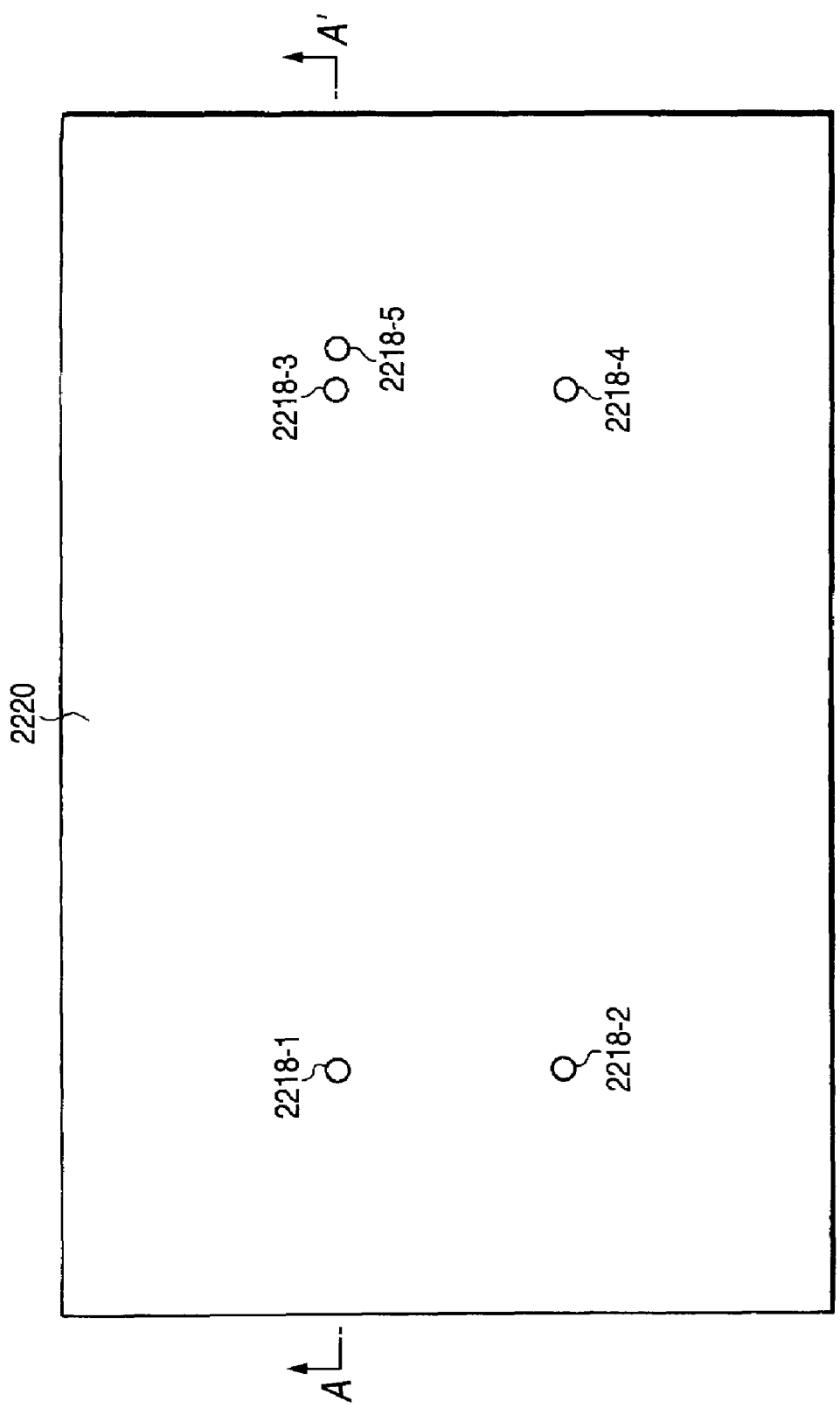
FIG. 47 is a figure showing a specific fabrication sequence (Embodiment 8) of an angular velocity detector of the invention and is a planar layout diagram of FIG. 46B.

Then, as shown in the planar layout diagrams of FIGS. 46B and 47, pillar electrodes 2218-1, 2218-2, 2218-3, 2218-4, and 2218-5 are formed on the surface of the interconnect electrode layer 2220 by an electroless plating method. The pillar electrodes 2218-1, 2218-2, 2218-3, 2218-4, and 2218-5 are used to connect the electrode pads 2107-1 to 2107-4 and conductive pad 2106-3 formed on the side of the first substrate 2100 already described in connection with FIG. 45 with extraction electrodes formed by the following process step. Each of the pillar electrodes 2218-1, 2218-2, 2218-3, 2218-4, and 2218-5 may be singular or plural for each one electrode pad or conductive pad. Where each of the pillar electrodes 2218-1, 2218-2, 2218-3, 2218-4, and 2218-5 is formed in plural for each one electrode pad or conductive pad, the pillar electrodes 2218-1, 2218-2, 2218-3, 2218-4, and 2218-5 are bent like springs during anodic bonding and can be connected with the electrode pads 2107-1 to 2107-4 and conductive pad 2106-3 with appropriate tension. To connect the extraction electrodes and electrode pads with the conductive pad, a method of connection such as spring contact or gold bumping is available. In the case of the present method using the pillar electrodes 2218-1, 2218-2, 2218-3, 2218-4, and 2218-5, application of excessive stress to the second substrate is prevented. Also, the method of fabrication is quite easy to implement. In the present embodiment, an electroless plating method is used to form the pillar electrodes 2218-1, 2218-2, 2218-3, 2218-4, and 2218-5. They can also be formed by an electrolytic plating method.

Figure 46C:
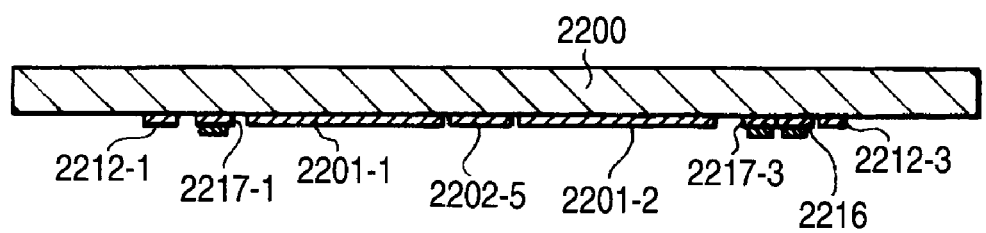
Figure 48:
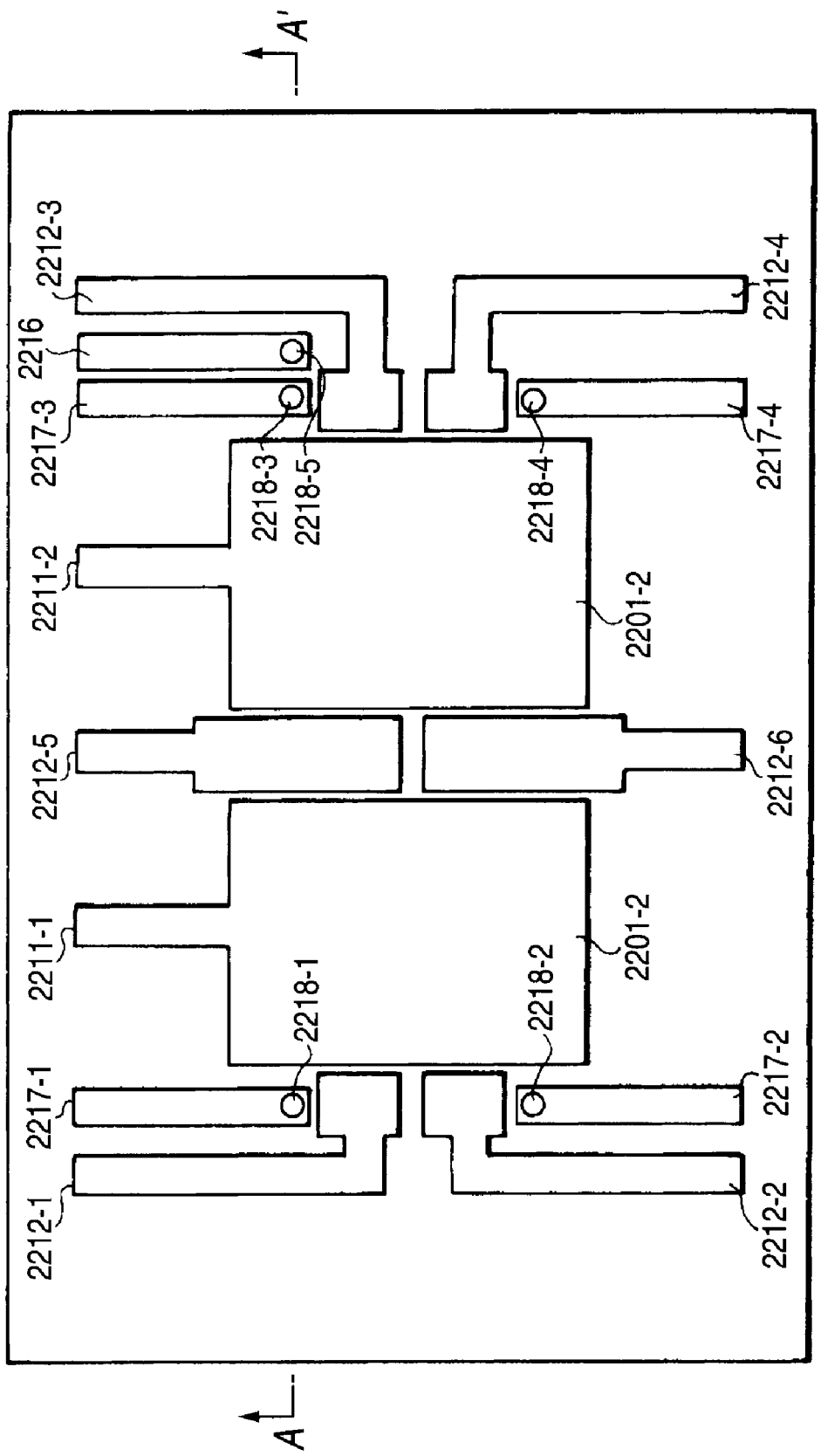
FIG. 48 is a figure showing a specific fabrication sequence (Embodiment 8) of an angular velocity detector of the invention and is a planar layout diagram of FIG. 46C.

Then, as shown in the planar layout diagrams of FIGS. 46C and 48, when the second substrate 2200 and the first substrate 2100 are placed opposite to each other and bonded by etching the interconnect electrode layer 2220, detection electrodes 2201-1 and 2201-2 are formed in positions opposite to the first vibrator 2101-1 and the second vibrator 2101-2 (see above-referenced FIG. 45). Also, detection electrodes 2202-1, 2202-2, 2202-3, 2202-4, 2202-5, and 2202-6 are formed in positions opposite to the resilient support bodies 2102-1, 2102-2, 2102-3, 2102-4, 2102-5, and 2102-6 (see the above-referenced FIG. 45). At the same time, extraction electrodes 2211-1, 2211-2, 2212-1, 2212-3, and 2212-5 which are formed continuously with the detection electrodes 2201-1, 2201-2 and detection electrodes 2202-1, 2202-3, and 2202-5 and which are brought out toward the equipotential interconnect 2122 (see the above-referenced FIGS. 13A-13C) are formed. Also, extraction electrodes 2217-1, 2217-3, and 2216 which are brought out from positions opposite to the electrode pads 2107-1, 2107-3 and conductive pad 2106-3 toward the equipotential interconnect 2122 are formed. In addition, extraction electrodes 2212-2, 2212-4, and 2212-6 which are formed continuously with the detection electrodes 2202-2, 2202-4, and 2202-6 and which are brought out toward the equipotential interconnect 2123 (see the above-referenced FIG. 45) are formed. Additionally, extraction electrodes 2217-2 and 2217-4 which are brought out from positions opposite to the electrode pads 2107-2 and 2107-4 toward the equipotential interconnect 2123 are formed.

A method of assembling the first substrate 2100 and the second substrate 2200 is next described.

Figure 49A:
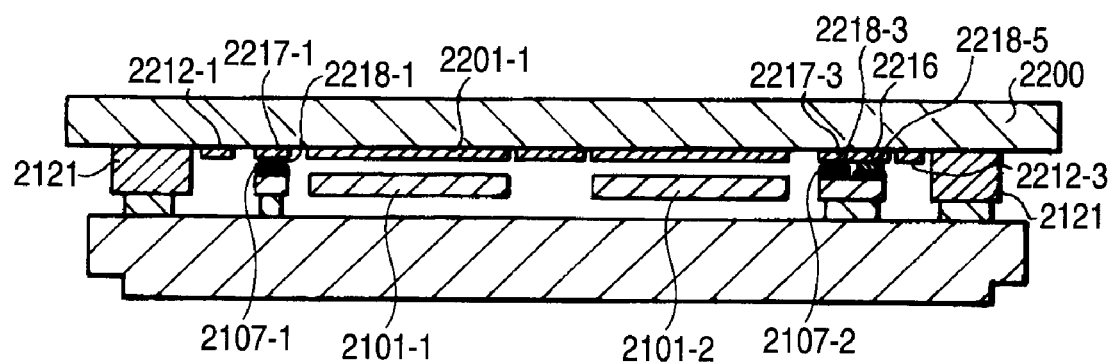
FIGS. 49A-49B are figures showing a specific fabrication sequence for an angular velocity detector (Embodiment 8) of the invention and are schematic structural cross sections showing cross sections at the same position as the cross section on line A-A' of FIG. 32.
Figure 50:
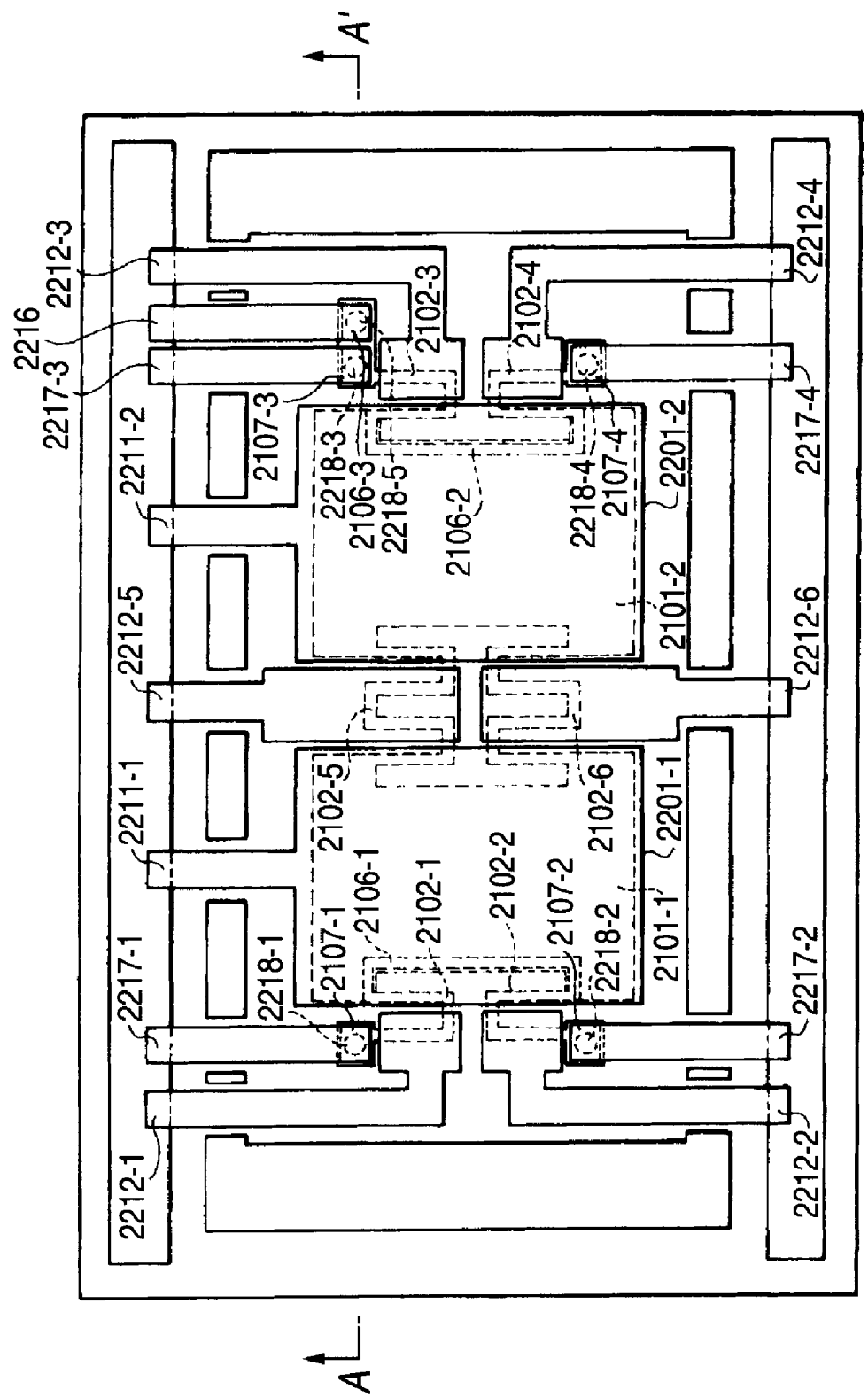
FIG. 50 is a figure showing a specific fabrication sequence (Embodiment 8) of an angular velocity detector of the invention and is a planar layout diagram of FIG. 49A.

As shown in the planar layout diagrams of FIGS. 49A and 50, the second substrate 2200 and the anodic bonding frame 2121 are bonded together by an anodic bonding method. At this time, the pillar electrodes 2218-1, 2218-2, 2218-3, 2218-4, and 2218-5 are connected with the electrode pads 2107-1 and 2107-2 formed at the opposite ends of the electrode 2106-1 for producing a Lorentz force, electrode pads 2107-3 and 2107-4 formed at the opposite ends of the electrode 2106-2 for detecting an induced electromotive force produced when the vibrators are electromagnetically driven, respectively, to operate, and the conductive pad 2106-3. Furthermore, the extraction electrodes 2211-1, 2211-2, 2212-1, 2212-3, 2212-5, 2217-1, 2217-3, and 2216 are connected with the equipotential interconnect 2122. The extraction electrodes 2212-2, 2212-4, 2212-6, 2217-2, and 2217-4 are connected with the equipotential interconnect 2123. Consequently, during anodic bonding, the first and second vibrators 2101-1, 2101-2, resilient support bodies 2102-1 to 2102-6, and detection electrodes 2201-1, 2201-2, and 2202-1 to 2202-6 become equipotential. This prevents the first and second vibrators 2101-1 and 2101-2 from being stuck to the detection electrodes 2201-1 and 2201-2.

Then, the first substrate 2100 and the second substrate 2200 are cut in to desired size by dicing to fabricate individual chips. The cutting can be done, for example, along the outer surface of the anodic bonding frame 2121. Accordingly, during dicing, the extraction electrodes 2211-1, 2211-2, 2212-1, 2212-3, 2212-5, 2217-1, 2217-3, and 2216 which are connected to the equipotential interconnect 2122 are cut into individual ones by the equipotential interconnect 2122. Also, during the dicing, the extraction electrodes 2212-2, 2212-4, 2212-6, 2217-2, and 2217-4 which are connected to the equipotential interconnect 123 are cut into individual ones by the equipotential interconnect 2123.

Figure 49B:
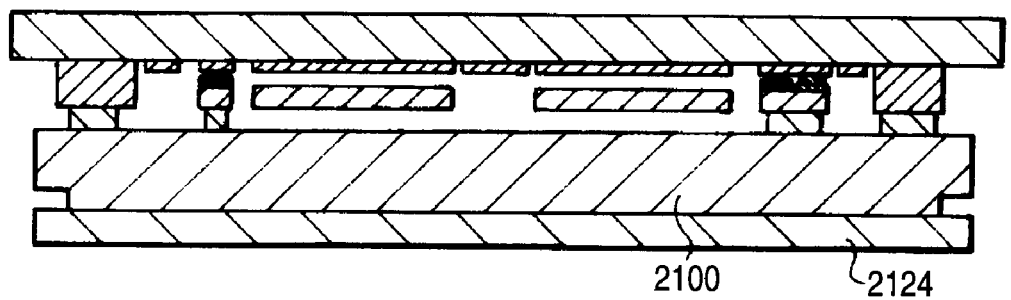

Then, as shown in FIG. 49B, a magnet 2124 is disposed under the first substrate 2100. Then, wires (not shown) are brought out from the extraction electrodes 2211-1, 2211-2, 212-1, 2212-2, 2212-3, 212-4, and 212-5, thus fabricating a chip for the angular velocity detector.

In the anodic bonding in the method of fabricating the angular velocity detector 2001, the vibrators and the detection electrodes are made equipotential by the extraction electrodes. Thus, the anodic bonding can be done at an applied voltage in a region where anodic bonding can be stably performed without increasing the electrostatic attraction between the vibrators and the detection electrodes. As a result, the anodic bonding can be performed stably without producing defective sticking of the vibrators to the second substrate. Hence, the sensor sensitivity can be enhanced by narrowing the gaps between each vibrator and each detection electrode.

As described so far, the angular velocity detector of the invention is fabricated by the method of fabricating an angular velocity detector in accordance with the invention.

In particular, the angular velocity detector 2001 of the invention is equipped with the first substrate 2100, the support portions 2103-1 to 2103-4 formed on the surface of the first substrate 2100, the resilient support bodies 2102-1 to 2102-6 connected with the support portions 2103-21 to 103-4 at their respective one ends, the first and second vibrators 2101-1 and 2101-2 supported to the other ends of the resilient support bodies 2102-1 to 2102-6 while poised at a certain spacing from the surface of the first substrate 2100, the first and second vibrators 2101-1 and 2101-2 capable of being displaced relative to the first substrate 2100, the detection electrodes 2201-1 and 2201-2 used to detect the displacements of the first and second vibrators 2101-1 and 2101-2 and mounted on the opposite sides of spaces from the first and second vibrators 2101-1 and 2101-2, and the second substrate 2200 located opposite to the first substrate 2100 and having the detection electrodes 2201-1 and 2201-2 thereon. Main components include the extraction electrodes 2217-1 to 2217-4 for making equipotential the first and second vibrators 2101-1, 2101-2 and detection electrodes 2201-1, 2201-2 when the first substrate 2100 and the second substrate 2200 are bonded together, together with the extraction electrodes 2211-1 and 2211-2 brought out from the detection electrodes 2201-1 and 2201-2. The extraction electrodes 2217-1 to 2217-4 are brought out from the electrode pads 2107-1 to 2107-4 of the resilient support bodies 2102-1 to 2102-4 and from the first and second vibrators 2101-1 and 2101-2.

Embodiment 9

Figure 51:
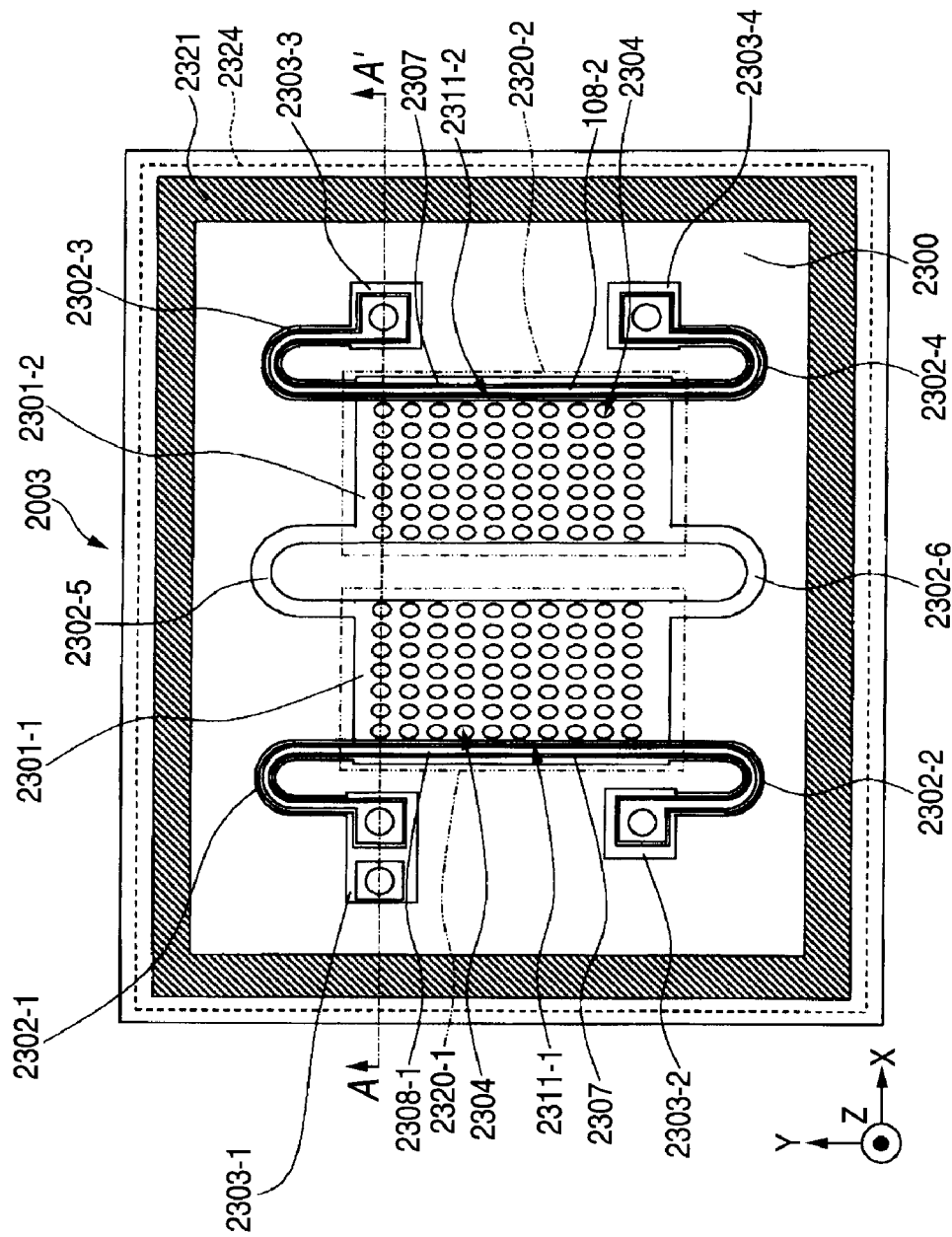
FIG. 51 is a schematic structural plan view showing one embodiment associated with an angular velocity detector (Embodiment 9) of the invention.
Figure 52:
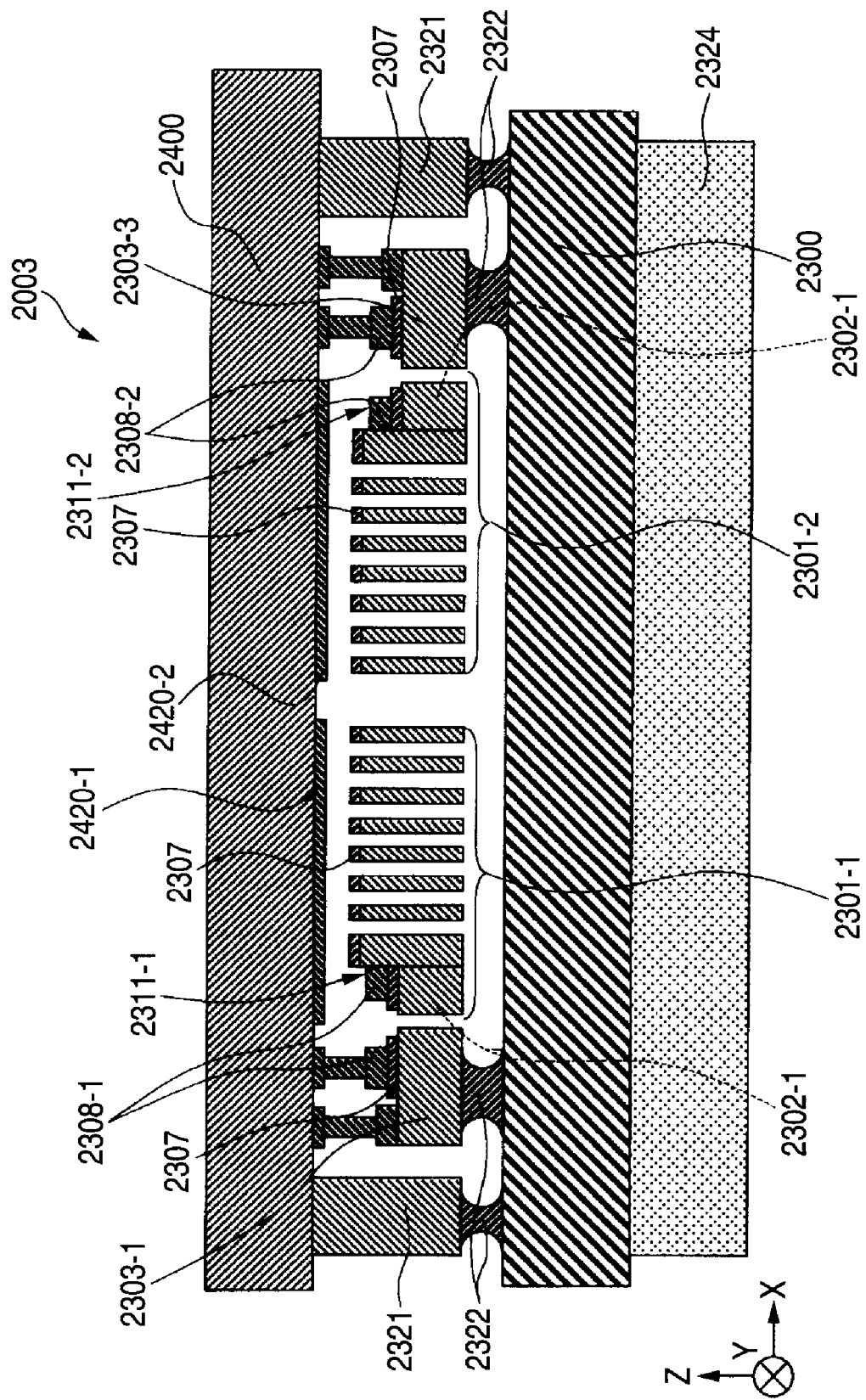
FIG. 52 is a schematic cross section showing one embodiment associated with an angular velocity detector (Embodiment 9) of the invention.

One embodiment associated with an angular velocity detector of the invention is next described by referring to the plan view of FIG. 51 and the cross section of FIG. 52 taken on line A-A of FIG. 51. In this embodiment, an example of structure in which electrodes are buried in an angular velocity detector having two vibrators is shown. Note that the cross section of FIG. 52 schematically shows the structure. FIG. 52 is not drawn to the same scale as the plan view of FIG. 51.

As shown in FIGS. 51 and 52, the angular velocity detector 2003 is equipped with a first vibrator 2301-1 and a second vibrator 2301-2 parallel to each other. Each of the first and second vibrators 2301-1 and 2301-2 consists of a rectangular thin film. As one example, the thin film is made of a silicon layer. The opposite corner portions of the first and second vibrators 2301-1 and 2301-1 are connected by resilient support bodies 2302-5 and 2302-6. The corner portions of the first vibrator 2301-1 on the opposite side of the second vibrator 2301-2 are supported by respective one ends of resilient support bodies 2302-1 and 2302-2. The other ends of the resilient support bodies 2302-1 and 2302-2 are supported and fixed to support portions 2303-1 and 2303-2, respectively. The corner portions of the second vibrator 2301-2 on the opposite side of the first vibrator 2301-1 are supported by respective one ends of resilient support bodies 2302-3 and 2302-4. The other ends of the resilient support bodies 2302-3 and 102-4 are supported and fixed to support bodies 2303-3 and 2303-4, respectively. For example, each of the resilient support bodies 2302-1 to 2302-6 is made of a leaf spring and consists, for example, of a silicon layer. Each resilient support body is shaped, for example, like the letter U. The support portions 2303-1, 2303-2, 2303-3, and 2303-4 are fixedly mounted to the first substrate 2300 via an insulator 2122. Accordingly, the first vibrator 2301-1 and the second vibrator 2301-2 are supported only by the resilient support bodies 2302-1, 2302-2, 2302-3, and 2302-4 and completely poised above the first substrate 2300.

In the angular velocity detector 2003 of the invention, the surfaces of the resilient support bodies 2302-1, to 2302-4 on which electrodes are formed are made lower toward the first substrate 2300 from the top surfaces of the first vibrator 2301-1 and the second vibrator 2301-2. The portions of the first vibrator 2301-1 and the second vibrator 2301-2 in which the electrodes are formed consist of dug portions 2311-1 and 2311-2 formed into parts of the top surfaces of the first vibrator 2301-1 and the second vibrator 2301-2.

An electrode 2308-1 for electromagnetically driving the first vibrator 2301-1 is disposed in the dug portion 2311-1 formed in the first vibrator 2301-1 via an insulator film 2307 and extends from the support portion 2302-1 to the support portion 2303-2 through the resilient support body 2302-1, through the dug portion 2311-1 in the first vibrator 2301-1, and through the resilient support body 2302-2. Similarly, an electrode 2308-2 for electromagnetically driving the second vibrator 2301-2 is disposed in the dug portion 2311-2 in the second vibrator 2301-2 via an insulator film 2307 and extends from the support portion 2302-3 to the support portion 2303-4 through the resilient support body 2302-3, through the dug portion 2311-2 in the first vibrator 2301-2, and through the resilient support body 2302-4.

Each of the first and second vibrators 2301-1 and 2301-2 is provided with a plurality of through-holes 2304 to mitigate air damping. The through-holes 2304 reduce the squeezing effect of the narrow gaps with a second substrate 2400 mounted above the first and second vibrators 2301-1 and 2301-2. Accordingly, the through-holes are preferably uniformly distributed to attain a balance between the first and second vibrators 2301-1 and 2301-2. The second substrate 2400 is described next.

The second substrate 2400 is formed over the first substrate 2300 via a frame 2321. The second substrate 2400 is made, for example, of a glass substrate. Counter electrodes 2420-1 and 2420-2 are formed on the surface of the second substrate 2400 opposite to the first substrate 2300 and in positions opposite to the first vibrator 2301-1 and second vibrator 2301-2.

The principle of detection of angular velocities by the angular velocity detector 2003 is next described. The principle of detection of angular velocities is to detect the variations in the capacitance between the first vibrator 2301-1 and the opposite counter electrode 2420-1 and in the capacitance between the second vibrator 2301-2 and the opposite counter electrode 2420-2 when the first and second vibrators 2301-1 and 2301-2 are vibrated in the X-direction by a Lorentz force and an angular velocity is applied from the outside. At this time, the first and second vibrators 2301-1 and 2301-2 move in the Z-direction, involving a Coriolis force. The counter electrodes 2420-1 and 2420-2 are disposed under the second substrate 2400 made of a glass substrate. The counter electrodes 2420-1 and 2420-2 are installed by anodically bonding together the frame 2421 formed on the silicon side and the second substrate 2400 made of a glass substrate. The Lorentz force is produced in a direction perpendicular to the direction of application of an electrical current of a certain frequency by supplying the current through the electrodes 2308-1 and 2308-2 in response to a magnetic field produced from a magnet 2324 installed under the first substrate 2300. With respect to the magnetic field, the magnet 2324 is installed such that the N or S pole of the magnetic field faces in the Z-axis direction. In the present embodiment, the magnet is installed under the first substrate 2300. Similar results are obtained if the magnet is installed above the second substrate 2400.

When a Lorentz force is produced, an induced electromotive force is produced across each electrode disposed over the second vibrator 2301-2. The induced electromotive force has the same period as that of the Lorentz force. When a capacitance variation is read, a carrier wave is superimposed between the counter electrode 2420-1 on the side of the second substrate 2400 and the first vibrator 2301-1 and between the counter electrode 2420-2 on the side of the second substrate and the second vibrator 2301-2. An electrical current produced by the capacitance variation is amplified, whereby an actual signal is taken. The carrier wave is removed by synchronous detection. With respect to the driving wave, an AC signal corresponding to the angular velocity can be taken by detecting the wave with the periodic component of the induced electromotive force.

The problem is that there is a possibility that the electrodes 2308-1 and 2308-2 for producing a Lorentz force are brought into contact with the counter electrodes 2420-1 and 2420-2 installed above the first and second vibrators 2301-1 and 2301-2 in an opposite relationship thereto by a large impact from the out side. Since it is necessary to supply an electrical current of several mA into the electrodes 2308-1 and 2308-2, if an excessive current flows into the counter electrode 2420 for detecting capacitance variations, there is a possibility that a minute capacitance-detecting amplifier connected with the electrode is damaged. Accordingly, in the invention, dug portions 2311-1 and 2311-2 are formed in the electrode interconnect portions of the first and second vibrators 2301-1 and 2301-2. The total of the thickness of the electrodes 2308-1, 2308-2 and the thickness of the insulator layer 2307 is set not greater than the depth of the dug portions 2311-1 and 2311-2. If the first and second vibrators 2301-1 and 2301-2 should touch the counter electrodes 2420-1 and 2420-2 due to large impact, the structure prevents the electrodes 2308-1 and 2308-2 from touching the counter electrodes 2420-1 and 2420-2. Furthermore, since the resilient support bodies 2302-1 to 2302-4 are so formed that the height of the electrodes 2308-1 and 2308-2 formed on the resilient support bodies 2302-1 to 2302-4 is lower than the height of the first and second vibrators 2301-1 and 2301-2 as viewed from the side of the first substrate 2300, the electrodes 2308-1 and 2308-2 are prevented from touching the counter electrodes 2420-1 and 2420-2 also with respect to the resilient support bodies 2302-1 to 2302-4.

Embodiment 10

One embodiment associated with a method of fabricating an angular velocity detector of the invention is described by referring to the schematic structural cross sections and plan view of FIGS. 53A-59.

Figure 53A:
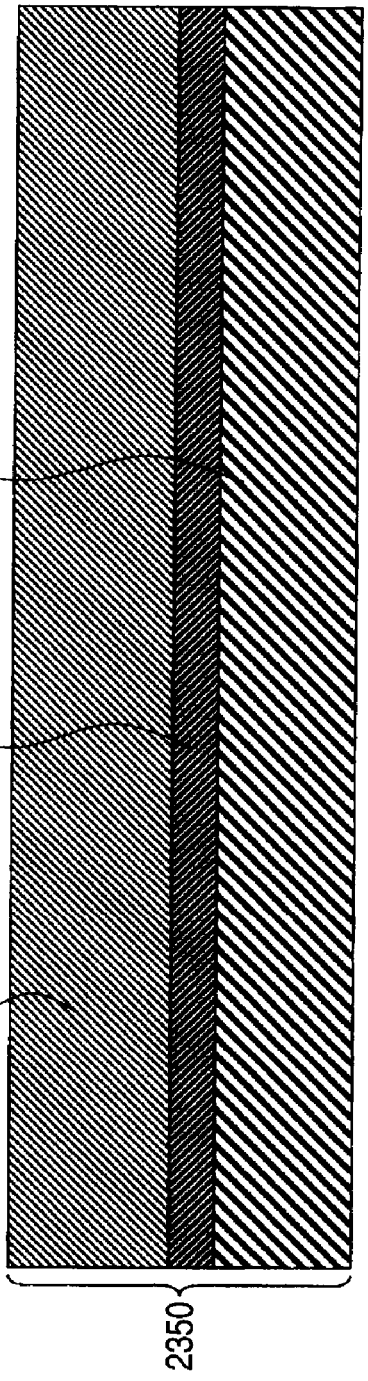
FIGS. 53A-53B are schematic cross sections showing one embodiment associated with a method of fabricating an angular velocity detector (Embodiment 10) of the invention.

As shown in FIG. 53A, an SOI (silicon-on-insulator) substrate 2350 having an insulator layer 2322 sandwiched between an upper silicon layer 2350-1 and a lower silicon layer 2350-2 is used. The insulator layer 2322 is made, for example, of a film of silicon oxide ($SiO_2$). Here, the lower silicon layer 2350-2 corresponds to the first substrate 2300 of the above-described Embodiment 1. The silicon layer is hereinafter described as the first substrate 2300. A vibrator and resilient support bodies (such as springs) are fabricated from this SOI substrate 2350. Alignment marks used for alignment with a second substrate (not shown) and marks (not shown) becoming dicing lines are formed by normal lithography technique and etching technique. These act as indicia during alignment when the first substrate 2300 is cut out during anodic bonding of the first substrate 2300 and second substrate (not shown) consisting of a silicon substrate described later.

Then, the whole surface of the SOI substrate 2350 on the side of the upper silicon layer 2350-1 is etched such that the upper silicon layer 2350-1 assumes a desired film thickness. This method of etching can be implemented by wet etching using tetramethyl ammonium hydroxide (TMAH) or potassium hydroxide (KOH) or by chemical or physical dry etching. If the desired film thickness of the upper silicon layer 2350-1 is previously known, an SOI substrate having the upper silicon layer 2350-1 of the desired film thickness may be prepared.

Figure 53B:
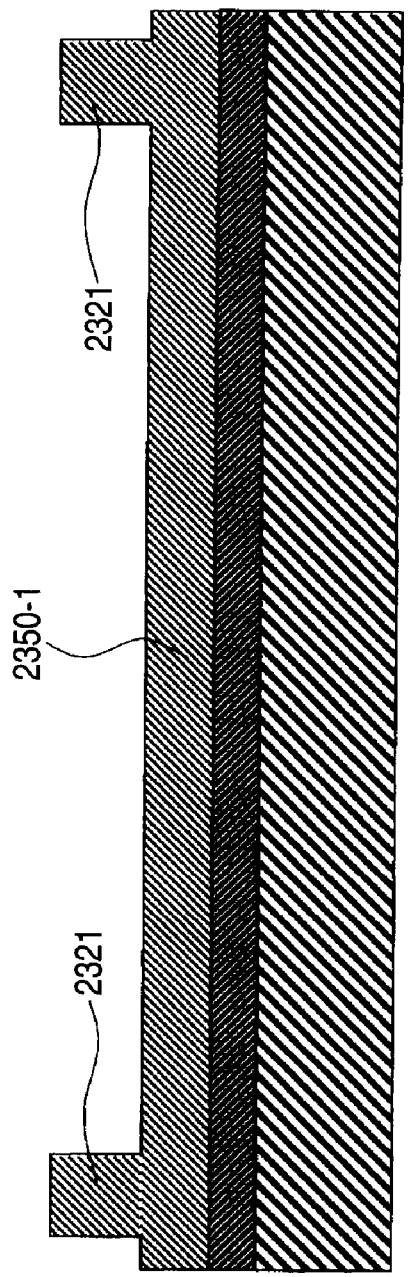

Then, as shown in FIG. 53B, an anodic bonding frame 2321 is formed by processing the upper silicon layer 2350-1 by normal lithography technique and etching technique. This method of etching can be implemented by wet etching using tetramethyl ammonium hydroxide (TMAH) or potassium hydroxide (KOH) or by chemical or physical dry etching. This etching determines the film thickness of the vibrator.

Figure 54A:
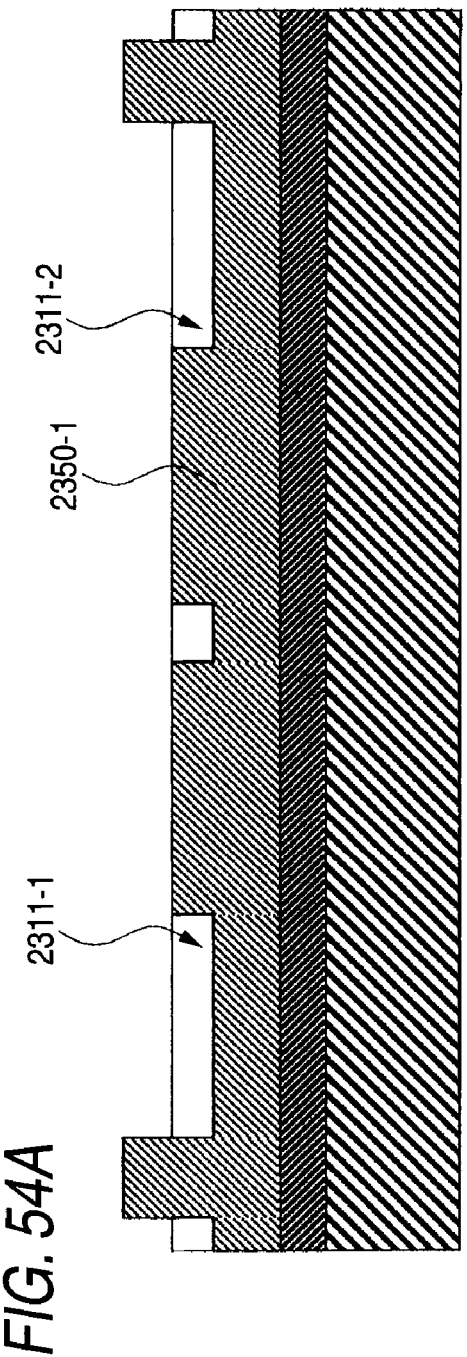
FIGS. 54A-54B are schematic cross sections showing one embodiment associated with a method of fabricating an angular velocity detector (Embodiment 10) of the invention.

As shown in FIG. 54A, dug portions 2311-1 and 2311-2 are formed in the upper silicon layer 2350-1. At the same time, portions becoming resilient support bodies (such as springs) and support portions are etched in the same way as the dug portions 2311-1 and 2311-2.

Figure 54B:
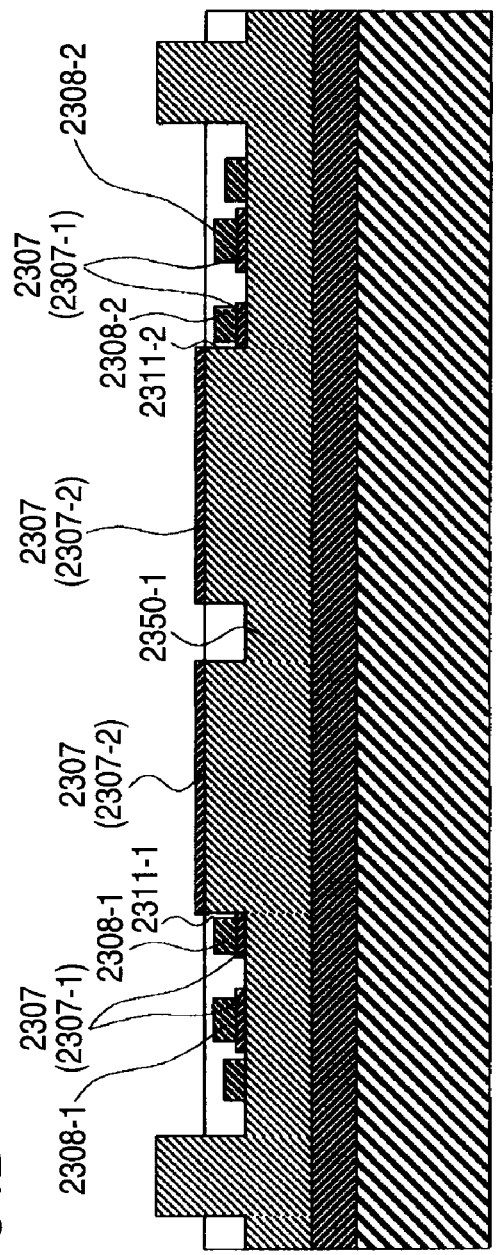

Then, as shown in FIG. 54B, an insulator film 2307 is formed on the upper silicon layer 2350-1 and then the insulator film 2307 is patterned using a lithography or etching technique to form an insulator film 2307-1 over parts of a planned region of the vibrator, over planned regions of springs, and over planned regions of support portions. Also, an insulator film 2307-2 becoming a stopper for the vibrator is formed. The insulator film 2307 may be also formed on the sidewalls of the dug portions 2311-1 and 2311-2. Any film can be used as the insulator film 2307 as long as it can maintain the insulation between the electrode and the lower silicon layer 2350-2. For example, the insulator film can be made of silicon oxide ($SiO_2$) or silicon nitride (SiN). Since the insulator film 2307-2 is formed also over the planned region of the vibrator, the insulation can be maintained when the vibrator and the electrodes on the second substrate side touch each other.

Then, electrodes (interconnects) 2308-1 and 2308-2 are formed on the insulator film 2307-1. The interconnect material is formed by electron beam evaporation. In the present embodiment, the patterning of the interconnects can be done by a lift-off method. Alternatively, after forming a mask by a lithography technique, the patterning may be done by wet etching or dry etching using the mask. Also, in the present embodiment, a three-layer metal material of gold, platinum, and chromium is used as an interconnect material. A three-layer metal material of gold, platinum, and titanium may also be used. Furthermore, two-layer metal materials such as gold-chromium, gold-platinum, and gold-titanium may also be used. Instead of the titanium, a laminate material of titanium nitride and titanium may be used. In addition, copper may be used instead of chromium or titanium. A sputtering method or CVD process can be used as the method of formation.

Figure 56:
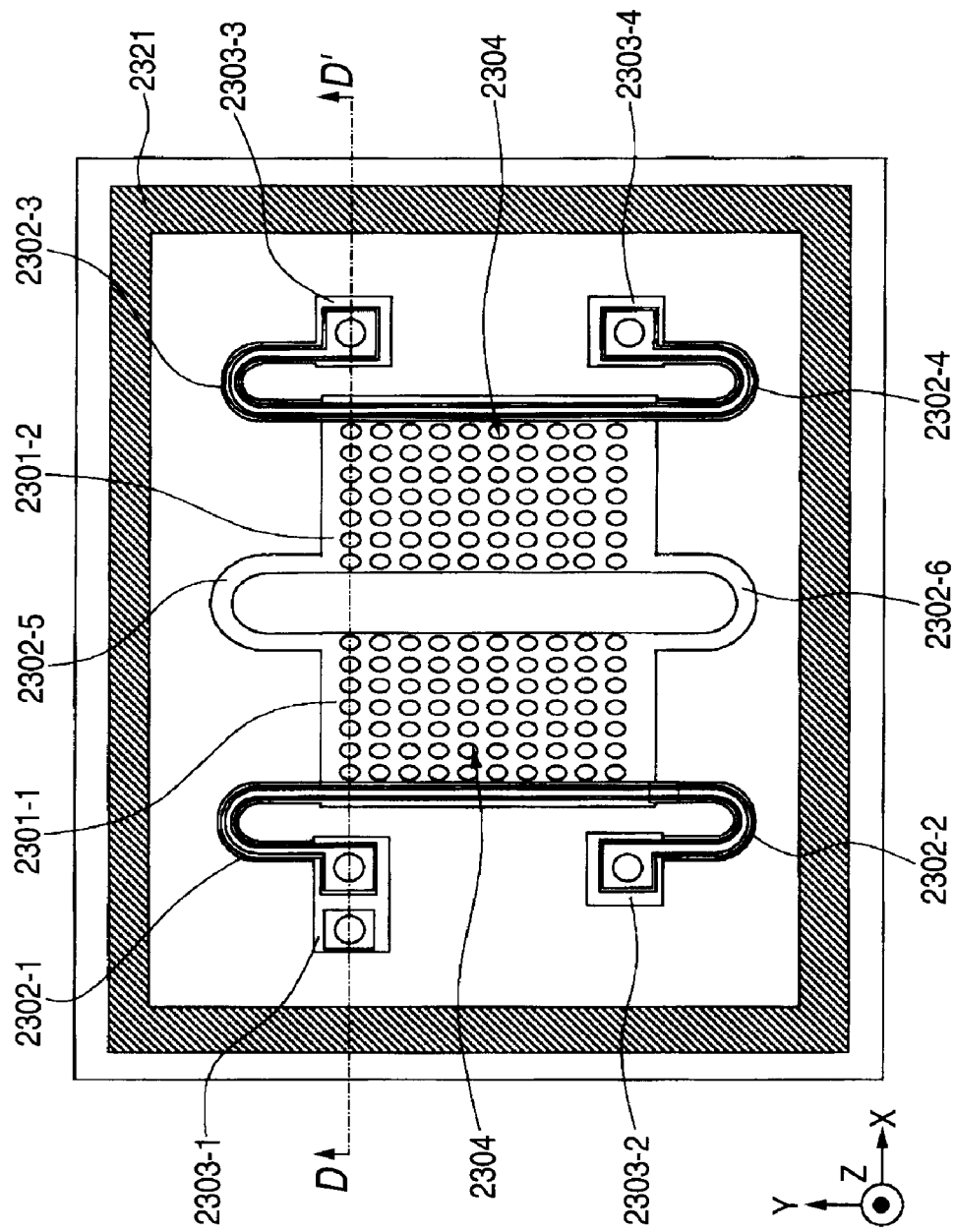
FIG. 56 is a schematic structural plan view showing one embodiment associated with a method of fabricating an angular velocity detector (Embodiment 10) of the invention.

Then, as shown in FIGS. 55A and 56, a mask for forming vibrators, springs, and a frame for anodic bonding is fabricated by a normal lithography technique. Vibrators 2301-1, 2301-2, springs 2302-1, 2302-2, 2302-3, 2302-4 supporting the vibrators 2301-1, 2301-2, springs 2302-5, 2302-6 for connecting the vibrators 2301-1, 2301-2, and support portions 2303-1, 2303-2, 2302-3, 2302-4 for supporting the springs 2302-1, 2302-2, 2302-3, 2302-4, respectively, are formed by an etching technique using the mask. A frame 2321 for anodic bonding is also formed. For example, reactive ion etching can be used for the etching. During the etching step for forming the vibrator 2301, a number of through-holes 2304 are preferably formed in the vibrators 2301-1 and 2301-2. Where the inner surfaces of the vibrators 2301-1 and 2301-2 are partitioned into small regions, the through-holes 2304 may be arranged at random if the through-holes 2304 in each region are distributed at a uniform density. The through-holes may also be arranged at equal intervals. Although FIG. 55A is a cross-sectional view taken on line D-D' of FIG. 56, FIGS. 55A and 56 are not always drawn to the same scale.

Then, as shown in FIG. 55B, the insulator layer 2322 is etched away. At this time, the portions of the insulator layer 2322 which are located under the support portions 2303-1, 2303-2, 2303-3, 2303-4 and under the frame 2321, respectively, are left unetched and connected with the first substrate 2300. The other portions become a hollow structure. In consequence, the vibrators 2301-1, 2301-2, springs 2302-1, 2302-2, 2302-3, 2302-4, 2303-5, and 2303-6 (see the above-referenced FIG. 56) are poised.

A method of fabricating the second substrate is next described.

As shown in FIG. 57A, an electrode (interconnect) material layer 2407 is formed on the second substrate 2400 by electron beam evaporation. For example, a glass substrate can be used as the second substrate 2400. A three-layer metal material of gold, platinum, and chromium can be used as the electrode material. Furthermore, a three-layer metal material of gold, platinum, and titanium may also be used. In addition, a two-layer metal material such as gold-chromium, gold-platinum, platinum-chromium, gold-titanium, or platinum-titanium may also be used. Instead of the titanium, a laminate material of titanium nitride and titanium may be used. In addition, copper may be used instead of chromium or titanium. A sputtering method or a CVD process may be used as the method of formation.

Then, as shown in FIG. 57B, a contact portion 2408 is formed on the surface of the electrode material layer 2407 by an electroless plating method. For example, this contact portion 2408 is made by gold plating. This makes contact with the electrodes on the first substrate (see the above-referenced FIG. 55B) after the anodic bonding. Accordingly, the contact portion is formed in a position opposite to the contact portions of the electrodes formed on the first substrate after the anodic bonding. In the present embodiment, an electroless plating method is used. However, the contact portion can also be formed by an electrolytic plating method.

Then, as shown in FIG. 57C, after forming a mask (not shown) for forming electrodes by a lithography technique, the electrode material layer 2407 is patterned by an etching technique using the mask to form counter electrodes 2420-1, 2420-2 on the side of the second substrate 2400 and extraction electrodes 2420-3, 2420-4.

A method of assembling the first and second substrates is next described.

Figure 58:
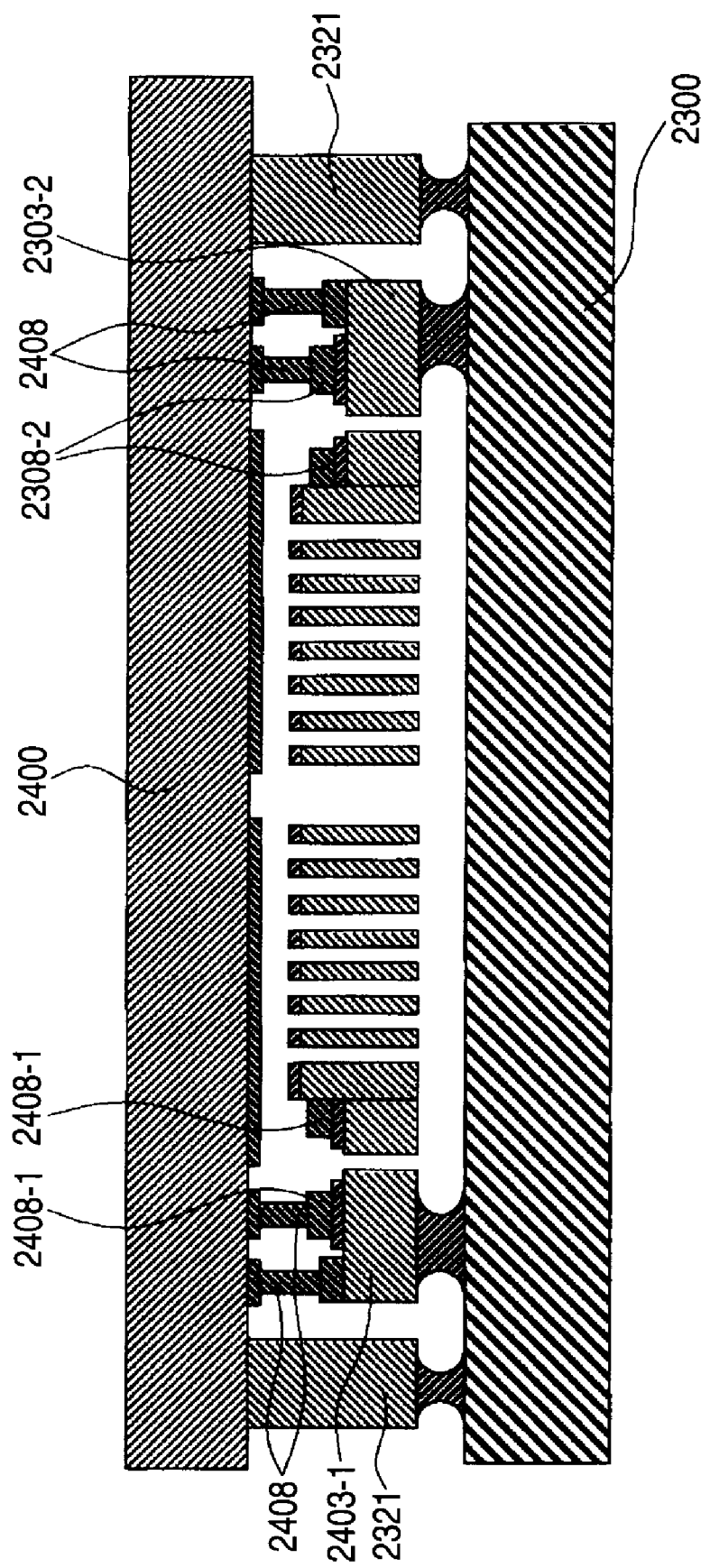
FIG. 58 is a schematic cross section showing one embodiment associated with a method of fabricating an angular velocity detector (Embodiment 10) of the invention.

Then, as shown in FIG. 58, the second substrate 2400 made of a glass substrate and the frame 2321 made of silicon are bonded together by an anodic bonding method. At this time, the contact portion 2408 is made contact with pad portions of the electrodes 2308-1 and 2308-2 which are formed on the support portions 2303-1, 2303-2 and support portions 2303-3, 2303-4, respectively, and which act to produce a Lorentz force.

Figure 59:
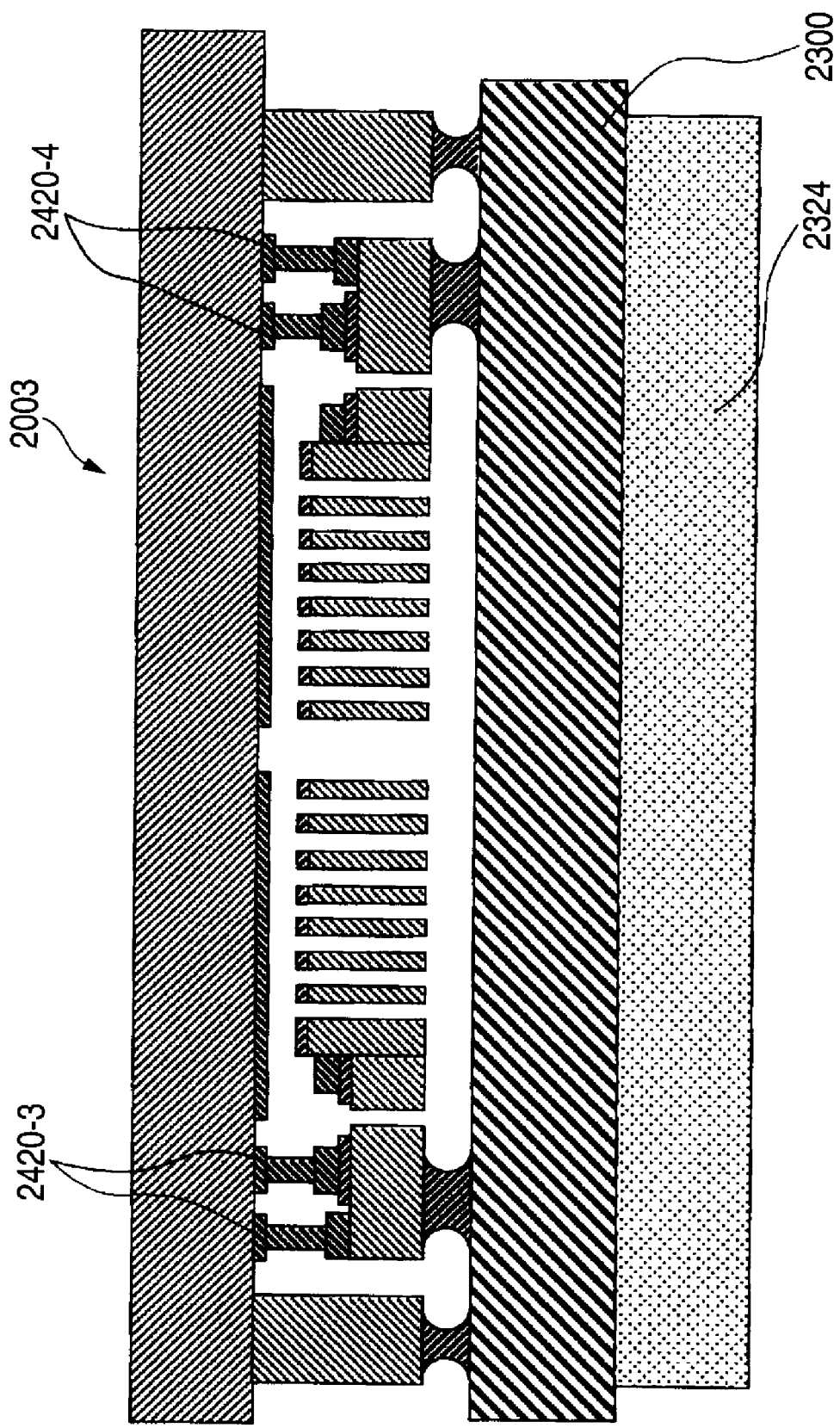
FIG. 59 is a schematic cross section showing one embodiment associated with a method of fabricating an angular velocity detector (Embodiment 10) of the invention.

Then, the first substrate 2300 and second substrate 2400 are cut by dicing into individual chips in an unillustrated manner. Finally, as shown in FIG. 59, a magnet 2324 is formed under the first substrate 2300. Extraction electrodes 2420-3 and 2420-4 are brought out, for example, by wire bonding in an unillustrated manner to fabricate a chip for the angular velocity detector 2003.

In the method of fabricating the angular velocity detector of the invention, after the dug portions 2311-1 and 2311-2 are formed in the vibrators 2301-1 and 2301-2, the electrodes 2308-1 and 2308-2 formed in the vibrators 2301-1 and 2301-2 are formed in the dug portions 2311-1 and 2311-2. Therefore, the electrodes 2308-1 and 2308-2 can be so formed that when the vibrators 2301-1 and 2301-2 vibrate, the electrodes 2308-1 and 2308-2 are prevented from touching the counter electrodes 2420-1 and 2420-2 forming the displacement detection means. There is the advantage that the angular velocity detector 2003 assuring detection of the displacements of the vibrators 2301-1 and 2301-2 can be offered. Furthermore, the angular velocity detector 2003 yielding the advantages as described in the first embodiment can be fabricated.

Embodiment 11

Figure 60:
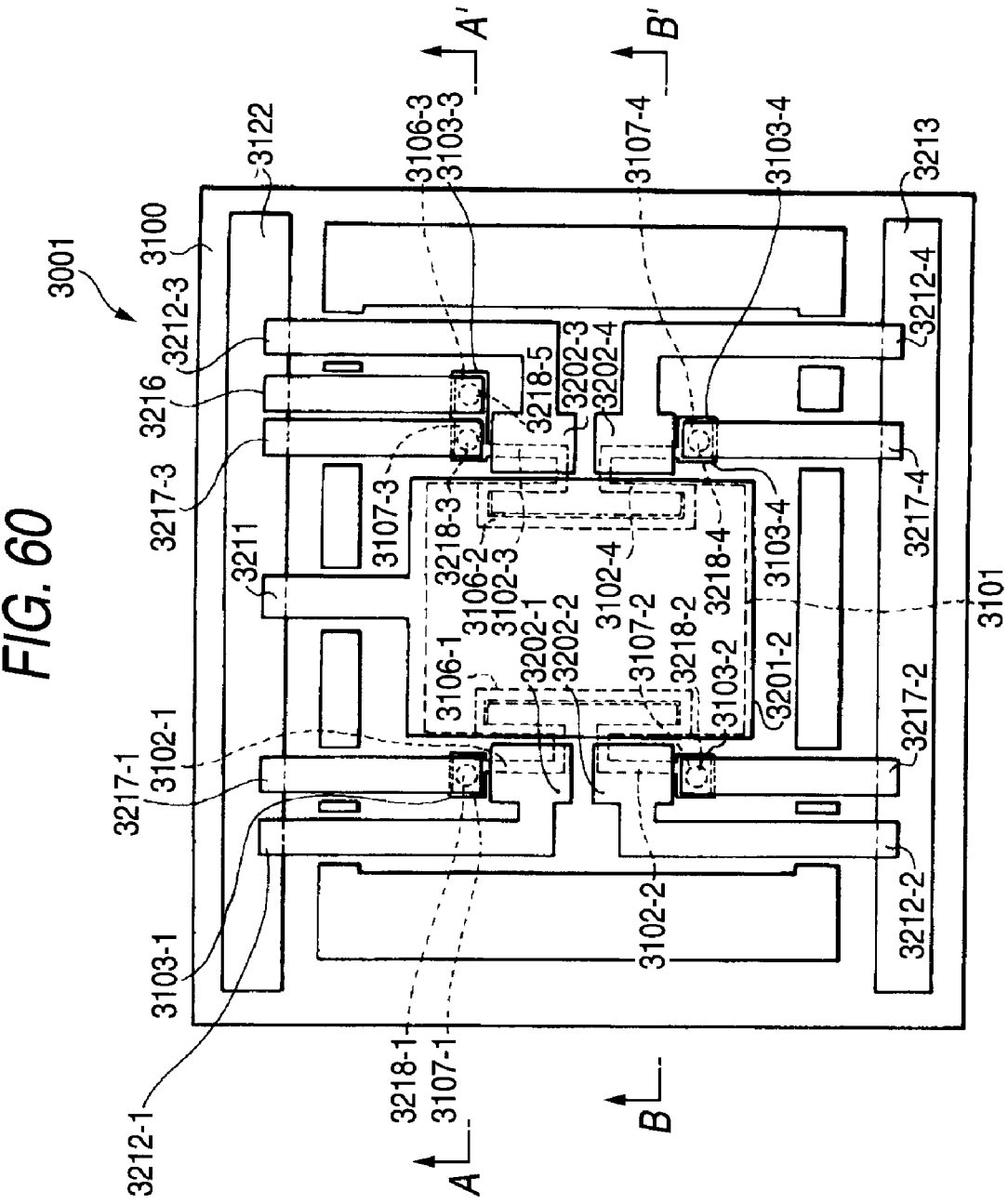
FIG. 60 is a planar layout diagram of main portions showing one embodiment associated with an angular velocity detector (Embodiment 11) of the invention.
Figure 61:
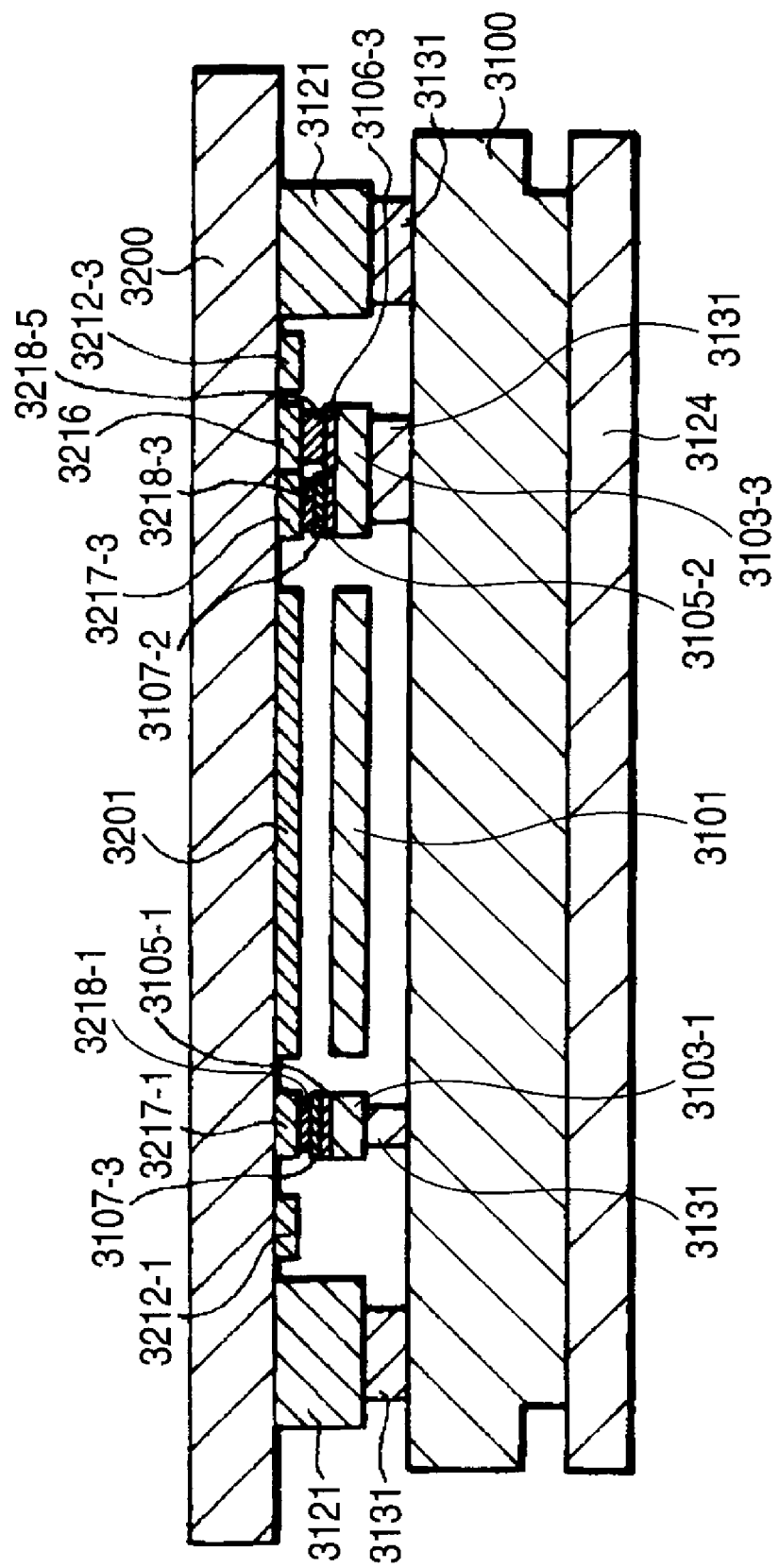
FIG. 61 is a cross-sectional view taken on line A-A' of FIG. 60, showing one embodiment associated with an angular velocity detector (Embodiment 11) of the invention.
Figure 62:
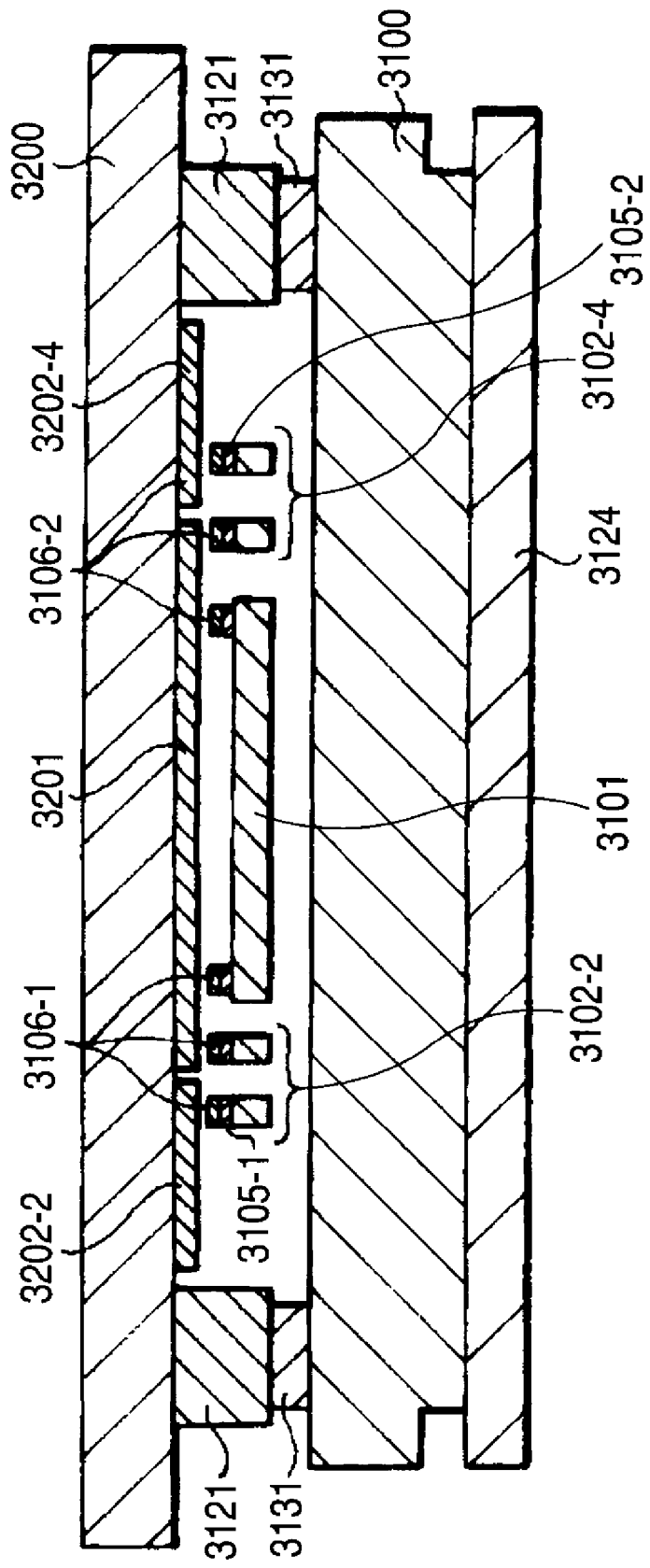
FIG. 62 is a cross-sectional view taken on line B-B' of FIG. 60, showing one embodiment associated with an angular velocity detector (Embodiment 11) of the invention.
Figure 63:
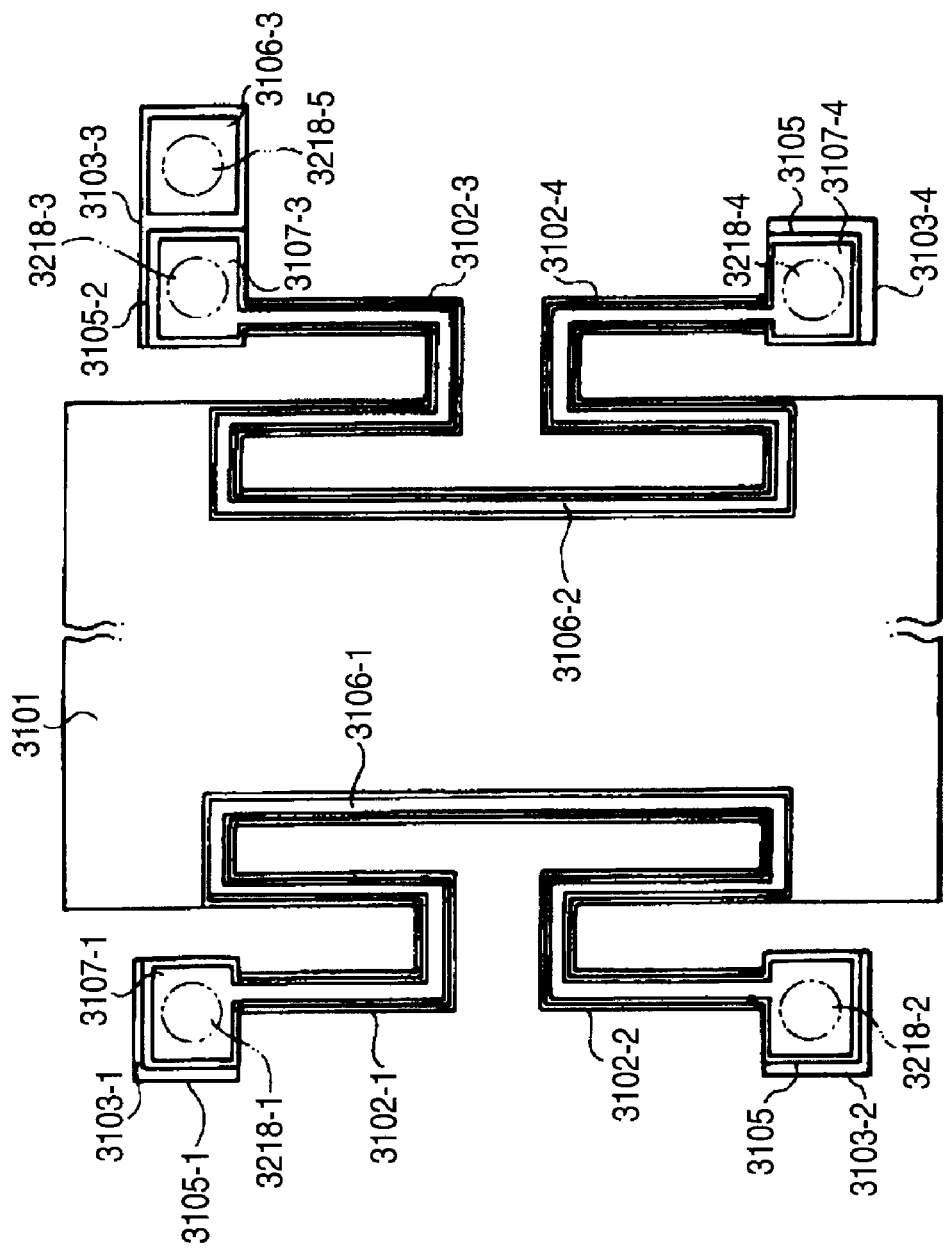
FIG. 63 is an enlarged view of main portions showing one embodiment associated with an angular velocity detector (Embodiment 11) of the invention.

Then, as one embodiment associated with an angular velocity detector of the invention, an angular velocity sensor having one vibrator is described by referring to the planar layout diagram of main portions of FIG. 60, the cross section of FIG. 61 taken on line A-A' of FIG. 60, the cross-sectional view of FIG. 62 taken on line B-B' of FIG. 60, and the enlarged view of main portions of FIG. 63. Note that the cross sections of FIGS. 61-62 merely schematically show the structure and that they are not drawn to the same scale as the planar layout diagram of FIG. 60.

As shown in FIGS. 60-63, the angular velocity detector 3001 is equipped with a vibrator 3101. The vibrator 3101 consists of a rectangular thin film. As one example, the thin film is made of a silicon layer. Corner portions of the vibrator 3101 are supported by respective one ends of the resilient support bodies 3102-1, 3102-2, 3102-3, and 3102-4. The other ends of the resilient support bodies 3102-1, 3102-2, 3102-3, and 3102-4 are supported and fixed to the support portions 3103-1, 3103-2, 3103-3, and 3103-4, respectively. For example, each of the resilient support bodies 3102-1 to 3102-4 is made of a leaf spring and consists, for example, of a silicon layer. Each resilient support body is shaped like a square bracket shape, the letter U or a rectangular wave as viewed in a plane. The support bodies 3103-1, 3103-2, 3103-3, and 3103-4 are fixedly mounted to the first substrate 3100 via an insulator 3131. Accordingly, the vibrator 3101 is supported by the resilient support bodies 3102-1, 3102-2, 3102-3, and 3102-4 and completely poised above the first substrate 3100.

An electrode 3106-1 for electromagnetically driving the vibrator 3101 is formed as an electrically conductive interconnect via an insulator film 3105-1, extends from over the support portion 3103-1, over the resilient support body 3102-1, over an end side of the vibrator 3101, and over the resilient support body 3102-2, and reaches to over the support portion 3103-2. Similarly, an electrode 3106-2 becoming a monitor electrode for detecting an induced electromotive force produced when the vibrator 3101 is electromagnetically driven to operate is formed as an electrically conductive interconnect via an insulator film 3105-2, extends from over the support portion 3103-3, over the resilient support body 3102-3, over an end side of the vibrator 3101, and over the resilient support body 3102-4, and reaches to over the support portion 3103-4. Furthermore, to use the vibrator 3101 as an electrode for detecting angular velocities, a conductive pad 3106-3 is formed, for example, over the support portion 3103-3 and connected to the vibrator 3101 via a resilient support body 3102-3 made of silicon. The conductive pad 3106-3 is electrically isolated from the electrode 3106-2 formed on the support portion 3103-3 by an insulator film 3105-2.

Electrode pads 3107-1, 3107-2, 3107-3, and 3107-4 are formed continuously with the opposite ends of each of the electrodes 3106-1 and 3106-2 and over the support portions 3103-1, 3103-2, 3103-3, and 3103-4, respectively, at the opposite ends of each of the electrodes 3106-1 and 3106-2.

An anodic bonding frame 3121 and equipotential interconnects 3122 and 3123 are shown to be formed. The frame and interconnects are used when the first substrate 3100 and the second substrate 3200 are anodically bonded together.

The vibrator 3101 is provided with a plurality of through-holes (not shown) to mitigate air damping. The through-holes reduce the squeezing effect of the narrow gap with the second substrate 3200 mounted above the vibrator 3101. Accordingly, the through-holes are preferably uniformly distributed to attain a balance with the vibrator 3101.

The structure described above is formed on the first substrate 3100.

The second substrate 3200 is next described. The second substrate 3200 is made, for example, of a glass substrate.

Electrodes for detecting capacitance variations are formed on the second substrate 3200. A detection electrode 3201 is formed on the surface of the second substrate 3200 opposite to the first substrate 3100 and in a position opposite to the vibrator 3101. Detection electrodes 3202-1, 3202-2, 3202-3, and 3202-4 are formed on the surface of the second substrate 3200 opposite to the first substrate 3100 and in positions opposite to the resilient support bodies 3102-1, 3102-2, 3102-3, and 3102-4.

Formed on the second substrate 3200 are a detection electrode 3201, detection electrodes 3202-1, 3202-3, and extraction electrodes 3211, 3212-1, 3212-3, extraction electrodes 3217-1, 3217-3, and an extraction electrode 3216. When the first substrate 3100 and the second substrate 3200 are bonded together, the extraction electrodes 3211, 3212-1, 3212-3, 3217-1, 3217-3, and 3216 are brought out from positions on the second substrate 3200 opposite to the electrode pads 3107-1, 3107-3, and conductive pad 3106-3 toward the equipotential interconnect 3122 formed on the side of the first substrate 3100.

Also formed on the second substrate 3200 are detection electrodes 3202-2, 3202-4, extraction electrodes 3212-2, 3212-4, and extraction electrodes 3217-2, 3217-4. When the first substrate 3100 and the second substrate 3200 are bonded together, the extraction electrodes 3212-2, 3212-4, and the extraction electrodes 3217-2, 3217-4 are brought out from positions on the second substrate 3200 opposite to the electrode pads 3107-2 and 3107-4 toward the equipotential interconnect 3123 formed on the side of the first substrate 3100.

The anodic bonding frame 3121 is provided with recesses 3121-1 to prevent the anodic bonding frame 3121 from touching the extraction electrodes 3211-1, 3212-1 to 3212-4, 3216, and 3217-1 to 3217-4 when the first substrate 3100 and the second substrate 3200 are placed opposite to each other and bonded together. The recesses 3121-1 are formed in a corresponding manner to the extraction electrodes. Where two extraction electrodes such as 3216 and 3217-3 are placed close to each other, the two extraction electrodes 3216 and 3217-3 are disposed in one recess. The recesses 3121-1 can be formed after completely removing the anodic bonding frame 3121 or after partially removing the positions where the extraction electrodes are formed. The figures indicate a case where the frame has been completely removed.

Pillar electrodes 3218-1, 3218-2, 3218-3, 3218-4, and 3218-5 are formed at end portions of the extraction electrodes 3217-1, 3217-2, 3217-3, and 3217-4, respectively, which are on the sides of the electrode pads 3107-1, 3107-2, 3107-3, and 3107-4 and at an end portion of the extraction electrode 3216 on the side of the conductive pad 3106-3. The pillar electrodes 3218-1, 3218-2, 3218-3, 3218-4, and 3218-5 are formed, for example, by gold plating. Each of the pillar electrodes 3218-1, 3218-2, 3218-3, 3218-4, and 3218-5 can be singular or plural for each one electrode pad or conductive pad.

When the first substrate 3100 and the second substrate 3200 are bonded together, the anodic bonding frame 3121 and the second substrate 3200 are anodically bonded together by an anodic bonding method. At this time, the equipotential interconnects 3122 and 3123 made of silicon are also anodically bonded to the second substrate 3200.

After the anodic bonding, the anodic bonding frame 3121 is cut off from the equipotential interconnects 3122 and 3123, for example, by dicing. The extraction electrodes 3211, 3212-1 to 3212-4, 3216, and 3217-1 to 3217-4 commonly connected to the equipotential interconnects 3122 and 3123 are made electrically independent completely.

A magnet 3124 is disposed on the underside of the first substrate 3100 that faces away from the side on which the vibrator is formed. The angular velocity sensor of the capacitance detection type sensor of the present embodiment is electromagnetically driven by the magnet 3124. The magnet 3124 can also be mounted on the side of a second substrate 3200 (described later). Also, in this case, an operation similar to the operation obtained where the magnet is mounted on the side of the lower surface of the first substrate 3100 is obtained.

A method of fabricating the angular velocity detector 3001 is next described. This method of fabrication is fundamentally the same as the method of fabricating the angular velocity detector described in the above-described Embodiment 8. Different process steps from the method of fabricating the angular velocity detector described in the Embodiment 8 are that only one vibrator is fabricated and that any structure portions for connecting together vibrators is not formed. The other process steps are similar to those of the method of fabricating the angular velocity detector described in the Embodiment 8.

Embodiment 12

Figure 64:
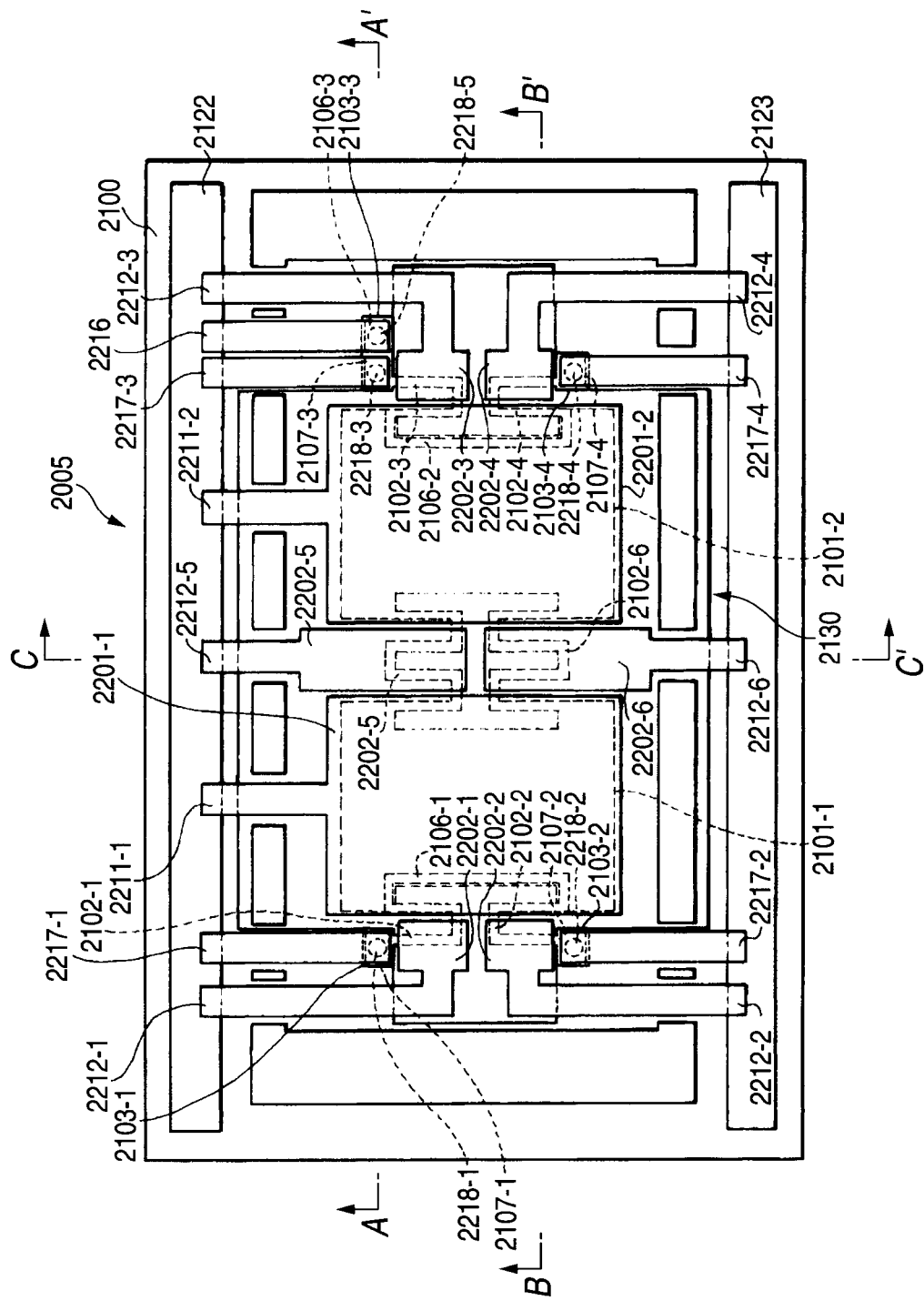
FIG. 64 is a planar layout diagram of main portions showing one embodiment associated with a method of fabricating an angular velocity detector (Embodiment 12) of the invention.
Figure 65:
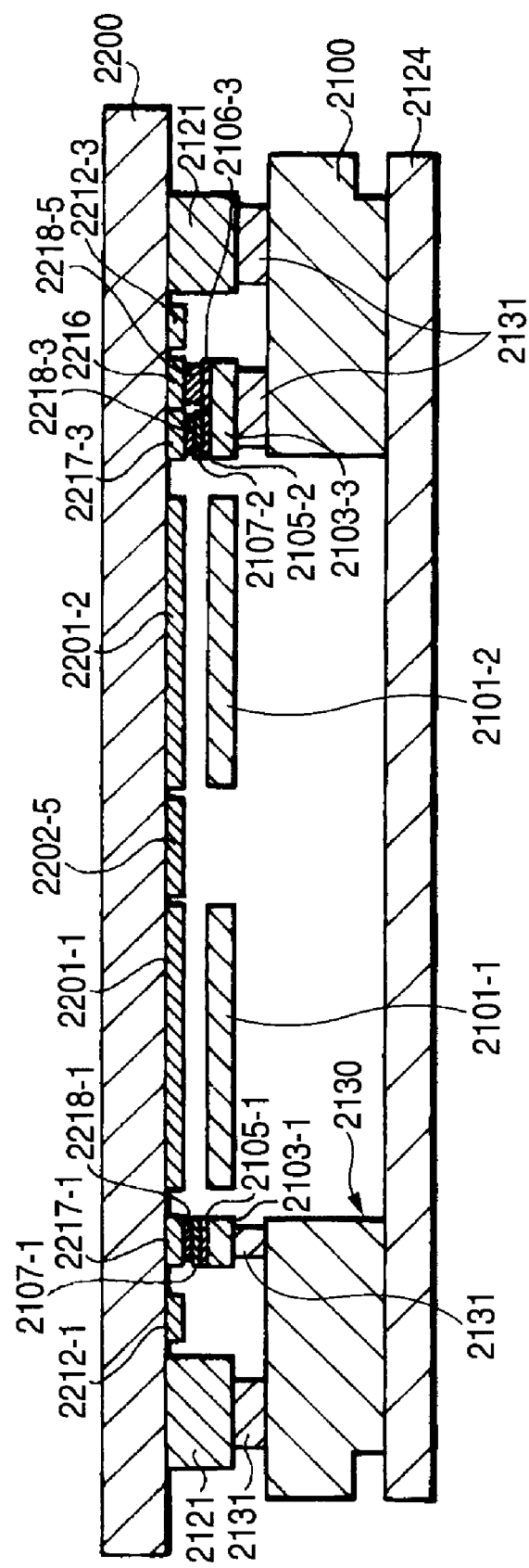
FIG. 65 is a cross-sectional view taken on line A-A' of FIG. 64, showing one embodiment associated with a method of fabricating an angular velocity detector (Embodiment 12) of the invention.
Figure 66:
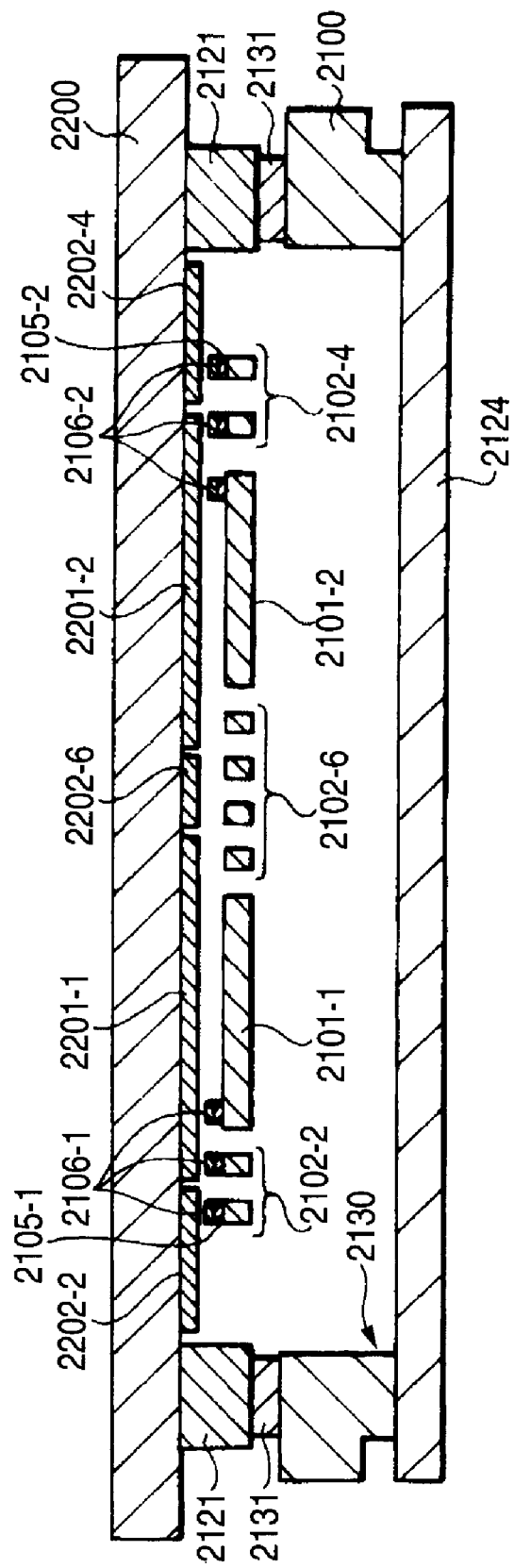
FIG. 66 is a cross-sectional view taken on line B-B' of FIG. 64, showing one embodiment associated with a method of fabricating an angular velocity detector (Embodiment 12) of the invention.
Figure 67:
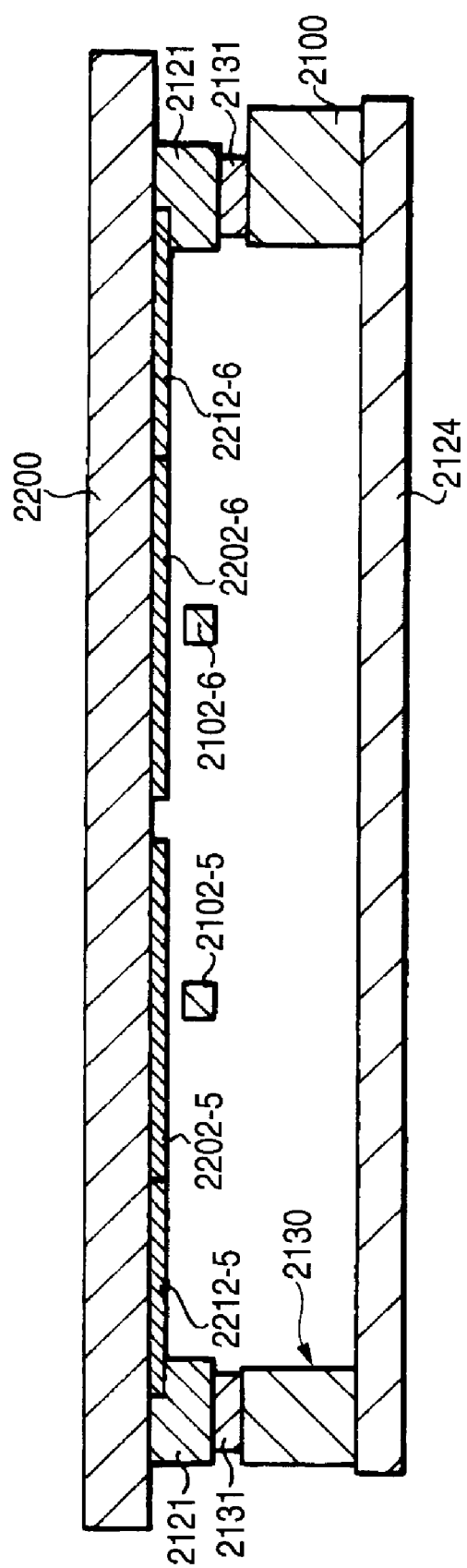
FIG. 67 is a cross-sectional view taken on line C-C' of FIG. 64, showing one embodiment associated with a method of fabricating an angular velocity detector (Embodiment 12) of the invention.

One embodiment associated with an angular velocity detector of the invention is described as Embodiment 12 by referring to the planar layout diagram of main portions of FIG. 64, the cross section of FIG. 65 taken on line A-A' of FIG. 64, the cross section of FIG. 66 taken on line B-B' of FIG. 64, the cross section of FIG. 67 taken on line C-C' of FIG. 64, and the above-referenced FIG. 36. Note that the cross sections of FIGS. 65-68 merely schematically show the structure and are not drawn to the same scale as the planar layout diagram of FIG. 64.

As shown in FIGS. 64-67 and FIG. 36, an angular velocity detector 2005 of the present embodiment is similar to the angular velocity detector 2001 already described in the Embodiment 7 (see the above-referenced FIGS. 32-36) except that dug portions 2130 are formed in regions opposite to the first vibrator 2101-1 and the second vibrator 2101-2 on the first substrate 2102100. That is, a first vibrator 2101-1, a second vibrator 2101-2, resilient support bodies 2102-1 to 2101-6, support portions 2103-1 to 2103-6, insulator films 2105-1 to 2105-2, electrodes 2106-1 to 2106-2, conductive pads 2106-3, electrode pads 2107-1 to 2107-4, an anodic bonding frame 2121, recesses 2121-1, and equipotential interconnects 2122, 2123 are formed on a first substrate 2100. Detection electrodes 2201-1 to 2201-2, detection electrodes 2202-1 to 2202-6, extraction electrodes 2211-1, 2211-2, extraction electrodes 2212-1 to 2212-6, an extraction electrode 2216, extraction electrodes 2217-1 to 2217-4, and pillar electrodes 2218-1 to 2218-5 are formed on a second substrate 2200. A magnet 2124 is disposed on the underside of the first substrate 2100 facing away from the side on which the vibrators are formed. The angular velocity sensor of the capacitance detection type sensor of the present embodiment is electromagnetically driven by the magnet 2124. Therefore, the magnet 2124 can also be mounted on the side of the second substrate 2200 (describe later). Also, in this case, an operation similar to the operation obtained where the magnet is mounted on the underside of the first substrate 2100 is obtained.

The angular velocity detector 2005 of the present embodiment is displaced in the Z-axis direction by an impact from the outside because the first vibrator 2101-1, second vibrator 2101-2, and resilient support bodies 2102-1 to 2102-6 are poised above the first substrate 2100. Where an SOI substrate is used or where the vibrators and resilient support bodies are fabricated from a thin film, sticking may occur easily because the gaps from the first vibrator 2101-1, the second vibrator 2101-2, and the resilient support bodies 2101-1 to 2101-6 to the first substrate 2100 are narrow, normally 0.3 to 5 µm. In the angular velocity detector 2005 of the present embodiment, the dug portions 2130 are formed in the regions opposite to the first vibrator 2101-1 and second vibrator 2101-2 of the first substrate 2100 and so when the first vibrator 2101-1 and second vibrator 2101-2 vibrate, sticking to the first substrate 2100 is prevented. Especially, in the SOI substrate, the rear surfaces of the first vibrator 2101-1, second vibrator 2101-2, and resilient support bodies 2102-1 to 2102-6 and the surface of the first substrate 2100 are mirror-surfaces. Therefore, once sticking occurs, peeling cannot be easily done due to electrostatic force at the surface. Consequently, the problem that a great hindrance is caused during operation can be solved. Hence, by electromagnetically driving the vibrators using the magnet, the driving amplitude can be set large. This makes it possible to increase the displacement corresponding to the Coriolis force produced on application of an angular velocity. By producing driving vibrations on the X-Y plane, the space between the first substrate 2100 and the second substrate 2200 and the space between the first vibrator 2101-1 and the second vibrator 2101-2 can be narrowed. In consequence, a high-sensitivity angular velocity detector producing large capacitance variations can be offered. If an impact in the Z-direction is applied, stable operation can be obtained without producing sticking by forming dug portions 2100-1 immediately under the movable parts.

The structure described in the Embodiment 10 in which the first substrate is provided with dug portions can be similarly applied to the angular velocity detectors described in the above-described various embodiments.

Embodiment 13

One embodiment associated with a method of fabricating an angular velocity detector of the invention is described as Embodiment 13 by referring to the schematic structural cross section of FIG. 68. As one instance, an example is described here in which the embodiment is applied to a method of fabricating an angular velocity detector of the structure described in the above-described Embodiment 8 having two vibrators.

In the fabrication method described already in connection with FIGS. 38A-50, the other insulator 2131 is removed, for example, by etching except for the portions of the insulator 2131 which are located under the support portions 2103-1 to 2103-4, anodic bonding frame 2121, and equipotential interconnects 2122, 2123 as shown in the planar layout diagrams of FIGS. 40B and 45. As a result, the first vibrator 2101-1, second vibrator 2101-2, and resilient support bodies 2102-1 to 2102-6 are formed. The support portions 2103-1 to 2103-4 are fixed to the first substrate 2100 via the insulator 2131. Then, as shown in the schematic structural cross section of FIG. 68, etching is performed to form dug portions 2130 in regions of the first substrate 2100 opposite to the first vibrator 2101-1, second vibrator 2101-2, and resilient support bodies (not shown) from the rear side of the first substrate 2100. Here, the dug portions 2130 are formed as through-holes. Prior to the etching of the insulator 2131, the dug portions 2130 may be formed. Then, in the same way as already described in FIG. 8, some process steps are carried out. That is, the second substrate is fabricated. The first and second substrates are bonded together. A magnet is stuck to the rear side of the first substrate so as to cover the dug portions.

In the method of fabricating the angular velocity detector of the present embodiment, the dug portions 2130 are formed in the regions opposite to the first vibrator 2101-1 and second vibrator 2101-2 on the first substrate 2100. Therefore, when the first vibrator 2101-1 and the second vibrator 2101-2 vibrate, sticking to the first substrate 2100 is prevented. Consequently, the driving amplitude can be set large by electromagnetic driving using the magnet. For this reason, the displacement corresponding to the Coriolis force produced on application of an angular velocity can be increased. Furthermore, the space between the first substrate 2100 and the second substrate 2200 and the space between the first vibrator 2101-1 and the second vibrator 2101-2 can be narrowed by producing driving vibrations on the X-Y plane. A high-sensitivity angular velocity detector producing large capacitance variations can be offered. In addition, stable operation can be obtained without causing sticking in the presence of an impact in the Z-direction by forming the dug portions 2100-1 immediately under the movable portions.

Furthermore, as shown in FIG. 69, dug portions 2175 may be previously formed in another substrate 2170 (such as a silicon substrate), and the substrate 2170 may be stuck to the first substrate 2100 forming a silicon substrate including the first vibrator 2101-1 and the second vibrator 2101-2. In this case, a silicon substrate can be used instead of an SOI substrate as the first substrate 2100 forming the silicon structure. This configuration also produces advantages as the foregoing. A glass substrate can also be used as the other substrate 2170.

The method of forming dug portions in the first substrate as described in the Embodiment 11 can be similarly applied to the methods of fabricating angular velocity detectors described in the above embodiments.

Embodiment 14

Figure 70:
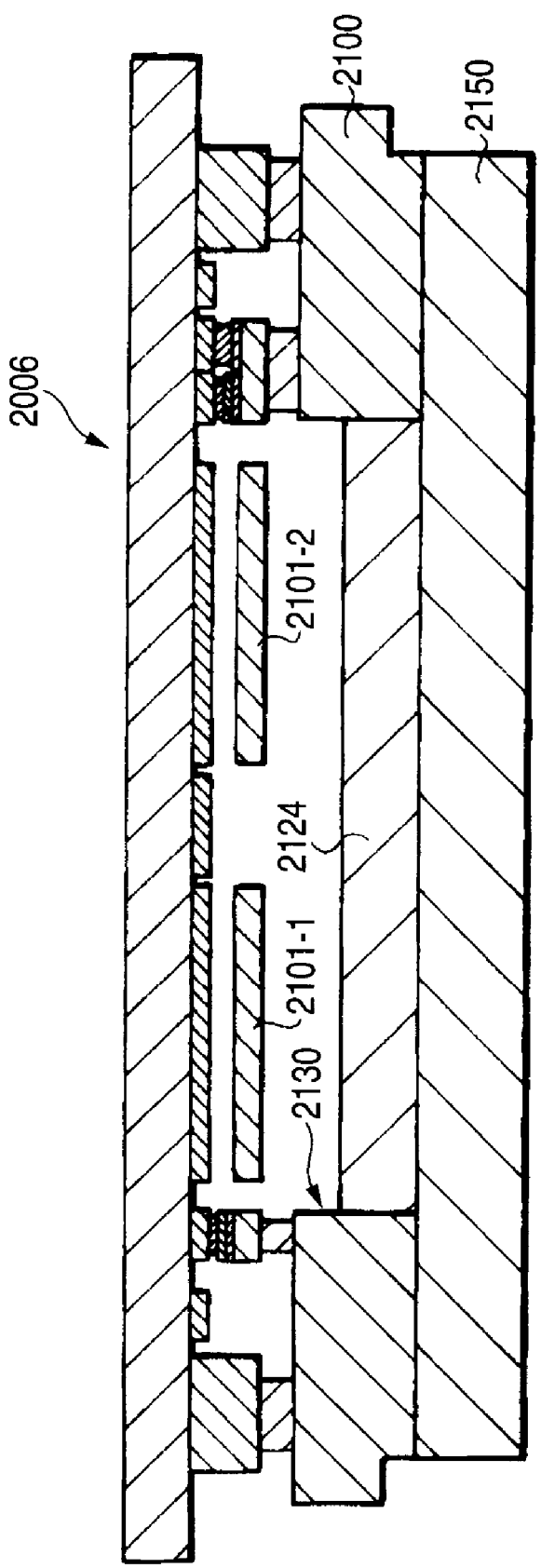
FIG. 70 is a schematic structural cross section showing one embodiment associated with an angular velocity detector (Embodiment 14) of the invention.

A first embodiment associated with an angular velocity detector of the invention is described as Embodiment 14 by referring to the schematic structural cross section of FIG. 70. Here, as one instance, an example is described in which the embodiment is applied to the angular velocity detector of the structure described in the Embodiment 12 where there are two vibrators.

As shown in FIG. 70, the angular velocity detector 2006 is based on the angular velocity detector 2005 of the structure of the Embodiment 12 and further characterized in that a magnet 2124 held by a different, third substrate 2150 is inserted under the dug portion 2130 (the rear side of the first substrate 2100) of the first substrate 2100 and the first substrate 2100 and the third substrate 2150 are bonded together (e.g., anodically bonded together), leaving behind the space of the dug portion 2130 above the magnet 2124. In this case, the used magnet 2124 is sized to be capable of being inserted in the dug portion 2130. Accordingly, the magnet 2124 is sized to be capable of being fitly inserted in the dug portion 2130 or to be smaller than the dug portion 2130.

The magnet 2124 is made thinner than the depth of the dug portion 2130. The magnet 2124 is formed on the rear side of the first substrate 2100 within the dug portion 2130. Therefore, a space above the dug portion 2130 exists on the side of the upper surface (vibrator side) of the magnet 2124. Consequently, this assures that the first vibrator portion 2101-1, second vibrator 2101-2, and resilient support portions (not shown) are prevented from touching or sticking to the magnet 2124.

Figure 71:
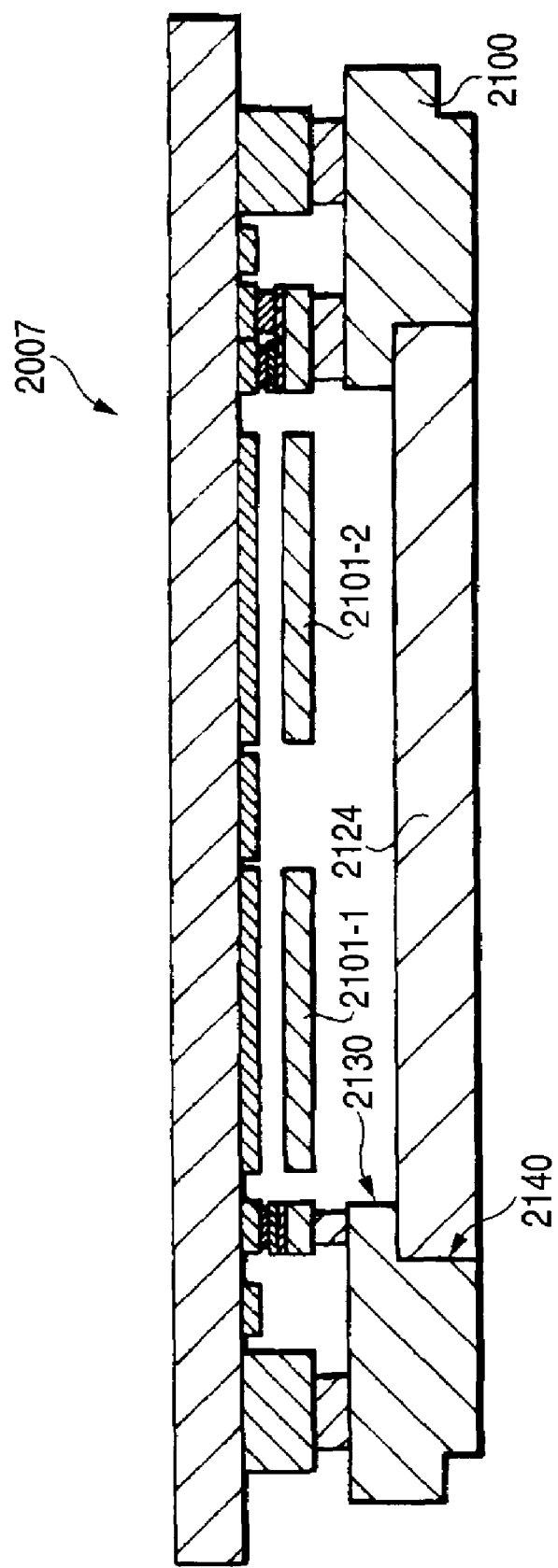
FIG. 71 is a schematic structural cross section showing one embodiment associated with an angular velocity detector (Embodiment 14) of the invention.

A second embodiment associated with an angular velocity detector of the invention is next described as Embodiment 14 by referring to the schematic structural cross section of FIG. 71.

As shown in FIG. 71, the angular velocity detector 2007 of the second embodiment is based on the angular velocity detector 2005 of the configuration of the Embodiment 12 and further characterized in that the magnet 2124 is inserted under (the rear side of the first substrate 2100) the dug portion 2130 of the first substrate 2100. A dug portion 2140 greater than the dug portion 2130 is formed in the first substrate 2100 such that the dug portion 2130 is left behind. The magnet 2124 is inserted and fixed in the dug portion 2140. Accordingly, the dug portions 2140 and 2130 are formed like stairs as viewed from the rear side of the first substrate 2100. The magnet 2124 is sized to be greater than the dug portion 2130 and to be capable of being inserted into the dug portion 2140. Therefore, the magnet 2124 is sized to be greater than the dug portion 2130 and to be capable of being fitly inserted into the dug portion 2140 or smaller than the dug portion 2140. Consequently, there is the advantage that if the magnet 2124 is disposed in the dug portion 2140, it is assured that the space of the dug portion 2130 is left above the magnet 2124. Hence, it is assured that the first vibrator portion 2101-1, second vibrator 2101-2, and resilient support portions (not shown) are prevented from touching or sticking to the magnet 2124.

The magnet 2124 may be fixed to the third substrate in an unillustrated manner. In this case, it is not necessary to fixedly mount the magnet 2124 itself to the first substrate 2100. It is only necessary that the magnet 2124 be inserted inside the dug portion 2140 and that the first substrate 2100 and the third substrate be bonded together (e.g., anodically bonded together).

Figure 72:
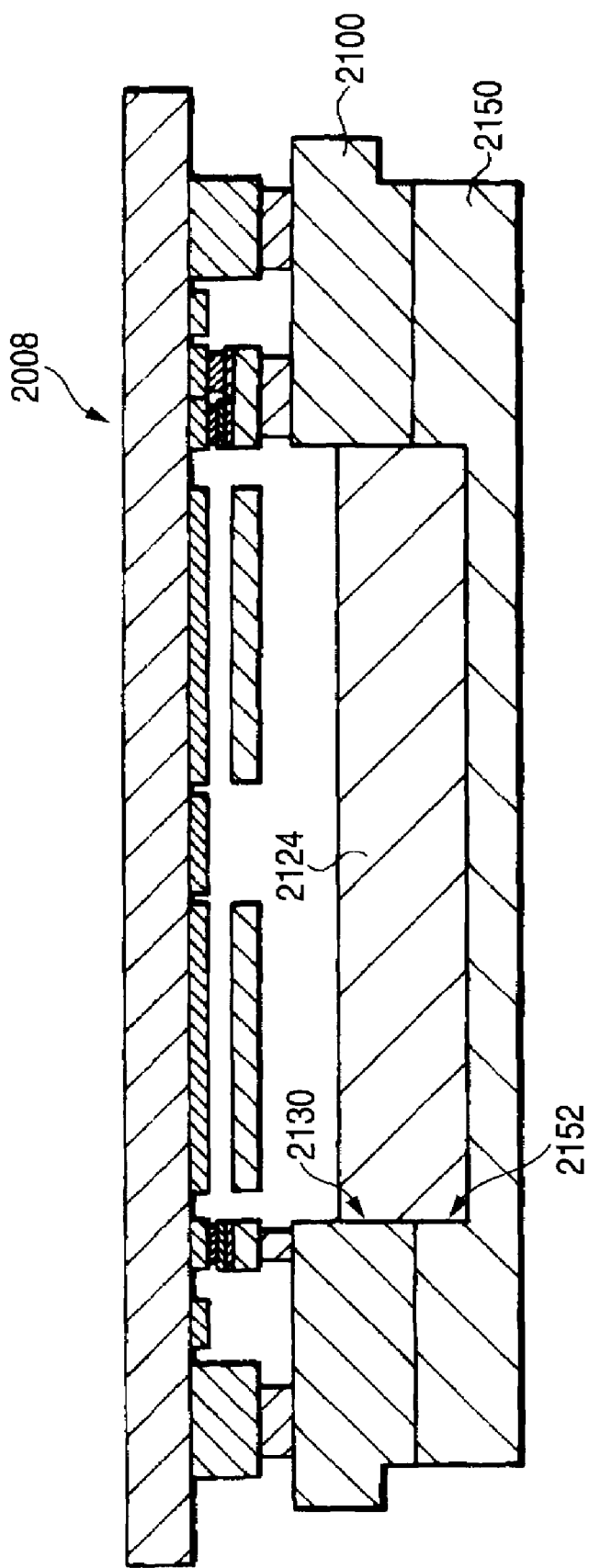
FIG. 72 is a schematic structural cross section showing one embodiment associated with an angular velocity detector (Embodiment 14) of the invention.

A third embodiment associated with an angular velocity detector of the invention is next described as Embodiment 14 by referring to the schematic structural cross section of FIG. 72.

As shown in FIG. 72, the angular velocity detector 2008 is based on the angular velocity detector 2005 of the configuration of Embodiment 12 and further characterized in that a magnet 2124 formed on a further, third substrate 2150 is inserted under (the rear side of the first substrate 2100) the dug portion 2130 of the first substrate 2100 and that the first substrate 2100 and the third substrate 2150 are bonded together (e.g., anodically bonded together), leaving behind the space in the dug portion 2130 above the magnet 2124. The magnet 2124 is formed in the dug portion 2152 formed in the third substrate 2150 such that an upper part of the magnet 2124 protrudes from the surface of the third substrate 2150. The magnet is sized to be capable of being inserted into the dug portion 2130. Accordingly, the magnet 2124 is sized to be capable of being fitly inserted into the dug portion 2130 or smaller than the dug portion 2130.

The thickness of the magnet 2124 is so selected that the space above the dug portion 2130 exists on the side of the upper surface (vibrator side) and is disposed as described above. Therefore, it is assured that the first vibrator portion 2101-1, second vibrator 2101-2, and resilient support portions (not shown) are prevented from touching or sticking to the magnet 2124.

In the angular velocity detector 2008 of the above-described structure, the thickness of the magnet 2214 can be made thicker than the magnet of the configuration of the first embodiment by an amount corresponding to the depth of the dug portion 2152 formed in the third substrate 2150 and so strong magnetic force can be applied to the capacitance detection portion. In consequence, the detection accuracy can be improved.

Figure 73:
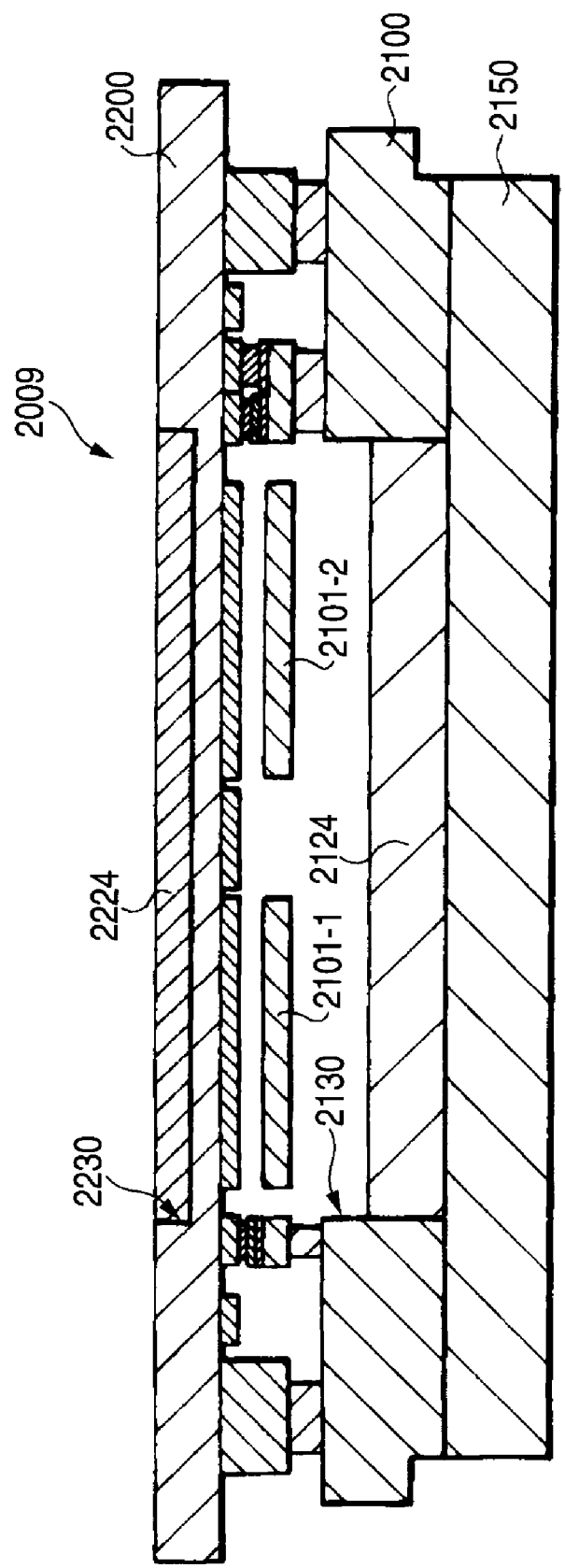
FIG. 73 is a schematic structural cross section showing one embodiment associated with an angular velocity detector (Embodiment 14) of the invention.

A fourth embodiment associated with an angular velocity detector of the invention is next described as Embodiment 14 by referring to the schematic structural cross section of FIG. 73.

As shown in FIG. 73, the angular velocity detector 2009 is based on the angular velocity detector 2005 of the configuration of the Embodiment 12 and further characterized in that a magnet 2124 held by a further, third substrate 2150 is inserted under a dug portion 2130 (the rear side of the first substrate 2100) of the first substrate 2100 and that the first substrate 2100 and third substrate 2150 are bonded together (e.g., anodically bonded together), thus leaving behind the space of the dug portion 2130 above the magnet 2124. In this case, the used magnet 2124 is sized to be capable of being inserted into the dug portion 2130. Accordingly, the magnet 2124 is sized to be capable of being fitly inserted into the dug portion 2130 or smaller than the dug portion 2130. On the other hand, a dug portion 2230 is also formed in the second substrate 2200. The magnet 2224 is buried in the dug portion 2230.

The angular velocity detector 2009 of the configuration described above is so configured that the magnet 2224 is buried even in the second substrate 2200. Therefore, magnetic force intenser by an amount corresponding to the formation of the magnet 2224 can be applied to the capacitance detection portion. Consequently, the detection accuracy can be improved.

The structure in which the magnet 2224 is buried in the second substrate 2200 can also be applied to the configurations of the second and third embodiments, as well as to the first embodiment as already described in the fourth embodiment.

In the above-described various embodiments, in a case where the third substrate is used, a silicon substrate or glass substrate can be used as the third substrate. Where the magnet can be firmly mounted within the dug portion, it is not necessary to bond the third substrate to the first substrate. The third substrate on which the magnet is formed may be peeled off from the magnet.

In the angular velocity detectors of the first, second, and fourth embodiments, a magnet is disposed only inside a substrate. Therefore, the thickness of each angular velocity detector can be reduced by an amount corresponding to the magnet. That is, there is the advantage that the angular velocity detector can be thinned.

Furthermore, in the angular velocity detectors of the first through fourth embodiments, a magnet is disposed inside a substrate. In consequence, the distance between the structure electromagnetically driving portion including a vibrator or vibrators and the magnet is reduced. There is the advantage that a sufficient magnetic flux density can be obtained and the vibrator can be driven. Since the space of a dug portion is secured above the magnet (vibrator side), the vibrator and electrodes are prevented from touching or sticking to the magnet. As a result, the advantage that a reliable angular velocity detector can be offered is obtained.

The structure described in the Embodiment 14 where a magnet is disposed inside a substrate can be similarly applied to the angular velocity detectors described in Embodiments 1-11.

Embodiment 15

Figure 74A:
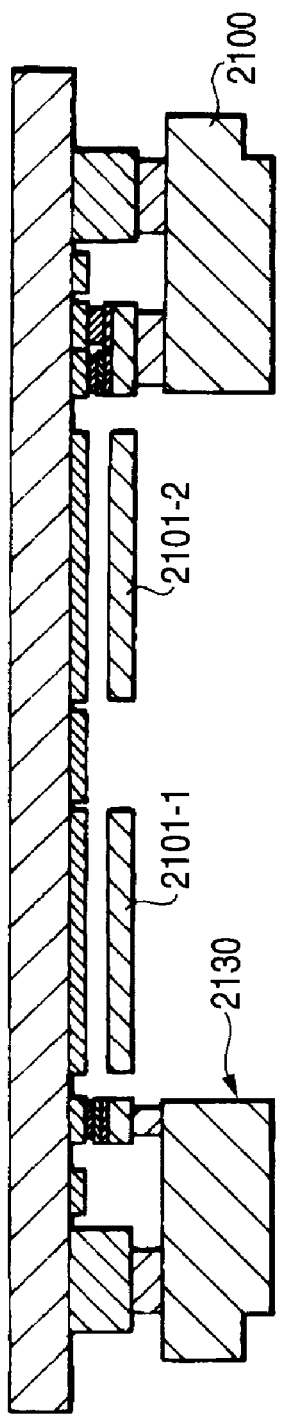
FIGS. 74A-74B are schematic structural cross sections showing one embodiment associated with an angular velocity detector (Embodiment 14) of the invention.
Figure 74B:
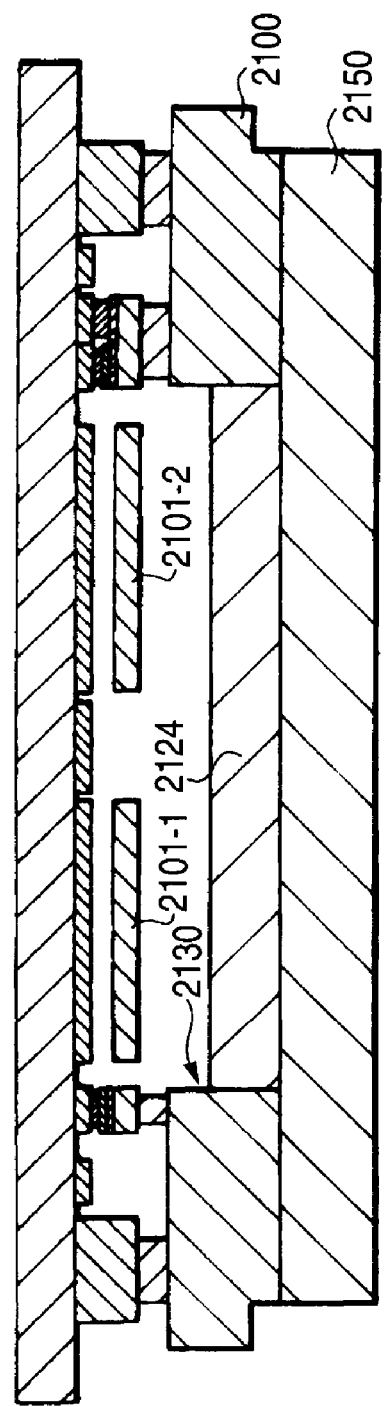

A first embodiment associated with a method of fabricating an angular velocity detector of the invention is described as Embodiment 15 by referring to the cross sections of FIGS. 74A-74B illustrating a fabrication sequence. Here, as an instance, an example is described in which the embodiment is applied to an angular velocity detector of the configuration having two vibrators as described in the Embodiment 12.

As shown in FIG. 74A, a dug portion 2130 extending through the first substrate 2100 is formed in a position opposite to the first vibrator 2101-1, second vibrator 2101-2, and resilient support bodies (not shown) on the first substrate 2100 as already described in the Embodiment 13. The dug portion 2130 can be formed, for example, by etching, sand blasting, or other similar technique. The processing of the dug portion 2130 can be performed prior to the step of removing the insulator for forming the vibrators and so on.

Then, as shown in FIG. 74B, a magnet 2124 held by the third substrate 2150 is inserted into the dug portion 2130. The first substrate 2100 and the third substrate 2150 are bonded together (e.g., anodically bonded together). At this time, the space in the dug portion 2130 is left above the magnet 2124. Therefore, a magnet thinner than the depth of the dug portion 2130 is used as the magnet 2124. Furthermore, a magnet sized to be capable of being inserted into the dug portion 2130 is used as the magnet 2124. That is, a magnet sized to be capable of being fitly inserted into the dug portion 2130 or smaller than the dug portion 2130 is used as the magnet 2124.

According to the method of fabrication described above, the space above the dug portion 2130 is present above (on the side of the vibrator 2101) the magnet 2124. Therefore, it is assured that the first vibrator portion 2101-1, second vibrator 2101-2, and resilient support bodies (not shown) are prevented from touching or sticking to the magnet 2124.

A second embodiment associated with a method of fabricating an annular velocity detector of the invention is next described as Embodiment 15 by referring to the cross sections of FIGS. 75A-75B illustrating a fabrication sequence.

As shown in FIG. 75A, in the above-described first embodiment, a dug portion 2130 is formed in a position opposite to a first vibrator 2101-1, a second vibrator 2101-2, and resilient support bodies (not shown) on a first substrate 2100. Then, a dug portion 2140 larger than the dug portion 2130 is formed in the first substrate 2100 such that an upper part of the dug portion 2130 is left behind. Accordingly, the dug portions 2130 and 2140 are formed like stairs as viewed from the rear side of the first substrate 2100. The dug portions 2140 and 2130 can be formed, for example, by etching, sand blasting, or other similar technique. The processing of the dug portions 2130 and 2140 can also be performed prior to the step of removing the insulator for forming the vibrators and so on.

Then, as shown in FIG. 75B, a magnet 2124 is inserted and fixed inside the dug portion 2140. A magnet that is larger than the dug portion 2130 and sized to be capable of being inserted into the dug portion 2140 is used as the magnet 2124. Accordingly, the magnet 2124 is larger than the dug portion 2130 and sized to be capable of being fitly inserted into the dug portion 2140 or smaller than the dug portion 2140. Therefore, there is the advantage that if the magnet 2124 is disposed in the dug portion 2140, it is assured that the space in the dug portion 2130 is left above the magnet 2124. Consequently, the first vibrator portion 2101-1, second vibrator 2101-2, and resilient support bodies (not shown) are certainly prevented from sticking to the magnet 2124. In the same way as the above-described first embodiment, a magnet fixed to the third substrate may be used as the magnet 2124, and the third magnet may be bonded to the first substrate 2100. Alternatively, after firmly mounting the magnet 2124 to the dug portion 2140 of the first substrate 2100, the third substrate may be peeled off from the magnet 2124.

A third embodiment associated with a method of fabricating an angular velocity detector of the invention is next described as Embodiment 15 by referring to the cross sections of FIGS. 76A-76B and 77A-77B illustrating a fabrication sequence.

As shown in FIG. 76A, the dug portion 2130 extending through the first substrate 2100 is formed in a position opposite to the first vibrator 2101-1, second vibrator 2101-2, and resilient support bodies (not shown) on the first substrate 2100 as described in the Embodiment 13. The dug portion 2130 can be formed, for example, by etching, sand blasting, or other similar technique. The processing of the dug portion 2130 can also be performed prior to the step of removing the insulator for forming the vibrators and so on.

Then, as also shown in FIG. 76B, a dug portion 2152 is also formed in a third substrate 2150. At this time, the dug portion 2152 is so formed that when the third substrate 2150 is bonded to the first substrate 2100, the dug portion 2152 in the third substrate 2150 agrees with the dug portion 2130 formed in the first substrate 2100. The dug portion 2152 can be formed, for example, by etching or sand blasting.

Figure 77A:
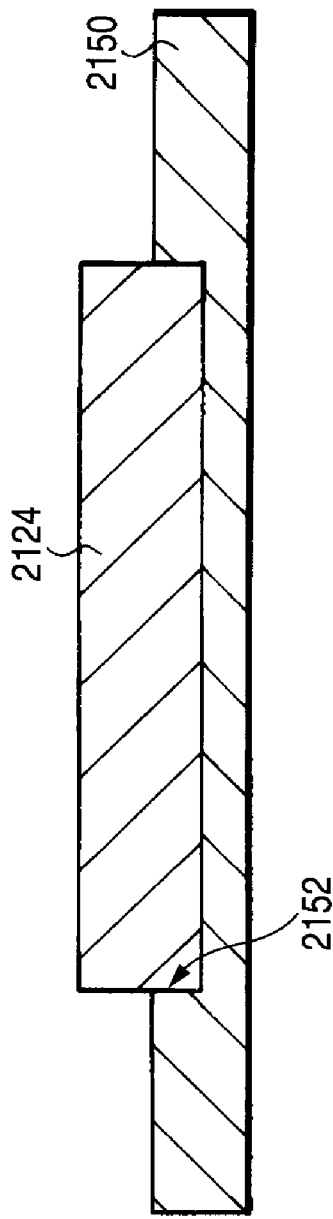
FIGS. 77A-77B are schematic structural cross sections showing one embodiment associated with a method of fabricating an angular velocity detector (Embodiment 15) of the invention.

Then, as shown in FIG. 77A, the magnet 2124 is firmly mounted to the dug portion 2152 of the third substrate 2150.

Figure 77B:
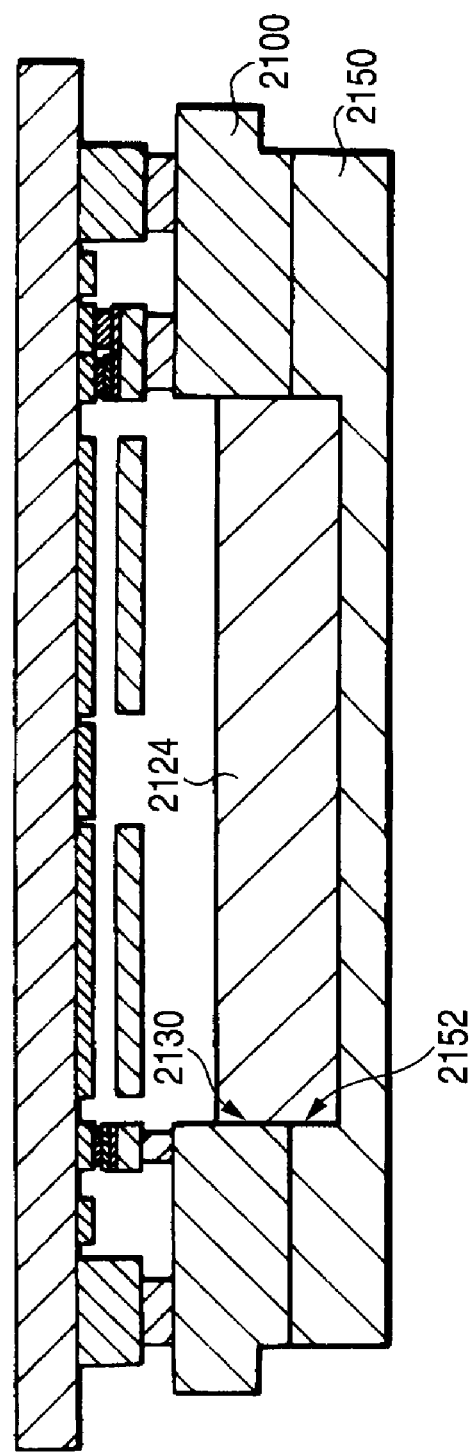

Then, as shown in FIG. 77B, the magnet 2124 formed on the third substrate 2150 is inserted under (the rear side of the first substrate 2100) the dug portion 2130 of the first substrate 2100. The first substrate 2100 and the third substrate 2150 are bonded together (e.g., anodically bonded together). At this time, the space in the dug portion 2130 is left above the magnet 2124. Accordingly, a magnet having a thickness smaller than the sum of the depth of the dug portion 2130 and the depth of the dug portion 2152 is selected as the magnet 2124. The magnet 2124 is sized to be capable of being fitly inserted into the dug portion 2130 or smaller than the dug portion 2130.

In the method of fabrication described above, the space in the upper part of the dug portion 2130 is present on the upper side (on the vibrator side) of the magnet 2124 and so it is assured that the first vibrator portion 2101-1, second vibrator 2101-2, and resilient support bodies (not shown) are prevented from touching or sticking to the magnet 2124.

Since the thickness of the magnet 2124 can be increased by an amount corresponding to the depth of the dug portion 2152 formed in the third substrate 2150, intense magnetic force can be applied to the capacitance detection portion. Consequently, the detection accuracy can be improved.

Figure 78A:
FIGS. 78A-78B are schematic structural cross sections showing one embodiment associated with a method of fabricating an angular velocity detector (Embodiment 15) of the invention.
Figure 78B:
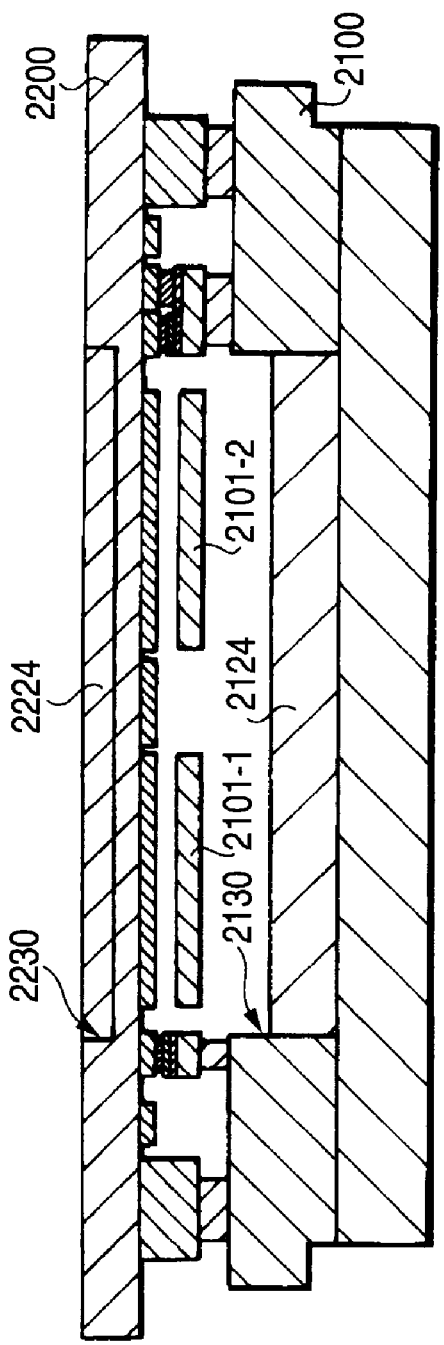

A fourth embodiment associated with a method of fabricating an angular velocity detector of the invention is next described as Embodiment 15 by referring to the schematic structural cross sections of FIGS. 78A-78B.

This fourth embodiment is a method of fabrication in which a magnet is installed in a second substrate 2200. The method of fabrication in which a magnet is mounted in a first substrate may depend on the above-described fabrication method. Here, only the method of fabrication in which the magnet is formed in the second substrate is described.

As shown in FIG. 78A, a resist pattern 2240 for forming a dug portion 2230, in which the magnet will be buried, is formed in positions corresponding to a first vibrator 2101-1, a second vibrator 2101-2 (see FIG. 78B), and resilient support bodies (not shown) on the surface on the opposite side of the surface of the second substrate 2200 on which interconnects are formed. Then, the second substrate 2200 is etched using the resist pattern 2240 as a mask, forming the dug portion 2230. The method of etching can be implemented by wet etching using a solution of hydrofluoric acid (HF) or potassium hydroxide (KOH) or by chemical or physical dry etching. The etching depth is equal to or greater than the thickness of the magnet if the etching depth is greater than the thickness of the magnet.

Then, the above-described process for forming the second substrate 2200 is performed. After assembling the first and second substrates, the magnet 2224 is fixedly mounted in the dug portion 2230 of the second substrate 2200 as shown in FIG. 78B. This mounting of the magnet 2224 may be carried out either after or before the step of installing the magnet 2124 on the side of the first substrate 2100.

In the method of fabricating the angular velocity detector of the above-described structure, a magnetic force greater by an amount corresponding to the formation of the magnet 2224 by burying the magnet 2224 also in the second substrate 2200 can be applied to the capacitance detection portion and so the detection accuracy can be improved.

The configuration in which the magnet 2224 is buried in the second substrate 2200 can be applied to the configurations of the second and third embodiments, as well as to the application to the first embodiment as described in the fourth example.

In the embodiments of the fabrication method in which the magnet is buried in the dug portion, in a case where a third substrate is used, a silicon substrate or glass substrate can be used as the third substrate. Where it is possible to fixedly mount the magnet within the dug portion, it is not necessary to bond the third substrate to the first substrate. The third substrate on which the magnet is formed may be peeled off from the magnet.

In the methods of fabricating angular velocity detectors of the first, second, and fourth embodiments, a magnet is disposed only inside a substrate. Therefore, the thickness of the angular velocity detector can be reduced by an amount corresponding to the magnet. That is, there is the advantage that the angular velocity detector can be thinned.

Additionally, in the methods of fabricating angular velocity detectors of the first through fourth embodiments described above, a magnet is disposed inside a substrate and so the distance between the electromagnetically driving portion of the structure including vibrators and the magnet is reduced. Thus, there arises the advantage that a sufficient magnetic flux density can be obtained, whereby the vibrators can be driven. In addition, the vibrators and electrodes can be prevented from touching or sticking to the magnet side because the space in the dug portion is secured above the magnet (on the vibrator side). Thus, it is possible to have the advantage that a reliable angular velocity detector can be offered. Additionally, the magnet can be buried inside the substrate without increasing the number of process steps by sharing this step with the process step for forming the dug portion in the first substrate. Hence, the thickness of the angular velocity detector can be reduced.

Embodiment 16

One example of Embodiment 16 associated with a method of fabricating an angular velocity detector of the invention is next described by referring to the schematic structural cross sections of FIGS. 79A-79E.

One embodiment associated with a method of fabricating an angular velocity detector of the invention is next described by referring to FIGS. 79A-79E.

Figure 79A:
FIGS. 79A-79E are schematic structural cross sections showing one embodiment associated with a method of fabricating an angular velocity detector (Embodiment 16) of the invention.

As shown in FIG. 79A, a silicon substrate is used as a first substrate 2500.

Figure 79B:
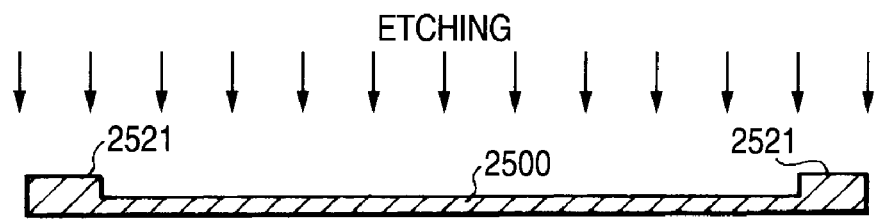

Then, as shown in FIG. 79B, a surface region excluding a region where a frame for the first substrate 2500 is formed is etched until a desired film thickness is obtained by an etching process using, for example, a resist mask (not shown). The method of etching is implemented by a wet etching process using an etchant consisting of aqueous solution of tetramethyl ammonium hydroxide (TMAH) or potassium hydroxide (KOH). Alternatively, chemical dry etching or physical dry etching may be done. If a desired film thickness is previously known, such a substrate may be prepared.

Then, the first substrate 2500 is etched to form an anodic bonding frame 2521 surrounding regions where vibrators, support portions, resilient support bodies, and so on will be formed later. At this time, an equipotential interconnect (not shown) is formed outside the anodic bonding frame 2521 at a desired spacing with the anodic bonding frame 2521 such that the frame 2521 is sandwiched between them, using the first substrate 2500. Then, the first substrate 2500 in the regions where the vibrators, support portions, resilient support bodies, and so on within the anodic bonding frame 2521 is etched to a desired thickness. In each of the above-described etching steps, the used mask can be a resist mask. The etching can be implemented by wet etching using an etchant consisting of aqueous solution of tetramethyl ammonium hydroxide (TMAH) or potassium hydroxide (KOH) or by chemical or physical dry etching. The etching determines the film thicknesses of the vibrators and resilient support bodies formed later. This process step is similar to the step described in the Embodiment 8 in connection with FIG. 39A and in which a silicon layer is used as the first substrate 2500.

Figure 79C:
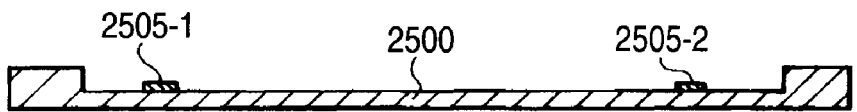

Then, as shown in FIG. 79C, insulator films 2505-1 and 2505-2 are formed over parts of first and second vibrators (formed later), over resilient support bodies, and over support portions on the first substrate 2500. The insulator films 2505-1 and 2505-2 are made, for example, of silicon oxide ($SiO_2$), silicon nitride (SiN), or a lamination film thereof. Any insulator film can be used as the insulator films 2505-1 and 2505-2 as long as they can hold the insulation between each of electrodes formed on each insulator film and the underlying first substrate 2500. The insulator films 2505-1 and 2505-2 can be formed by a lift-off method. Alternatively, an insulator film may be formed over the whole surface and then the insulator film may be processed to form the above-described insulator films by a lithography technique and an etching technique. This process step is similar to the step already described in the Embodiment 8 in connection with FIG. 39B except that the first substrate 2500 is made of a silicon layer.

Figure 79D:
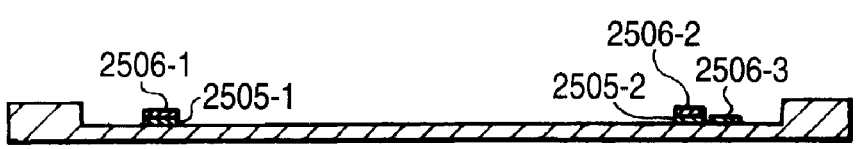

Then, as shown in FIG. 79D, an electrode 2506-1 becoming a conductive interconnect for application of a Lorentz force is formed over the insulator film 2505-1. An electrode 2106-2 becoming a conductive interconnect for detecting an induced electromotive force is formed over the insulator film 2505-2. A conductive pad 2506-3 is formed over the first substrate 2500 in a region giving a position from which electrodes of resilient support bodies are brought out. At the same time, electrode pads (not shown) are formed on support portions (formed later) in positions at which the opposite ends of the electrodes 2506-1 and 2506-2 are formed. A three-layer metal material of gold, platinum, and chromium is used as the electrode material. A three-layer metal material of gold, platinum, and titanium may also be used. Furthermore, two-layer metal materials such as gold-chromium, platinum-chromium, gold-titanium, and platinum-titanium may also be used. Instead of the titanium, a laminate material of titanium nitride and titanium may be used. In addition, copper may be used instead of the chromium or titanium. The electrode material can be formed, for example, by electron beam evaporation. Also, in the present embodiment, electrodes are formed by a lift-off method. Electrodes may also be formed by forming a metal material layer and then processing the metal material layer by wet etching or dry etching. A sputtering method or a CVD process may be used to form the film of the metal material, in addition to electron beam evaporation.

Figure 79E:
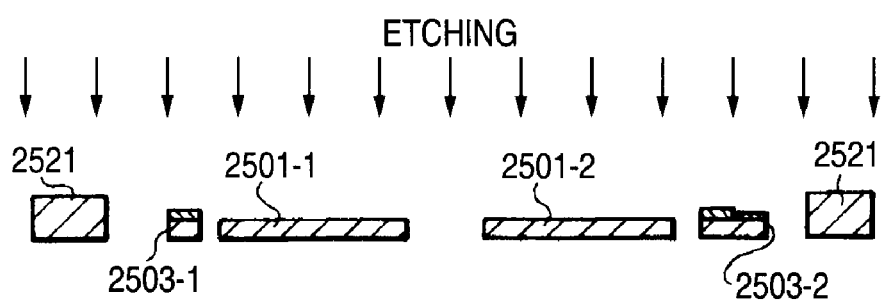

Then, as shown in FIG. 79E, the first substrate 2500 is processed using a lithography technique and an etching technique (e.g., reactive ion etching) to form a first vibrator portion 2501-1, a second vibrator 2501-2, resilient support bodies (not shown), and support portions 2503-1 to 2503-2. An anodic bonding frame 2521 and equipotential interconnects (not shown), etc. are completed. The first vibrator portion 2501-1, second vibrator 2501-2, and resilient support bodies (not shown) are formed. The positions at which the anodic bonding frame 2521, equipotential interconnects (not shown), etc. are disposed have been already described in the Embodiments 7 and 8. As a result, the first vibrator portion 2501-1 and the second vibrator 2501-2 poised by the resilient support bodies (not shown) are formed on the anodic bonding frame 2521. The various components are supported to the anodic bonding frame 2521 by support members such as the above-described resilient support bodies and extraction electrodes (not shown in the drawing).

Then, a third substrate is prepared. A method of fabricating the third substrate is described by referring to the schematic structural cross sections of FIGS. 80A-80B.

Figure 80A:
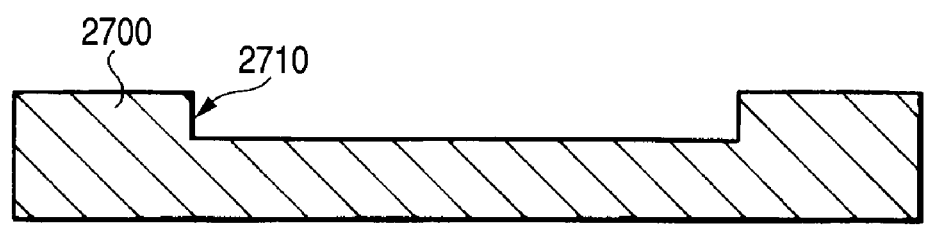
FIGS. 80A-80B are schematic structural cross sections showing one embodiment associated with a method of fabricating an angular velocity detector (Embodiment 16) of the invention.

As shown in FIG. 80A, a silicon substrate is used as a third substrate 2700. A dug portion 2710 is then formed in the third substrate 2700 by an etching step using, for example, a resist mask (not shown). The dug portion 2710 is formed over the third substrate 2700 in a position, for example, opposite to the first vibrator 2501-1 and the second vibrator 2501-2 to prevent the first vibrator 2501-1, second vibrator 2501-2, resilient support bodies (not shown), and so on (see the above-referenced FIG. 79E) for poising the vibrators and so on from touching the third substrate 2700 if the first vibrator 2501-1, second vibrator 2501-2, the resilient support bodies (not shown) are vibrated when the third substrate 2700 is bonded to the frame having the vibrators thereon in a later process step. Reactive ion etching can be used as the method of etching. Alternatively, wet etching using an etchant consisting of aqueous solution of tetramethyl ammonium hydroxide (TMAH) or potassium hydroxide (KOH) may be used or by other chemical or physical dry etching may be used. The dug portion 2710 can be the form of a hole or extend through the third substrate 2700. Where the dug portion 2710 is in the form of a hole, i.e., does not extend through the substrate, it is necessary that the depth of the dug portion 2710 be so determined that after the third substrate 2700 has been bonded to the frame having the vibrators and so on thereon, the first vibrator portion 2501-1, second vibrator 2501-2, the resilient support bodies (not shown), and so on (see the above-referenced FIG. 79E) from touching the bottom of the dug portion 2170 of the third substrate 2700 if the first vibrator portion 2501-1, second vibrator 2501-2, and the resilient support bodies (not shown) are vibrated.

Figure 80B:
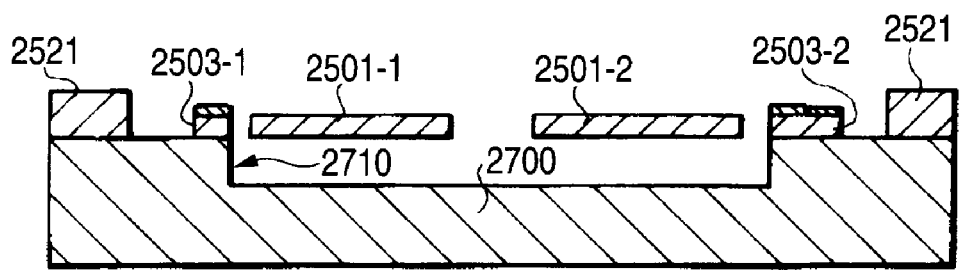
Figure 81A:
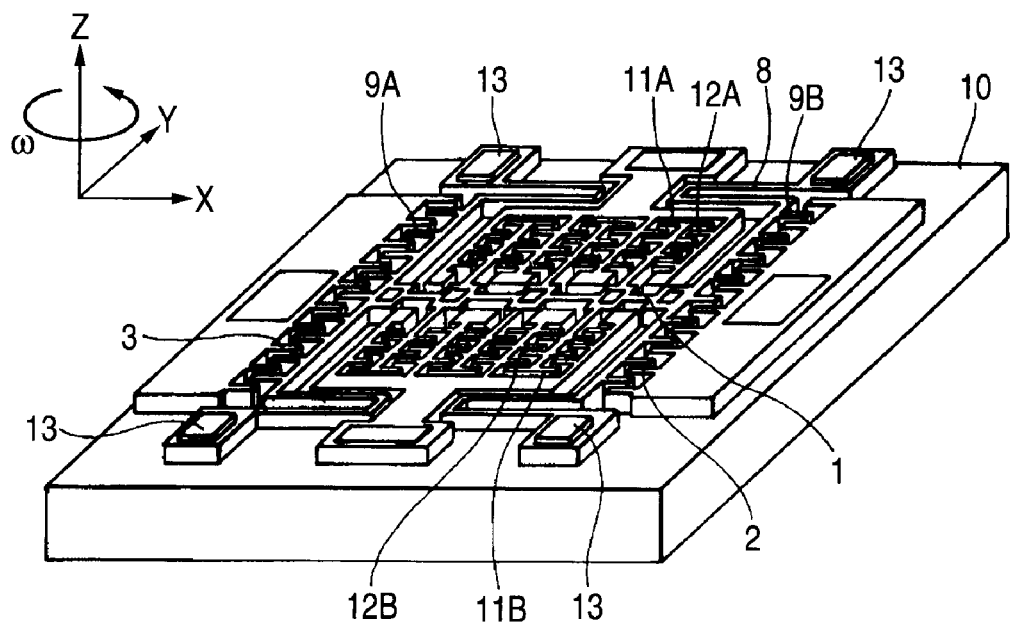
FIGS. 81A-81B are a perspective view and a schematic cross section, respectively, showing the prior art angular velocity detector.
Figure 81B:
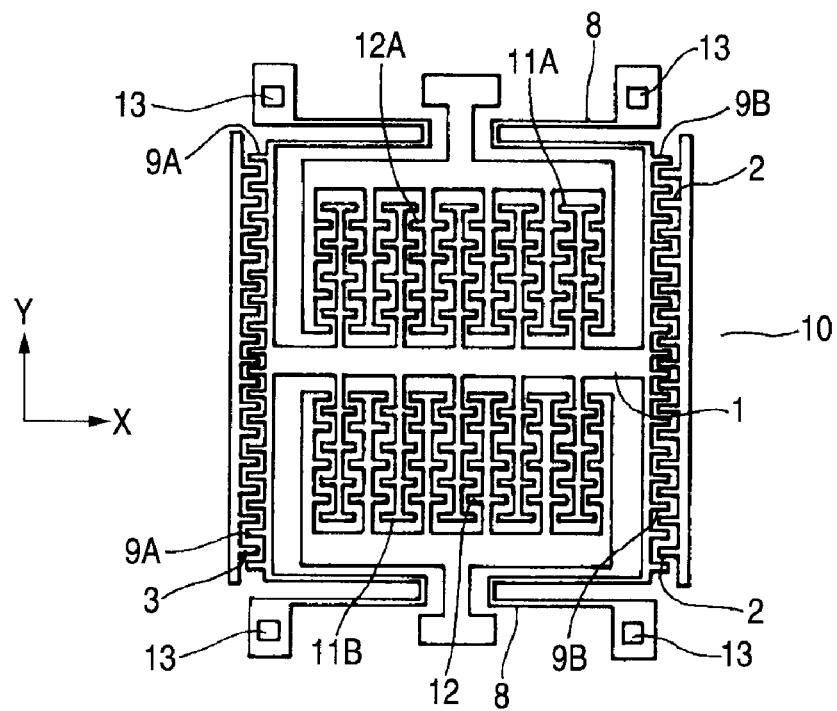

As shown in FIG. 80B, the third substrate 2700 is bonded to the anodic bonding frame 2521 while the dug portion 2710 formed in the third substrate 2700 is placed on the side of the frame 2521.

A silicon substrate is used as the third substrate 2700. An oxide film may be formed on the surface of the third substrate 2700. In this case, when the dug portion 2710 is formed, the silicon substrate is etched together with the oxide film, thus forming the dug portion 2710 of the embodiment. When the substrate is bonded, it follows that the anodic bonding frame 2521 is bonded to the surface of the oxide film formed on the surface of the third substrate 2700. In this way, the oxide film can be sandwiched between parts of the silicon substrate.

Then, a second substrate is fabricated in an unillustrated manner. The second substrate can be fabricated by a method of fabrication similar to the method already described in the Embodiment 8 to fabricate the second substrate. Then, the first substrate 2500 and the second substrate are bonded together, thus performing an assembly step. In this way, an angular velocity detector is fabricated.

The above-described method of fabricating an angular velocity detector can yield advantages similar to the advantages derived by the method of fabricating an angular velocity detector already described in the Embodiment 8.

The method of fabrication described in the Embodiment 15 where a magnet is disposed inside a substrate can be similarly applied to the methods of fabricating angular velocity detectors already described in the various embodiments.

The structure in which a dug portion is formed in a substrate and the structure in which a magnet is disposed in the dug portion can also be utilized in the methods of fabricating angular velocity detectors having vibrators using an annular thin film as described in the above embodiments and in the methods of fabricating angular velocity detectors having one or more rectangular vibrators.

INDUSTRIAL APPLICABILITY

The angular velocity detector, method of detecting angular velocities using the angular velocity detector, and method of fabricating the angular velocity detector of the invention can be applied to applications where the angular velocity detector is installed on a small-sized device such as a mobile device with less occupied space. In addition, they can also be applied to acceleration sensors and pressure sensors.

The invention claimed is:

1. An angular velocity detector comprising:
   a substrate;
   support portions formed on a surface of said substrate;
   resilient support bodies having their respective one ends connected to said support portions;
   at least one vibrator supported to respective other ends of said resilient support bodies while poised above the surface of said substrate at a certain spacing therefrom, the vibrator being capable of being displaced relative to said substrate;
   exciting means for exciting said vibrator to vibrate in a certain direction of vibrations; and
   displacement detection means which, when an angular velocity acts from the outside while the vibrator is being vibrated in the direction of vibrations by the exciting means, detects a displacement of said vibrator in a direction perpendicular to the direction of vibrations in response to the angular velocity;
   wherein said vibrator or an angular velocity detection portion including said vibrator is electromagnetically driven to vibrate; and
   wherein said displacement detection means includes electrodes located on opposite sides of a space from said vibrator, and wherein electrodes disposed on said vibrator and formed inside a dug portion formed in said vibrator.

2. An angular velocity detector as set forth in claim 1, further comprising:
   a detection electrode mounted on the opposite side of a space from said vibrator; and
   a second substrate located opposite to the first substrate, said detection electrode being formed on said second substrate.

3. An angular velocity detector as set forth in claim 1, wherein said at least one vibrator consists of a single vibrator, and wherein said plural resilient support bodies are disposed from outer fringes of said vibrator.

4. An angular velocity detector as set forth in claim 1, wherein said at least one vibrator consists of a single vibrator consisting of an annular thin film and driven to be rotationally vibrated about a center axis of the vibrator.

5. An angular velocity detector as set forth in claim 4, wherein said at least one vibrator consists of a single vibrator made of an annular thin film, and wherein said resilient support bodies consist of plural outer resilient support bodies connected to outer fringes of said vibrator and plural inner resilient support bodies connected to inner fringes of said vibrator.

6. An angular velocity detector as set forth in claim 1, wherein
   (A) said at least one vibrator consists of plural vibrators,
   (B) said plural resilient support bodies are disposed from outer fringes of each of said vibrators, and
   (C) a portion between said vibrators is supported by the resilient support bodies poised above said substrate.

7. An angular velocity detector as set forth in claim 6, wherein said at least one vibrator consists of two vibrators, and wherein when said vibrators are electromagnetically driven as described above, the vibrators vibrate with a phase difference of 180° with each other.

8. An angular velocity detector as set forth in claim 1, wherein each of said resilient support bodies consists of a linear body or has at least one constriction.

9. An angular velocity detector as set forth in claim 1, wherein said exciting means excites said vibrator and an angular velocity detection portion including said vibrator by electromagnetically driving it and has electrodes disposed in parts of said resilient support bodies and said vibrator to permit said exciting means to electromagnetically drive said vibrator and said angular velocity detection portion.

10. An angular velocity detector as set forth in claim 1, wherein a dug portion is formed in the first substrate at least on a side of said vibrator.

11. An angular velocity detector as set forth in claim 10, wherein said dug portion is formed in a position opposite to said vibrator.

12. An angular velocity detector as set forth in claim 1, wherein said exciting means has a magnet for producing an electromagnetic force when said vibrator or angular velocity detection portion is electromagnetically driven as described above, and wherein said magnet is disposed immediately above or below said vibrator or said angular velocity detection portion including said vibrator.

13. An angular velocity detector as set forth in claim 12, wherein said magnet is disposed inside said substrate.

14. An angular velocity detector as set forth in claim 12, wherein said magnet is disposed inside a dug portion formed in said substrate at a position located opposite to said vibrator on a side of said vibrator.

15. An angular velocity detector as set forth in claim 12, wherein said magnet is disposed inside a dug portion which is formed in said substrate at a position opposite to said vibrator and which extends through said substrate.

16. An angular velocity detector as set forth in claim 12, wherein said magnet is formed on or in a third substrate different from the first substrate and disposed in a dug portion which is formed in the first substrate at a position opposite to said vibrator and which extends through the first substrate, and wherein the first substrate and said third substrate have been bonded together.

17. An angular velocity detector as set forth in claim 16, wherein said magnet is disposed in a dug portion formed in said third substrate.

18. An angular velocity detector as set forth in claim 1, wherein electromagnetically driving said vibrator or angular velocity detection portion including the vibrator as described above is carried out by energizing electrodes disposed on parts of said resilient support bodies and of said vibrators with an AC current to vibrate said vibrator perpendicularly to a line of magnetic force produced by a magnet disposed above and/or below said vibrator or the angular velocity detection portion including said vibrator.

19. An angular velocity detector as set forth in claim 1, wherein said resilient support bodies are formed such that surfaces of said electrodes disposed on said resilient support bodies are located on a side of said substrate rather than a surface of said vibrator.

20. A method of detecting an angular velocity by an angular velocity detector having:
   a substrate;
   support portions fixedly mounted to a surface of said substrate;
   resilient support bodies each having a first end connected to said support portion;
   a vibrator supported to a second end of each of said resilient support bodies while poised above the surface of said substrate at a certain distance therefrom, the vibrator being capable of being displaced relative to said substrate;
   exciting means for vibrating said vibrator in a certain direction of vibrations; and
   displacement detection means for detecting a displacement of said vibrator in a direction perpendicular to the direction of vibrations in response to an angular velocity when said angular velocity acts from the outside while said vibrator is being vibrated in said direction of vibrations by said exciting means;
   wherein said displacement detection means includes electrodes located on opposite sides of a space from said vibrator, and wherein electrodes disposed on said vibrator and formed inside a dug portion formed in said vibrator;
   said method comprising the steps of:
   electromagnetically driving said vibrator or an angular velocity detection portion including said vibrator to vibrate; and
   detecting a displacement of said vibrator in response to an angular velocity in a direction perpendicular to the direction of vibrations by said displacement detection means when said angular velocity acts on said vibrating vibrator from the outside.

* * * * *